US012593817B2

(12) United States Patent　　　(10) Patent No.: US 12,593,817 B2

Vachula et al.　　　　　　　　　　　(45) Date of Patent: Apr. 7, 2026

---

(54) FEEDING SYSTEM

(71) Applicants: Faunology Inc., Ronkonkoma, NY (US); Le Vachula, Ronkonkoma, NY (US); Ronald George Vachula, Jr., Ronkonkoma, NY (US)

(72) Inventors: Le Vachula, Ronkonkoma, NY (US); David Michael Cowan, Brooklyn, NY (US); Ronald George Vachula, Jr., Ronkonkoma, NY (US)

(73) Assignees: Faunology Inc., Ronkonkoma, NY (US); Le Vachula, Ronkonkoma, NY (US); Ronald George Vachula, Jr., Ronkonkoma, NY (US)

( * ) Notice: Subject to any disclaimer, the term of this patent is extended or adjusted under 35 U.S.C. 154(b) by 0 days.

(21) Appl. No.: 18/586,022

(22) Filed: Feb. 23, 2024

(65) Prior Publication Data

US 2024/0315197 A1　Sep. 26, 2024

Related U.S. Application Data

(63) Continuation-in-part of application No. 16/787,567, filed on Feb. 11, 2020, now Pat. No. 12,295,352.

(Continued)

(51) Int. Cl.
　A01K 5/01　　　(2006.01)
　A01K 5/02　　　(2006.01)

(52) U.S. Cl.
　CPC .......... A01K 5/0114 (2013.01); A01K 5/0291 (2013.01)

(58) Field of Classification Search
　CPC ....... A01K 5/0114; A01K 5/02; A01K 5/0291
　See application file for complete search history.

(56) References Cited

U.S. PATENT DOCUMENTS

| | | | |
|---|---|---|---|
| 4,044,722 A | 8/1977 | Bradshaw | |
| 4,077,360 A | 3/1978 | Figlia | |

(Continued)

FOREIGN PATENT DOCUMENTS

| | | | |
|---|---|---|---|
| AU | 2020221188 A1 | 7/2021 | |
| CN | 2406481 Y | 11/2000 | |

(Continued)

OTHER PUBLICATIONS

Decision on Rejection dated May 27, 2024 received in Chinese Patent Application No. 202080013913.0, 26 pages.

(Continued)

*Primary Examiner* — Joshua D Huson
*Assistant Examiner* — Alanna K Peterson
(74) *Attorney, Agent, or Firm* — Scully, Scott, Murphy & Presser, P.C.

(57)　　　　　　ABSTRACT

The disclosure is directed to a feeding system. The feeding system includes a housing that substantially forms an exterior surface of the feeding system, inside the housing includes an arm configured to rotate clockwise and counterclockwise to a plurality of positions, wherein the arm is configured to support a can; a can opener at a first position of the plurality of positions; and an opening of the housing at a second position of the plurality of positions. A sealed-can barrel is situated to receive and store a stack of sealed cans within the housing, and a cam-operated latch device is provided to release a bottommost can of the stack onto the arm. In timed operations, a cam-operated retainer device is configured to hold a plurality of sealed cans of the stack above the bottommost sealed can while the bottommost sealed can is being released onto the arm.

12 Claims, 39 Drawing Sheets

Related U.S. Application Data

(60) Provisional application No. 62/804,366, filed on Feb. 12, 2019.

(56) References Cited

U.S. PATENT DOCUMENTS

| | | | |
|---|---|---|---|
| 4,421,059 | A | 12/1983 | Cousino |
| 5,649,499 | A | 7/1997 | Krietzman et al. |
| 6,988,464 | B1 * | 1/2006 | Rutledge .............. A01K 5/0114 119/51.01 |
| 9,049,949 | B1 * | 6/2015 | Taylor ..................... A47F 1/085 |
| 10,568,301 | B2 | 2/2020 | Chen |
| 11,712,022 | B2 * | 8/2023 | Zhu ....................... A01K 5/0291 119/51.11 |
| 2002/0108952 | A1 | 8/2002 | Delman et al. |
| 2005/0066905 | A1 | 3/2005 | Morosin et al. |
| 2005/0094484 | A1 | 5/2005 | Sextro |
| 2005/0218141 | A1 | 10/2005 | Kratzer et al. |
| 2009/0236354 | A1 | 9/2009 | Alvares et al. |
| 2012/0060761 | A1 | 3/2012 | Laro |
| 2013/0247829 | A1 | 9/2013 | Taneja et al. |
| 2014/0090601 | A1 * | 4/2014 | Stone ................... A01K 5/0275 119/51.01 |
| 2015/0053138 | A1 | 2/2015 | Ramsey et al. |
| 2015/0313176 | A1 | 11/2015 | Gelinas |
| 2016/0037748 | A1 | 2/2016 | Taneja |
| 2017/0202178 | A1 | 7/2017 | Gordon et al. |
| 2020/0037579 | A1 * | 2/2020 | Eom ...................... A01K 5/025 |
| 2020/0150696 | A1 | 5/2020 | Womble et al. |
| 2020/0253162 | A1 | 8/2020 | Vachula et al. |
| 2024/0081283 | A1 * | 3/2024 | Franklin .............. A01K 5/0208 |
| 2024/0415094 | A1 * | 12/2024 | Li ........................ A01K 5/0114 |

FOREIGN PATENT DOCUMENTS

| | | |
|---|---|---|
| CN | 201008298 Y | 1/2008 |
| CN | 201226717 Y | 4/2009 |
| CN | 105682454 A | 6/2016 |
| CN | 107320745 A | 11/2017 |
| CN | 107373729 A | 11/2017 |
| CN | 107396843 A | 11/2017 |
| CN | 107920691 A | 4/2018 |
| CN | 207505485 U | 6/2018 |
| CN | 108308049 A | 7/2018 |
| CN | 207767223 U | 8/2018 |
| CN | 106234242 B | 8/2019 |
| CN | 106659139 B | 9/2021 |
| DE | 29617137 U1 | 12/1996 |
| EP | 3923708 B1 | 11/2024 |
| FR | 2701353 B1 | 6/1995 |
| FR | 3111765 A1 * | 12/2021 |
| GB | 2199477 A | 7/1988 |
| GB | 2594877 B | 2/2023 |
| JP | H0327951 A | 2/1991 |
| JP | 3054576 U | 12/1998 |
| JP | 2017528119 A | 9/2017 |
| WO | 2011076378 A2 | 6/2011 |
| WO | 2014013319 A1 | 1/2014 |
| WO | 2020167754 A1 | 8/2020 |
| WO | 2020169726 A1 | 8/2020 |

OTHER PUBLICATIONS

British Examination Report dated May 12, 2022 received in British Application No. GB2110613.3.

Chinese Office Action and Search Report dated Jun. 23, 2022 received in Chinese Application No. 202080013913.0 together with an English-language translation.

English-language translation of Office Action received from the Chinese Patent Office dated Jan. 19, 2023 received n a corresponding foreign application, 13 pages.

English-language translation of Office Action received from the Indian Patent Office dated Feb. 16, 2023 received n a corresponding foreign application, 7 pages.

European Search Report dated Sep. 28, 2022 received in a corresponding foreign application, 8 pages.

International Search Report and Written Opinion dated Apr. 23, 2020 received in International Application No. PCT/US2020/017643.

Notice of Reasons for Refusal dated Oct. 31, 2023 received in Japanese Patent Application No. JP 2021-538139.

Office Action dated Jun. 6, 2023 received in European Patent Application No. EP 20 756 120.0.

Third Office Action dated Jun. 7, 2023 received in Chinese Patent Application No. CN 202080013913.0.

Office Action dated Jul. 17, 2024 received in U.S. Appl. No. 16/787,567, 23 pages.

Yingfu, L., "Modern Household Essentials", Liaoning People's Publishing House, May 1991, pp. 899-900.

Office Action received in Chinese Patent Application No. 202080013913.0 dated Feb. 21, 2024, 23 pages.

Office Action dated May 9, 2025 received in Canadian Patent Application No. 3,126,848, 3 pages.

* cited by examiner

FIG. 1A                              FIG. 1B

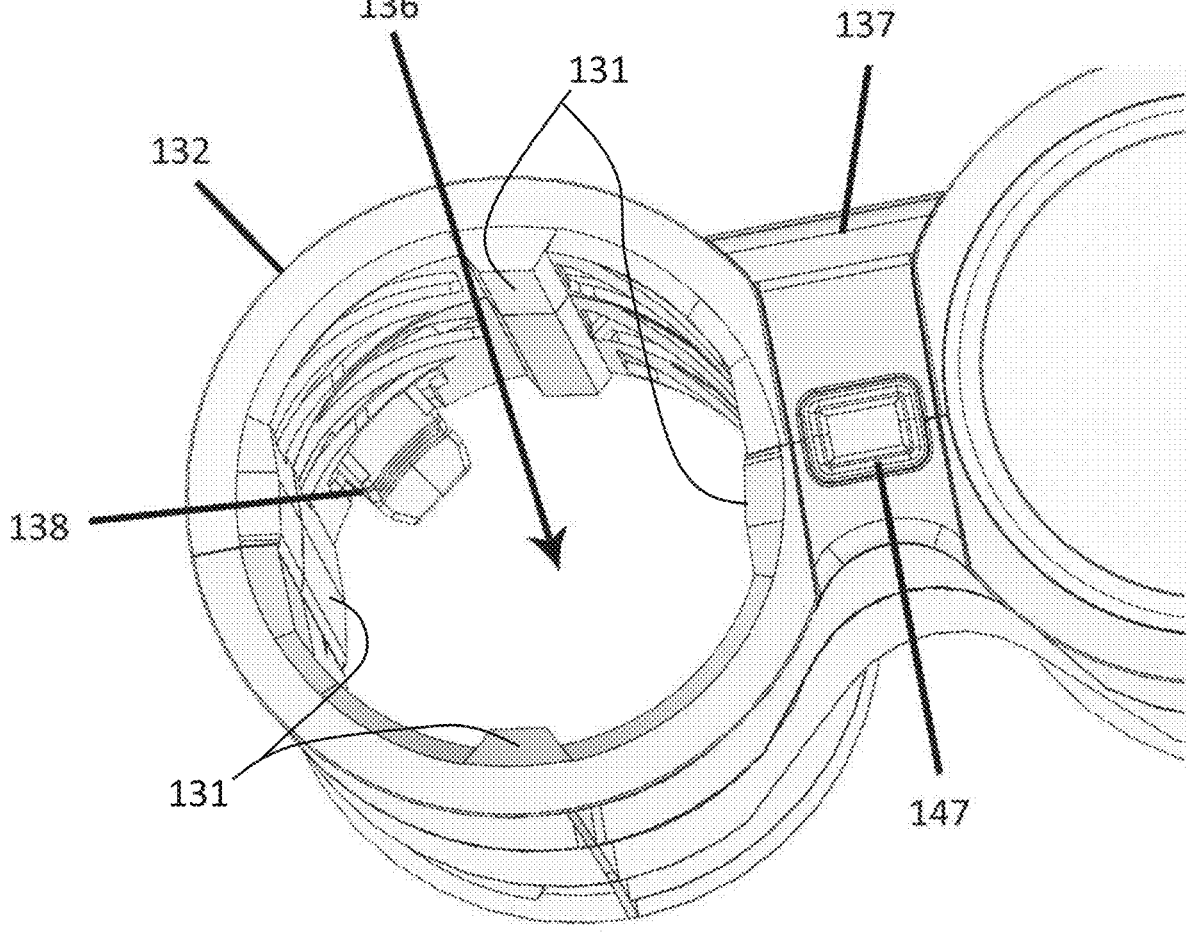
FIG. 6D     (Sealed can latch inside the chute)

138

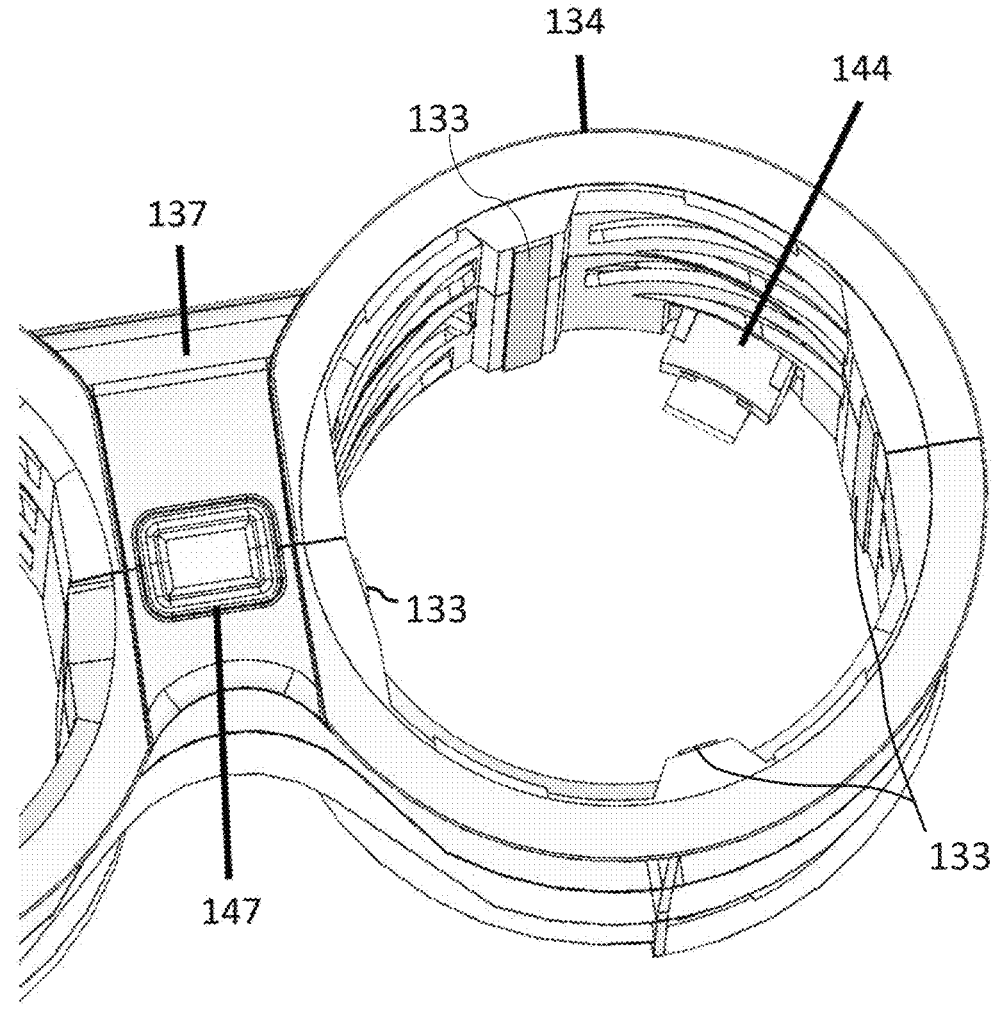
FIG. 6F        (Empty can latch chute.)

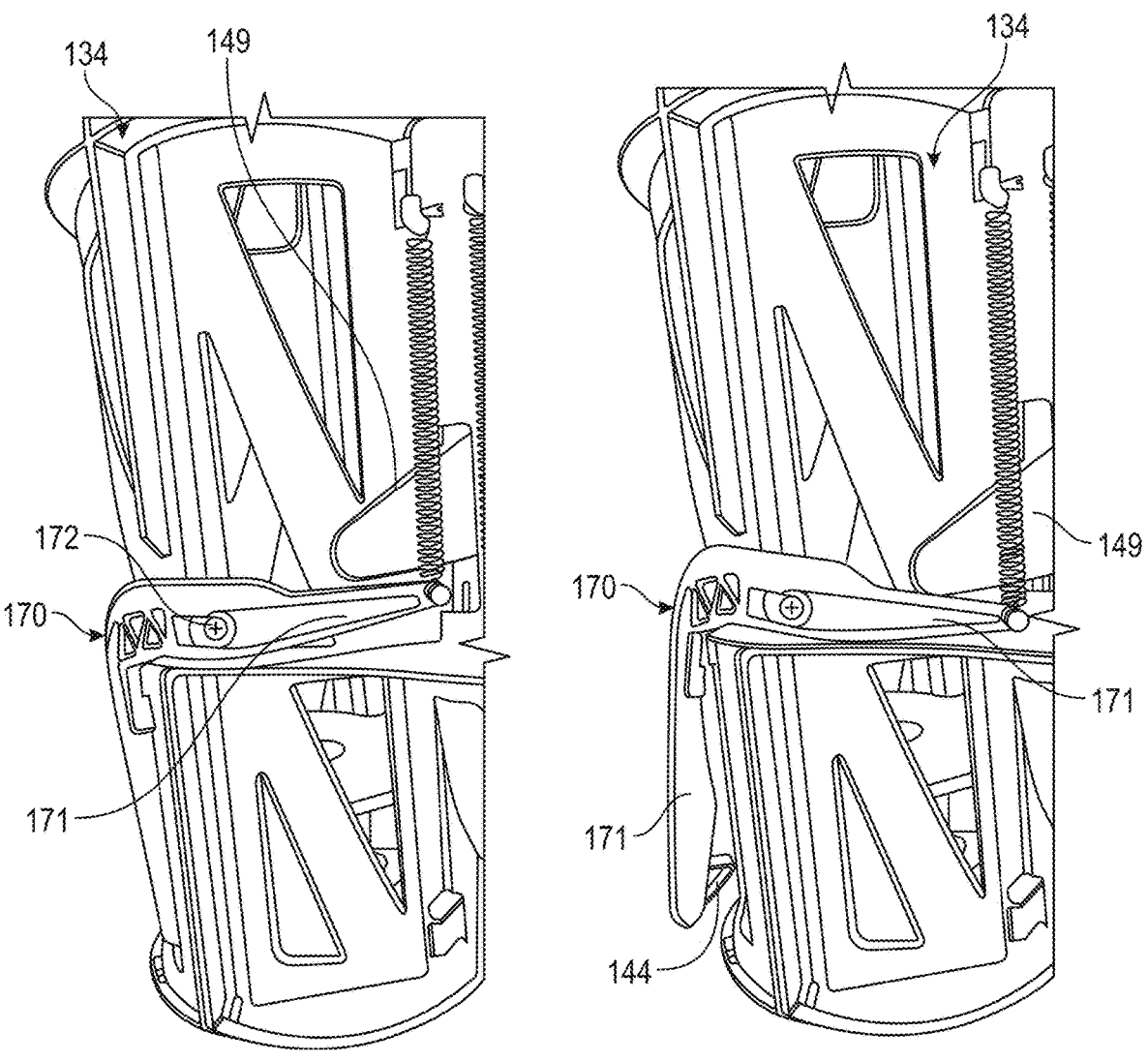
FIG. 6H                    FIG. 6I

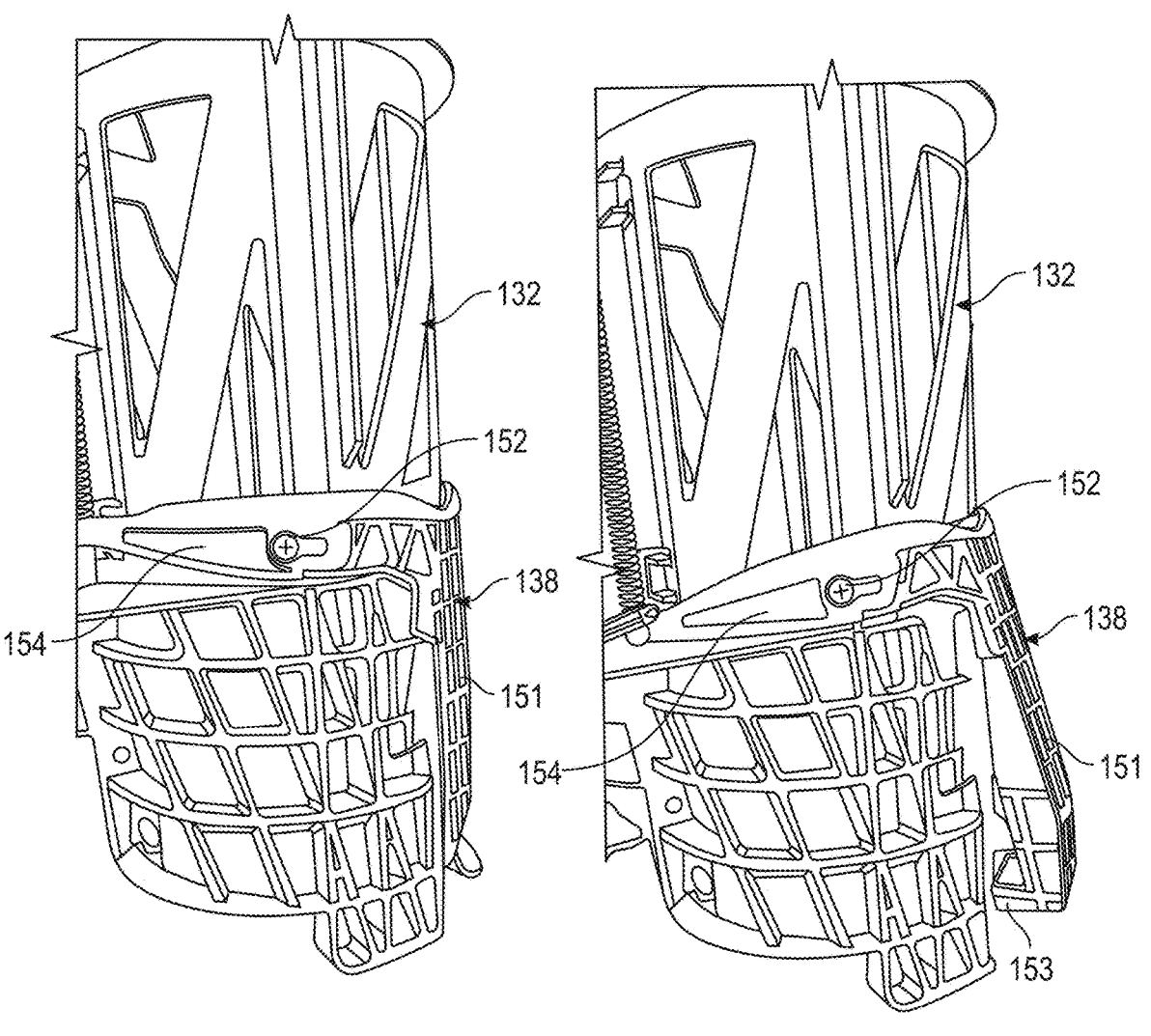
FIG. 6J                    FIG. 6K

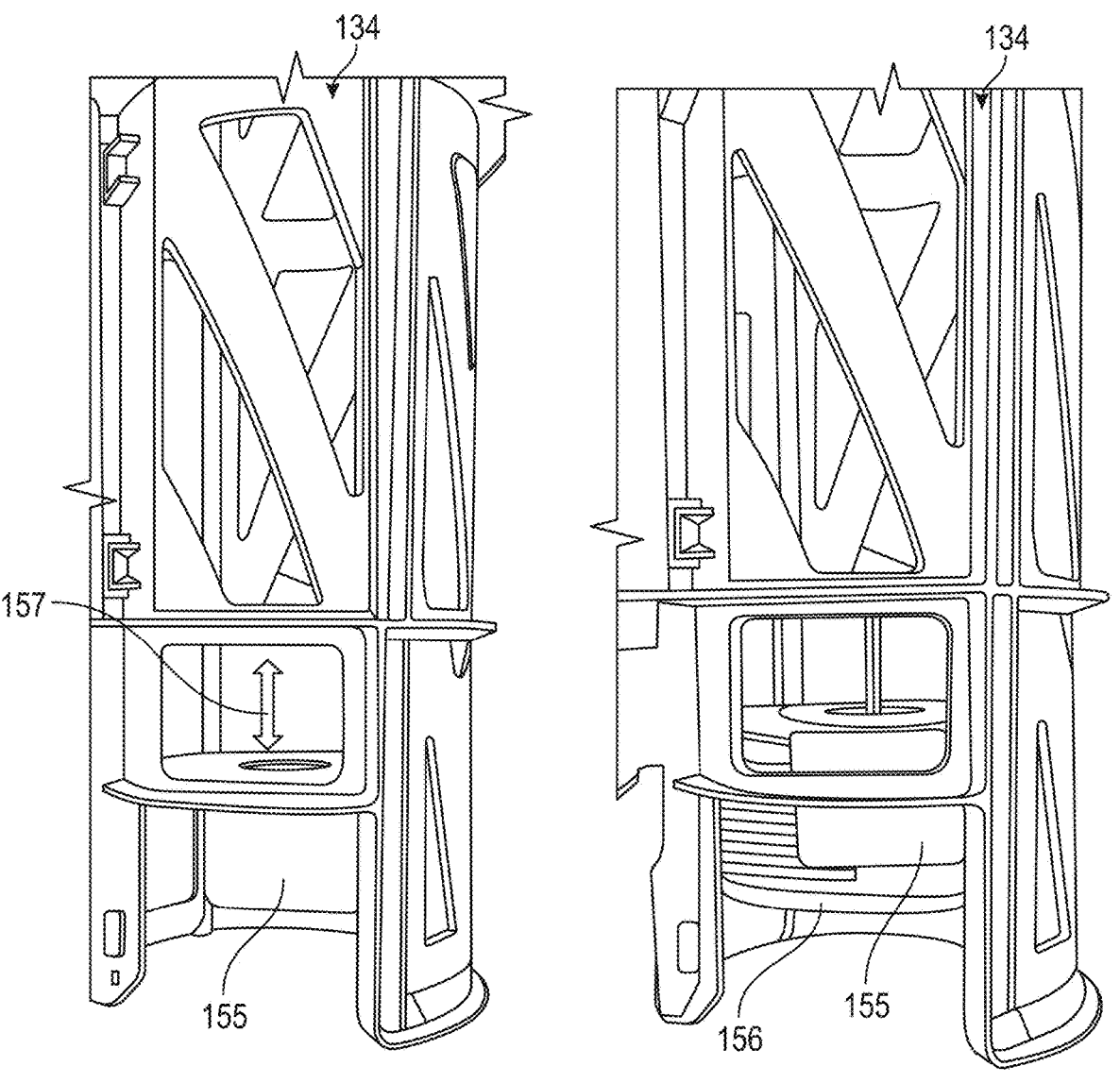
FIG. 6L                    FIG. 6M

100

195

194

190

FEEDING SYSTEM

This application claims the benefit of U.S. patent application Ser. No. 16/787,567 filed on Feb. 11, 2020, which application claims the benefit of U.S. Provisional Application No. 62/804,366 filed on Feb. 12, 2019, the entire contents of both of which is incorporated herein by reference.

BACKGROUND OF THE DISCLOSURE

Typical feeding systems succumb to various downfalls, including the ability to only dispense a dry food, or only to allow for exposure of a single receptacle of a wet food. Many feeding systems are not capable of opening one, or more sealed cans of food, including wet food, over time, so that an animal can access the recently opened can of food for feeding. Nor are they capable of containing the opened food in a specialized location made to minimize dry out and bacterial growth.

What is desired is a system and method for feeding various animals, over time, several sealed cans of food. Embodiments of the present disclosure provide methods that address the above and other issues.

SUMMARY OF THE DISCLOSURE

The present disclosure is directed to feeding system that is configured to dispense canned foods.

The present disclosure is also directed to a feeding system. The feeding system includes a housing that substantially forms an exterior surface of the feeding system, inside the housing includes an arm configured to rotate clockwise and counterclockwise to a plurality of positions, wherein the arm is configured to support a can; a can opener at a first position of the plurality of positions; and an opening of the housing at a second position of the plurality of positions.

BRIEF DESCRIPTION OF THE DRAWINGS

The present disclosure will be better understood by reference to the following drawings of which:

A short description of all figures will be added here.

FIGS. 1A-1C are top and front views of an embodiment of the feeding system.

FIGS. 2A-21 are top, left side, right side and front views of an embodiment of the feeding system during operation.

FIG. 5 is a perspective view of the embodiment of the feeding system.

FIGS. 6A-6G are views of elements of the feeding system and can chute.

FIGS. 6H-6I depict exemplary operations of a used can latch assembly at the bottom of the used can barrel according to an embodiment.

FIGS. 6J-6K depict exemplary operations of a sealed can latch assembly at the bottom of the sealed can barrel according to an embodiment.

FIGS. 6L-6M depict exemplary operations of a weighted slide cap member in the used can barrel according to an embodiment.

FIG. 7 is an illustration of the various can positions.

FIG. 9 is a perspective view of the edge detection element.

FIG. 11 is an underside view of the opening cover.

FIG. 12 is a cross-sectional view of the capping arm.

FIG. 15 depicts a cam that is mounted on a top surface near the perimeter of the rotating carousel at the base of the feeder assembly according to an embodiment.

DETAILED DESCRIPTION OF THE DISCLOSURE

Figure 1C:
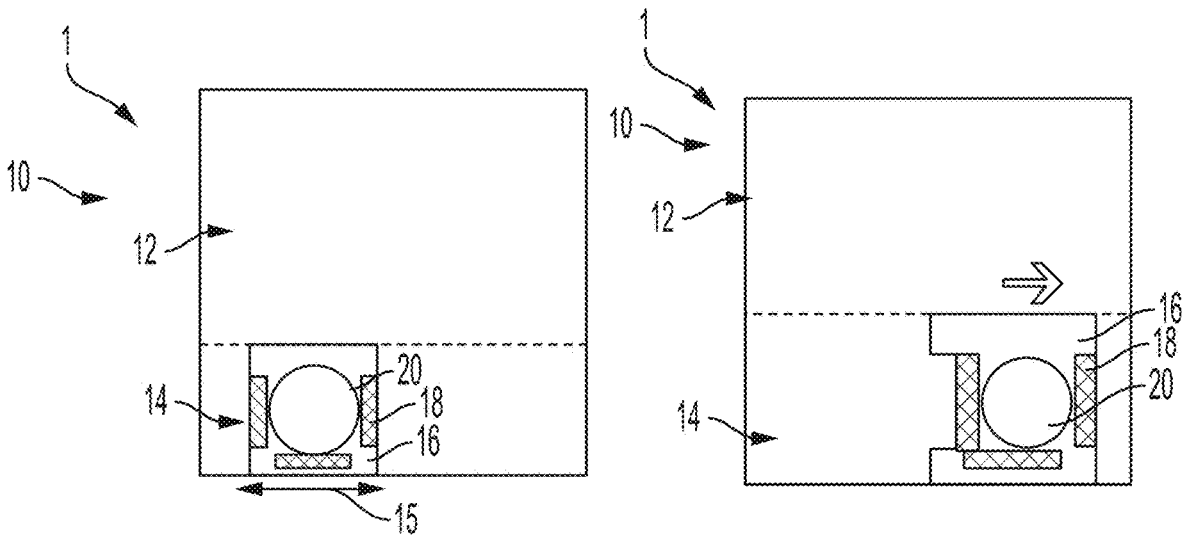
Figure 1C:
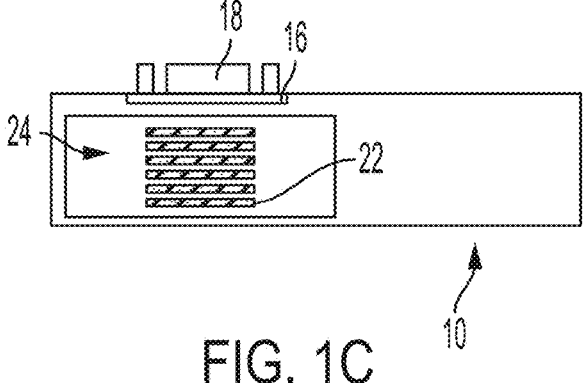

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

In the discussion and claims herein, the term "about" indicates that the value listed may be somewhat altered, as long as the alteration does not result in nonconformance of the process or structure to the illustrated embodiment. For example, for some elements the term "about" can refer to a variation of +0.1%, for other elements, the term "about" can refer to a variation of +1% or +10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either be completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc. In yet another illustration, reference herein to a range of from "5 to 10" includes whole numbers of 5, 6, 7, 8, 9, and 10, and fractional numbers 5.1, 5.2, 5.3, 5.4, 5.5, 5.6, 5.7, 5.8, 5.9, etc.

As used herein, the term "canned foods" or "can" refers to any metal or metal containing container (as well as plastic containers having a film covering) that contains an edible product and/or a pharmaceutical product. FIG. 1A is a top view of a lower tray 10 of an embodiment of a feeding system 1, with elements vertically above the lower tray removed for explanatory purposes. A rear portion 12 of the lower tray is configured to contain various electrical elements (such as wiring, fuses, electrical receiving elements, transformers, etc.), various computing elements (such as a processor, memory, wireless transmitters, etc.), one or more motors and optionally one or more batteries.

The front portion 14 includes a panel 16 that is configured to slide in the direction of arrow 15. The panel 16 can slide by being urged by a pole or other element that can contact the panel 16 and cause it to move. One example of this set up is panel 16 contacts two poles, one causing panel 16 to slide in one direction along arrow 15, the other causing panel 16 to slide in a second, opposite direction along arrow 15. Alternatively, a screw element can rotate and cause panel 16 to slide in each direction of arrow 15.

Operably connected to the panel is a plurality of bumpers 18. In this embodiment, three bumpers are shown, in other embodiments, two, four or more bumpers may be included.

These plurality of bumpers 18 are configured to move to and from a center of the panel and are configured to contact an exterior surface of a can 20. The plurality of bumpers 18 can vary in size and shape, and can move to accommodate varying sizes of cans.

In one embodiment, the plurality of bumpers 18 are rolling cylinders that extend vertically from the panel 16 and have a central pushing element connected to a gear (not shown) under the panel 16. As the gear rotates, the central pushing element of each of the plurality of bumpers 18 move either closer together, or further apart depending on which direction the gear rotates. Each of plurality of bumpers 18 can include a sensor (not shown) that is configured to sense a pressure between each of the plurality of bumpers 18 and the can 20. Based on the known location of each of the plurality of bumpers 18 and the pressure measured by the sensors, the feeding system 1 can determine the size of the can on the panel 16.

As shown in FIG. 1A, the panel 16 is in a first position, but in FIG. 1B, the panel 16 is in a second position. This second position allows access to the can 20 from outside the feeding system by, for example, a dog or cat. A cover (not shown) is typically vertically above the second position, but upon movement of the panel 16 from the first position to the second position, the cover opens. Alternatively, the panel 16 may be extended to the external part of the system so that it protrudes from the outer enclosure to present the contents of the can.

The cover can open in any suitable way, such as by receiving a signal from a processor, an app, a proximity sensor, a cloud based program, a facial recognition program or a schedule, to open or close at a specific time of day. In other embodiments the cover can be opened manually by a user, or a portion of the cover can be contacted, triggering the cover to move.

FIG. 1C is a side view of the bottom tray 10. In this view the panel 16 and the plurality of bumpers 18 (without a can) can be seen. Vertically below the panel 16, while the panel 16 is in the first position, is a lid receptacle 24, configured to accept a plurality of lids 22. Once a lid 22 is removed from the can, while the can is in the first position, as further described below, the lid 22 is held in position until after the panel 16 moves to the second position (as shown in FIG. 1B). The lid 22 then is released and falls vertically down into the lid receptacle.

Figures 2A, 2B, 2C, 2D:
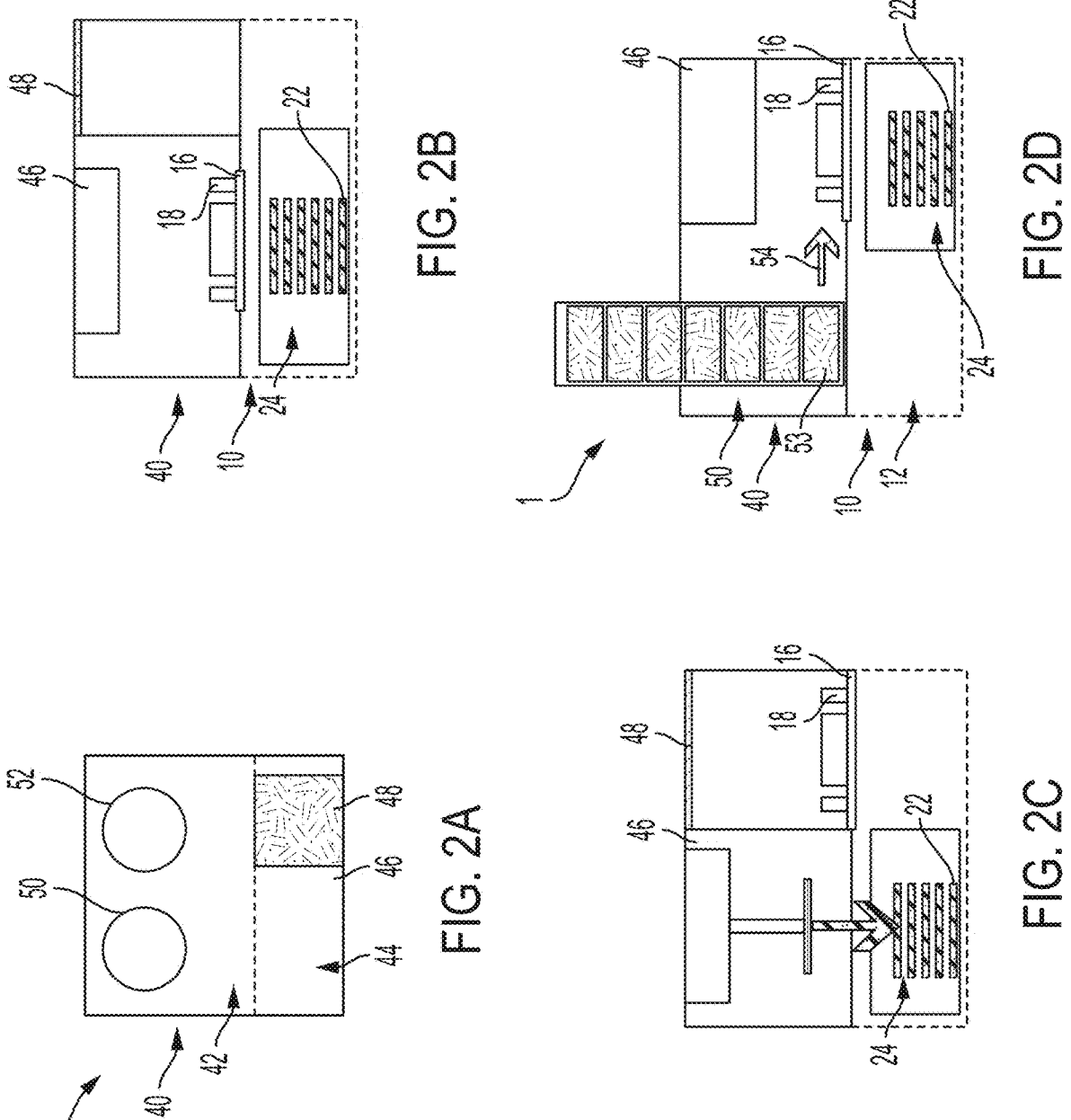
Figure 2I:
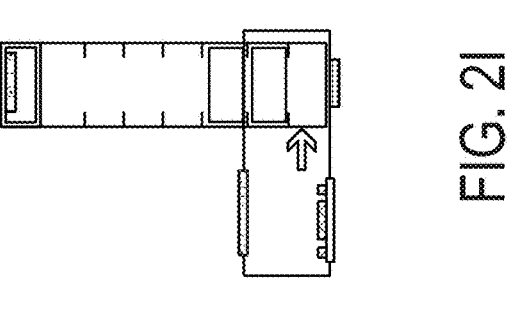
Figure 2H:
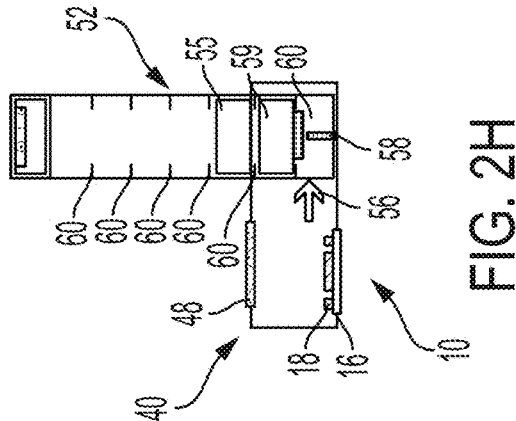

A middle tray 40 is shown in FIG. 2A, which is another view of an embodiment and includes a cover 48 as mentioned above, in a front portion 44. The front portion 44 also includes a can opener 46, which is further discussed below. A rear portion 42 includes a full can receptacle 50 and an open can receptacle 52. The middle tray 40, and its operation, are more fully discussed below.

A front side view of the bottom tray 10 and the middle tray 40 is shown in FIG. 2B. As can be seen a can opener 46 is located vertically above the panel 16 (panel 16's first position) and is located to interact with and remove a lid of a can (not shown).

Once a lid has been removed by the can opener 46, the can opener 46 is configured to hold the lid for a period of time, for at least the time panel moves from the first position (FIG. 2B) to the second position (FIG. 2C). The lid can be held in position, against the can opener in any suitable way, such as through application of suction and/or magnetism or any other suitable mechanical means, such as by puncturing, a gripping arm, clamps, etc. Once the panel 16 is located at the second position in FIG. 2C, the lid is released from can opener 46 and falls vertically down towards the lid receptacle 24.

FIG. 2D is a left side view of the feeding system 1. As can be seen, the full can receptacle 50 includes one or more full cans 53 (in this embodiment, for example, 7 cans). In this application, a "full can" refers to any suitable can, of any suitable size, that has a lid that can be removed with a can opener.

Optionally, the sides of the can receptacle 50 may contain moving bumpers under tension that assist with the refill of the cans by slowing the fall of the cans down the receptacle. In addition, these bumpers may be used to sense the size of the can and communicate such information to a processor of the feeding system 1. Alternatively, the full can receptacle 50 and the open can receptacle 52 may be opened sideways to allow manual stacking and removal of cans, instead of having cans slide in and out from the top and/or bottom.

In FIG. 2D, the full can 53 is moved from the full can receptacle 50 onto the panel 16 by a motor (now shown) pushing (or pulling) the full can 53 in the direction of arrow 54. The bumpers 18 then move to contact the can, the can opener 46 then removes the lid, the panel 16 moves to the second position, and the lid is released from the can opener 46 into the lid receptacle 24.

Figure 2G:
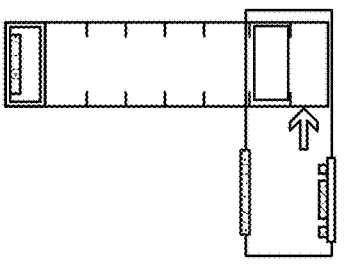
Figure 2F:
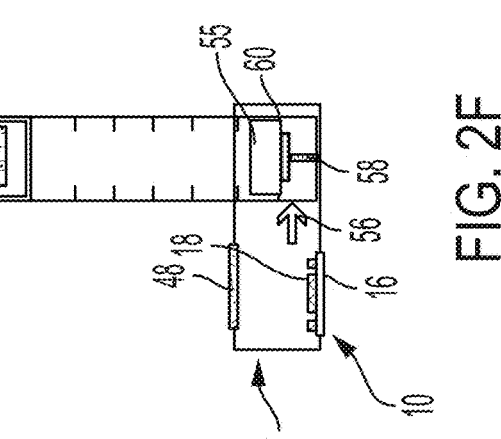
Figure 2E:
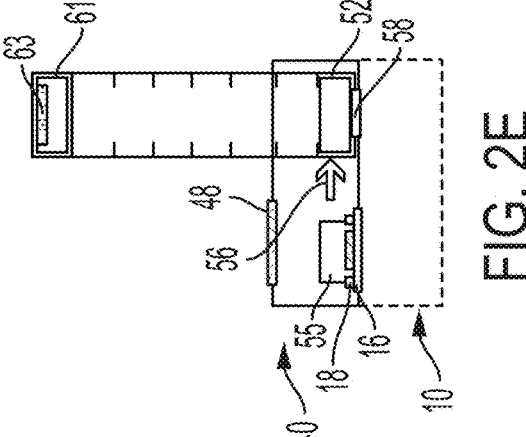

The panel in the second position is shown in FIG. 2E, which is a right side view of the feeding system 1. In this position, the lid 48 can move, allowing access to an opened can 55 from outside the feeding system 1. In this application, an "opened can" refers to any previously "full can", which has had a lid removed, regardless of the volume of contents within the opened can.

In FIG. 2E, at the very top of the open can receptacle 52 is a handle 61. The handle 61 can be fixed, or it may fold down.

On the inside (or on top or around the proximity of the handle) of the handle 61 is a button 63, which may be activated by a user's hand. The button 63 is operatively connected to a plurality of one way valves 60, further described below. When the button 63 is pressed, each of the one way valves 60 will pivot upward, downward, sideways or retract in any way to allow the cans to exit the open can receptacle 52.

Further, the open can receptacle 52 is connected to the feeding system 1 by a thread and screw interaction between the bottom of the open can receptacle 52 and the feeding system 1. The open can receptacle 52 can be removed from the feeding system 1 by grasping the handle 61 and twisting it in a counter-clockwise direction as compared to the feeding system 1. Alternatively, the open can receptacle 52 can be connected to the feeding system 1 by a locking mechanism that can be released when one or more buttons and or levers are pulls or pushed.

After a period of time (or by a time range programmed into the feeding system 1 or by a manual control through an application connected through the internet to the feeding system 1 or by a physical button on the feeding system 1), the lid 48 is closed, and the opened can 55 is moved in the direction of arrow 56, into the open can receptacle 52. Once in open can receptacle 52, the opened can 55 is moved vertically upwards by a piston 58, which extends (as shown in FIG. 2F) and contacts a bottom surface of the opened can 55, causing the opened can 55 to move past one of the one way valves 60. The piston 58 then retracts, while the opened can 55 is maintained vertically above the one way valve 60, as shown in FIG. 2G Each of the one way valves 60 can be configured to be at any suitable location within the open can receptacle 52 and can be formed of any suitable material. Also, the number of one way valves 60 shown in the figures is for illustrative purposes only, the feeding system 1 can include more or less of these one way valves 60.

Once another opened can 59 is ready to enter the open can receptacle 52, the next opened can 59 is moved in the direction of arrow 56, the piston 58 extends, the next opened can 59 is moved vertically upwards and contacts both the bottom surface of the first opened can 55, and the one way valve 60, causing the first opened can 55 to move upwards and be maintained by the next one way valve 60 (or by the next opened can 59) and the next opened can 59 to be maintained above the first one way valve 60. The piston 58 then retracts, so that the first opened can 55 and the next opened can 59 are both maintained within the open can receptacle 52, as seen in FIG. 21. This process can be repeated for each volume of space the open can receptacle 52 can accommodate.

FIGS. 3A-3D provide a more detailed view of the movement of the next opened can 59 of the embodiment. In each of FIG. 3A-3D, the upper panel is the right side view of the feeding system 1, while the bottom panel is a top view of the middle tray 40 of the feeding system 1.

Figures 3A, 3B, 3C:
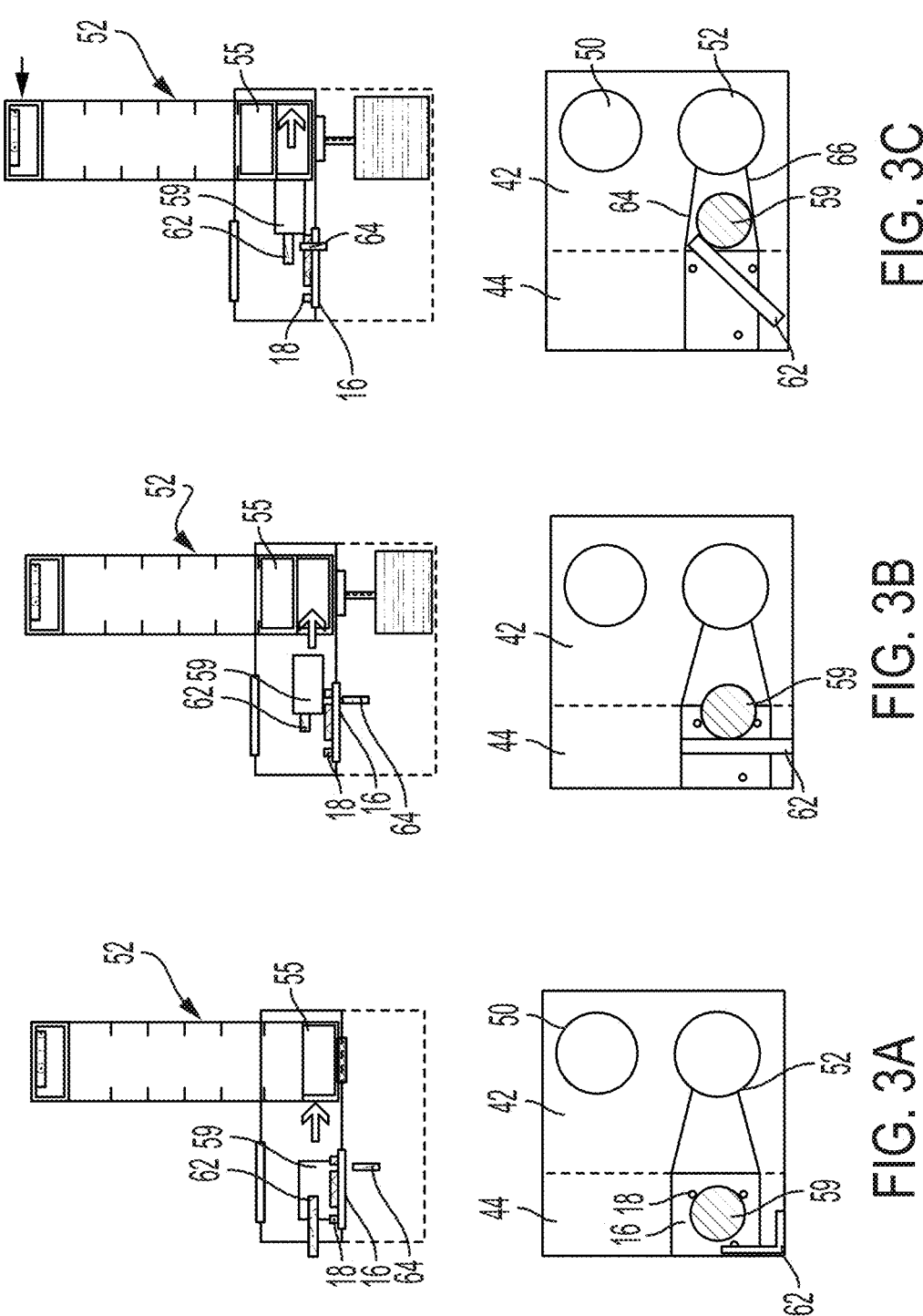
FIGS. 3A-3D are side and top views of an embodiment of the feeding system during operation.

In FIG. 3A an opened can 55 is already within the open can receptacle 52. After a period of time, the next open can 59 is to be moved to the open can receptacle 52. To effect this movement an arm 62 is rotated clockwise from a side of the middle tray 40. This arm 62 can be any suitable size and shape, and can include no, one, or more joints. As can be seen from the top panel of FIG. 3A, the arm 62 is configured to pass vertically over the bumpers 18, but still contact the next open can 59. In another embodiment, a hooked element (not shown) can be driven to hook around the opened can 55 and pull the opened can 55 into the open can receptacle 52. The hooked element can be placed either above or below the can 55.

FIG. 3B illustrates the arm 62 at about half way through its travel distance, as it continued to rotate in the clockwise direction, with the next open can 59 moved from its original location on the panel 16, towards the open can receptacle 52.

FIG. 3C illustrates the arm 62 at the end of its travel distance, which causes the next open can 59 to move beyond the bumpers 18, towards the open can receptacle 52. At this point, a tab 64 extends vertically upwards towards the next open can 59. The arm 62 can then be rotated counterclockwise back to the position seen in FIG. 3A. Referring again to FIG. 3C, the tab 64 contacts a side surface of the next open can 59, and then the tab 64 moves towards the open can receptacle 52.

Figure 3D:
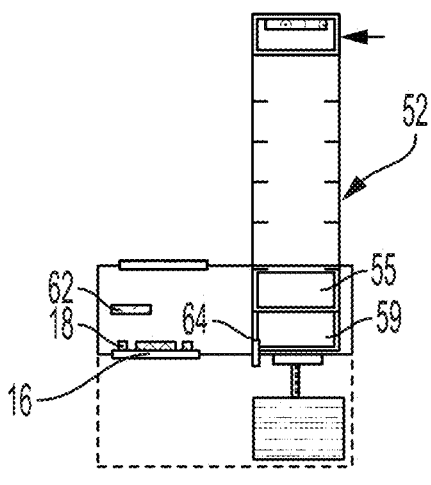

In FIG. 3D, the tab 64 has extended its travel distance and has caused the next open can 59 to enter the open can receptacle 52, with assistance by one or more optional guides 66. The tab can then return to the position seen in FIG. 3A.

Although not shown in the figures, the feeding system 1 can include several other elements, which can be incorporated in or near the feeding system 1 in any suitable way.

Some examples of these additional elements include a display screen and manual and/or touch screen buttons for control of various elements of the feeding system 1. In other embodiments, the feeding system 1 can include a camera and internet connection (wired or wireless) so that a user can access the camera from a remote location and view images or video of the feeding system 1 and its environment, including animals. This camera can be activated through an application or program, and can capture images and/or video at specified times or in response to a trigger (such as sensing of motion). Link can be established to activate the camera for live viewing, with or without the animal being present.

In addition to the camera, the feeding system 1 can include one or more speakers and one or more microphones to allow for capturing of sounds, as well as transmission of sounds from a user to the feeding system 1. Recordings of sound and voice may be added as well to allow users to customize messages to the pets.

Through wired or wireless internet access, the feeding system 1 can update the user when a feeding has occurred and may provide additional data collected with the sensors. Type of data collected and sent to the user may vary depending on software and user settings. Such information may be delivered through a specific app developed for the feeding system, by text, email and or other social media or communication preferences that the user may set up. Such data may also be accessible through the display located physically on the feeding system or available on a website portal and stored on the cloud.

Although the feeding system 1 described above is configured to open cans of food, the feeding system 1 can include additional, accessible receptacles for the dispensing of various dry foods, snacks, can extension chutes and/or water.

Various sensors within the feeding system 1 may also be optionally configured to gather data about the humidity level inside and outside the feeding system 1, temperature of the feeding system 1, feeding pattern of the animal, such as amount eaten/wasted, preferred flavor of food, how many times the animal eats and exactly when they fed, among others . . . etc.

Figure 4A:
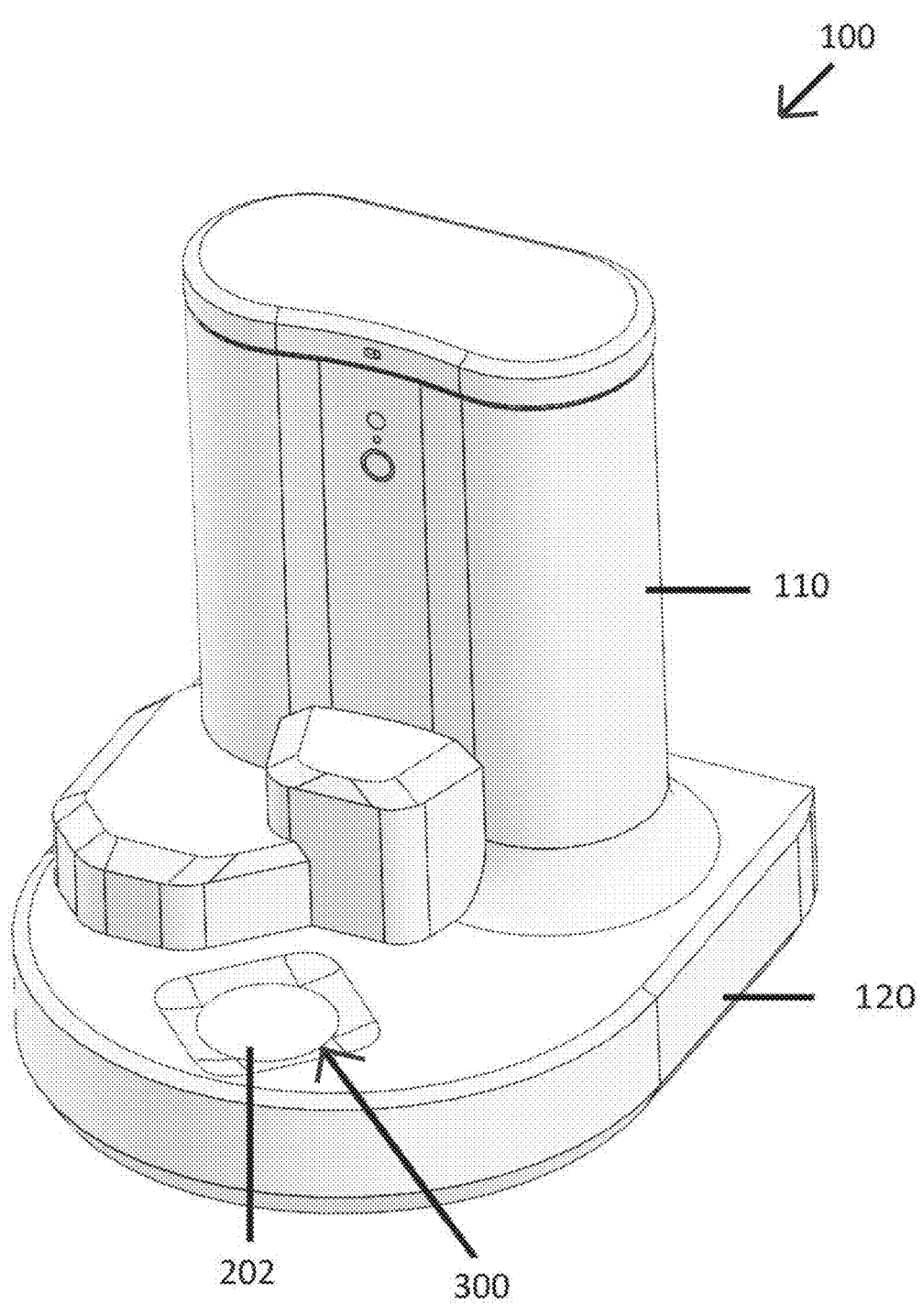
FIGS. 4A and 4B are perspective views of another embodiment of a feeding system.

Another embodiment of a feeding system 100 is shown in FIG. 4A. As can be seen, feeding system 100 is substantially circular (however any suitable shape housing and any suitable shape of the internal components could also be included) and can include several components. The feeding system 100 includes a suitable housing 110 formed of any suitable material (such as plastics, metals, glass, ceramic, rubbers, carbon based materials, and combinations thereof) and a base 120. The housing 110 can be formed of a single piece of material of a suitable shape, or several pieces of material that can be joined to each other in any suitable way. The housing 110 can include a housing opening 300, through which a can be exposed, as discussed below. The base 120 is configured to attach to and support the housing 110, as well as support the other components within the housing 110.

Figure 4B:
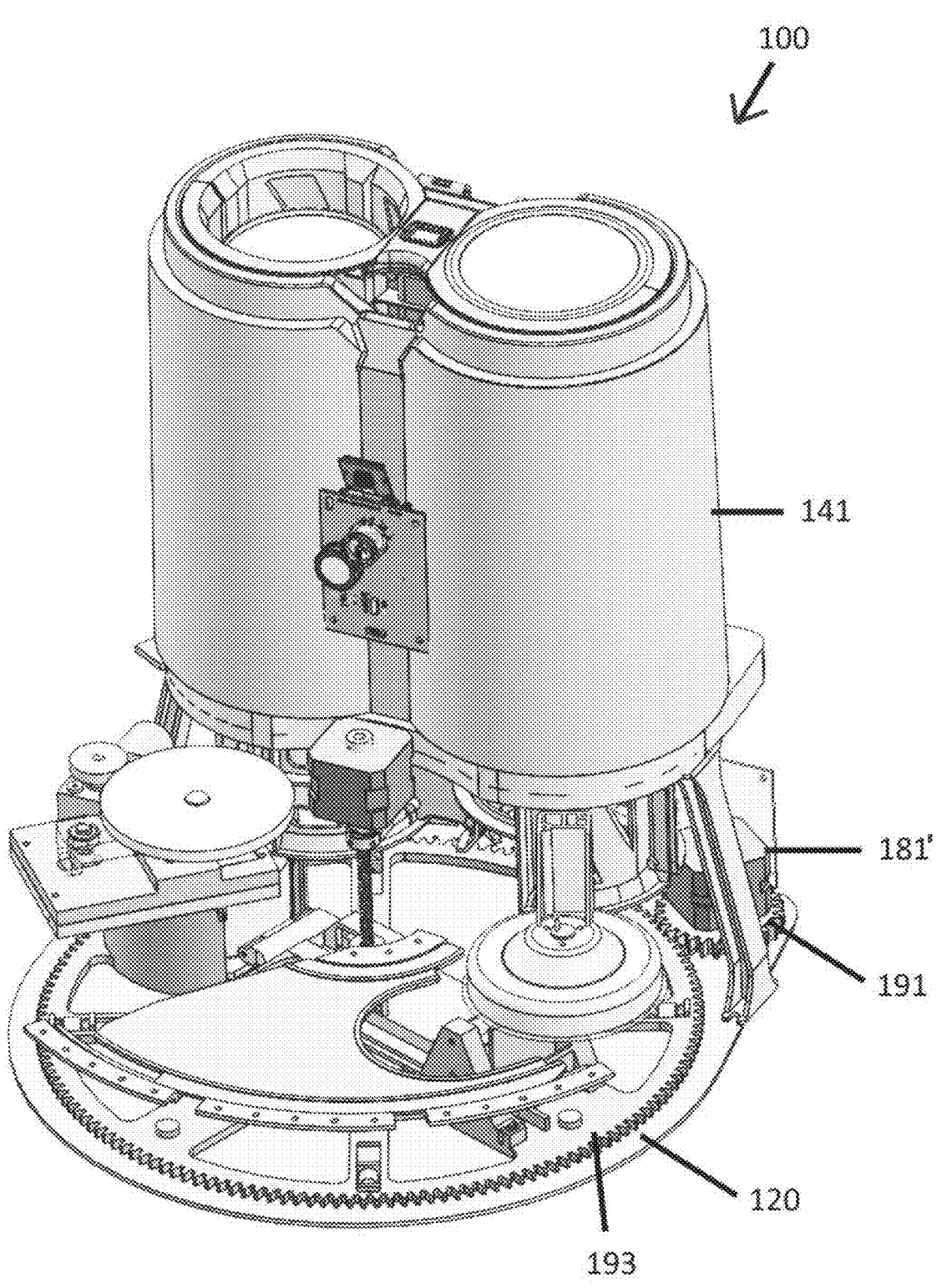

FIG. 4B illustrates the feeding system 100 with the housing 110 removed. As can be seen, several components are supported by the base 120, within the space enclosed by the housing 110. A chute housing 141 is shown, which contains a can chute (discussed in more detail below). The other individual components visible in FIG. 4B are discussed in more detail below.

Figure 5:
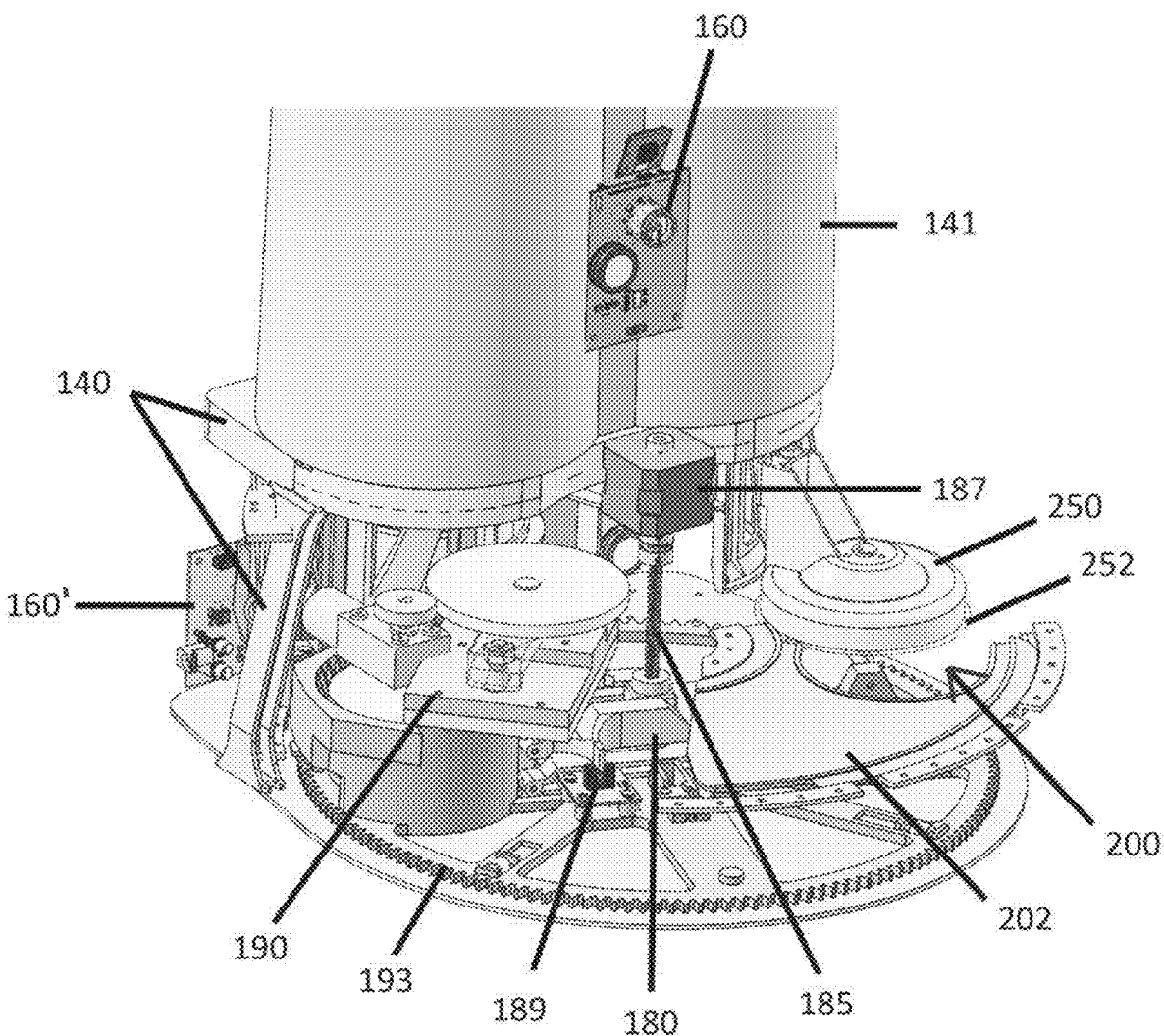

An enlarged view of the several components within the feeding system 100 is shown in FIG. 5. One component is a can chute 130 shown in FIG. 6A, which is supported through a can chute support 140 to the base 120. The can chute 130 can be at least partially or fully surrounded by a chute housing 141. The chute housing 141 can support various other elements of the feeding system 100, such as a control device 160, which will be described below. The can chute 130 can be formed of any suitable material (such as plastics, metals, glass, ceramic, rubbers, carbon based materials, and combinations thereof), and can be rinsed and/or be washable by a user and/or dish washing apparatus.

Figure 6A:
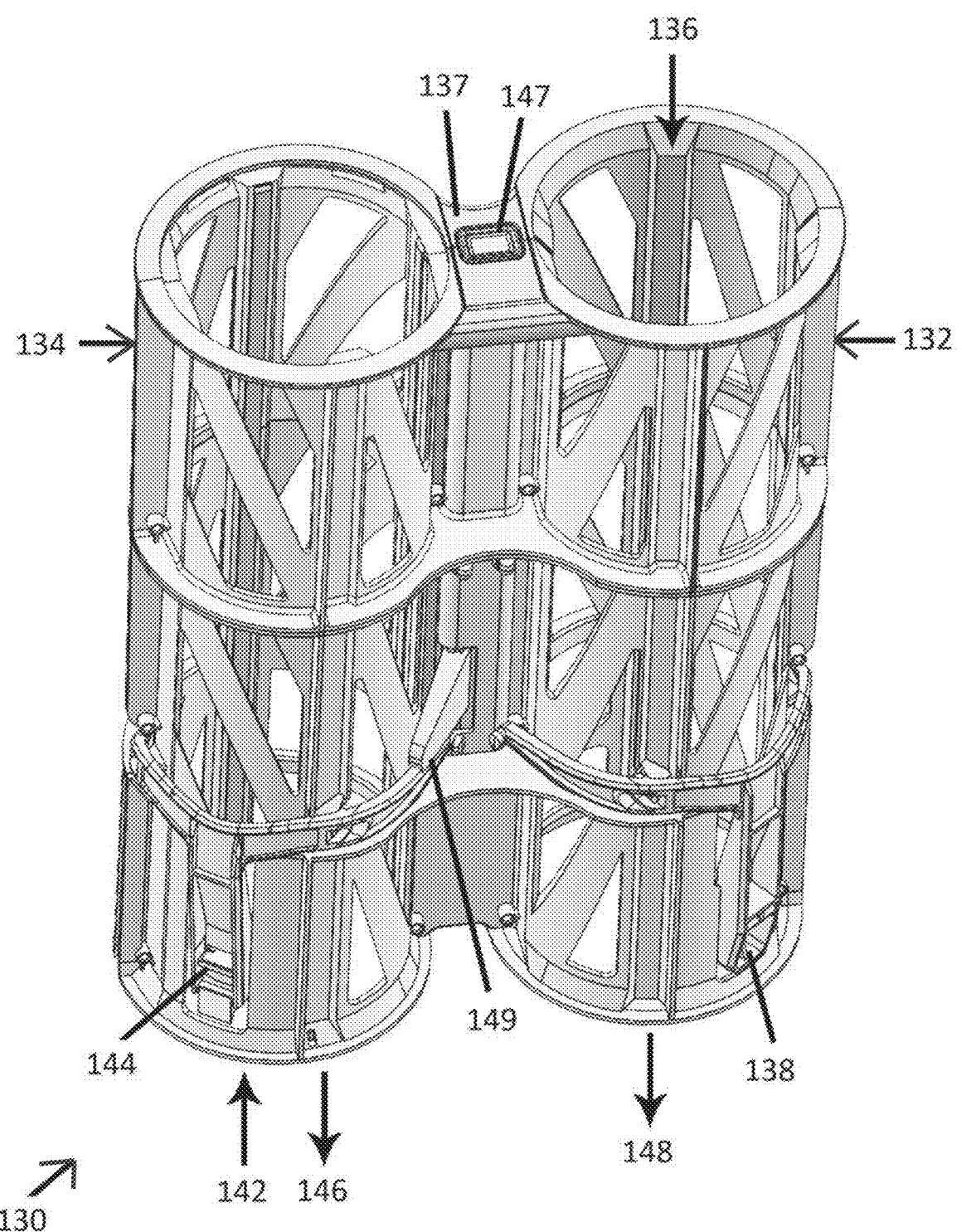

FIG. 6A shows the can chute 130 alone, upon a removal from the chute housing 141 and the feeding system 100. The can chute 130 includes a sealed can barrel 132 and a used can barrel 134. Each of the sealed can barrel 132 and the used can barrel 134 have a diameter that is dimensioned to contain any suitably sized can. In addition, one or both of the sealed can barrel 132 and the used can barrel 134 can accommodate a spacer (not shown) that can extend around a diameter of a can if that can has a diameter smaller than the diameter of one or both of the sealed can barrel 132 and the used can barrel 134. In some embodiments, one or both of the sealed can barrel 132 and the used can barrel 134 can be tapered, so that their diameter is smaller at one end as compared to the other. In another embodiment, the sides of the sealed can barrel 132 and the used can barrel 134 may be composed of multiple panels which allows them to expand and contract to accommodate any sized cans, including multiple different sized cans all at once.

Each of the sealed can barrel 132 and the used can barrel 134 have a length dimensioned to contain any suitably sized can. For example, each of the sealed can barrel 132 and the used can barrel 134 can be dimensioned to contain 1, 2, 3, 4, 5, 6, 7, 8, 9, 10, 11, 12, 13, 14, 15 or more cans stacked vertically. Two non-limiting examples of suitable cans are 5.5 ounce cans and 3 ounce cans. In an embodiment, the height of the sealed can barrel 132 can be at least 13.5" so as to accommodate placement of eight (8) typical 5.5 ounce animal food cans. As shown in FIG. 6G, the sealed can barrel 132 can include a large slot 135 located at the top that enables placement and addition of new cans from the side of the barrel. As further shown in FIG. 6G, at a side surface of the chute assembly, there is provided a release button 147 accessible by a user that can be pressed to release used cans from their respective used can barrel 134 using respective latching mechanisms. Pressing release button 147 caused movement of a rod that rotates the used can latch into a retracted position to facilitate release of the cans.

An example of the use of the can chute 130 is provided below. In this example the can chute 130 is completely empty of cans. As a first step, the can chute 130 is removed from the feeding system 100. The feeding system 100 may include a lid (shown in FIGS. 6B and 6C) attached to the housing 110, which substantially covers the can chute 130. The user then pulls a portion of the can chute 130 vertically and out of the feeding system 100. The user can then place a sealed can (not shown) into the sealed can barrel 132, in the direction of arrow 136, or alternatively, can place a sealed can through the slot or opening 135 at the side of the sealed can barrel. The sealed can then falls vertically down until it contacts a sealed can catch 138. The sealed can catch 138 sufficiently supports each of the sealed cans added to the sealed can barrel 132. A more detailed view of the sealed can barrel 132, from vertically above is shown in FIG. 6D. As shown in FIG. 6D, the sealed can barrel 132 can include at plurality of raised guide columns 131. In an embodiment, there are 4 raised columns 131 built into and protruding from the sidewalls in the interior that define the inside diameter of the barrel. This inside diameter could be almost any size to accommodate what is being stored. In an example embodiment, the effective diameter is about 3.400" to accommodate most of the available can sizes, without being so large and loose fitting that cans could twist and jam.

Figure 6B:
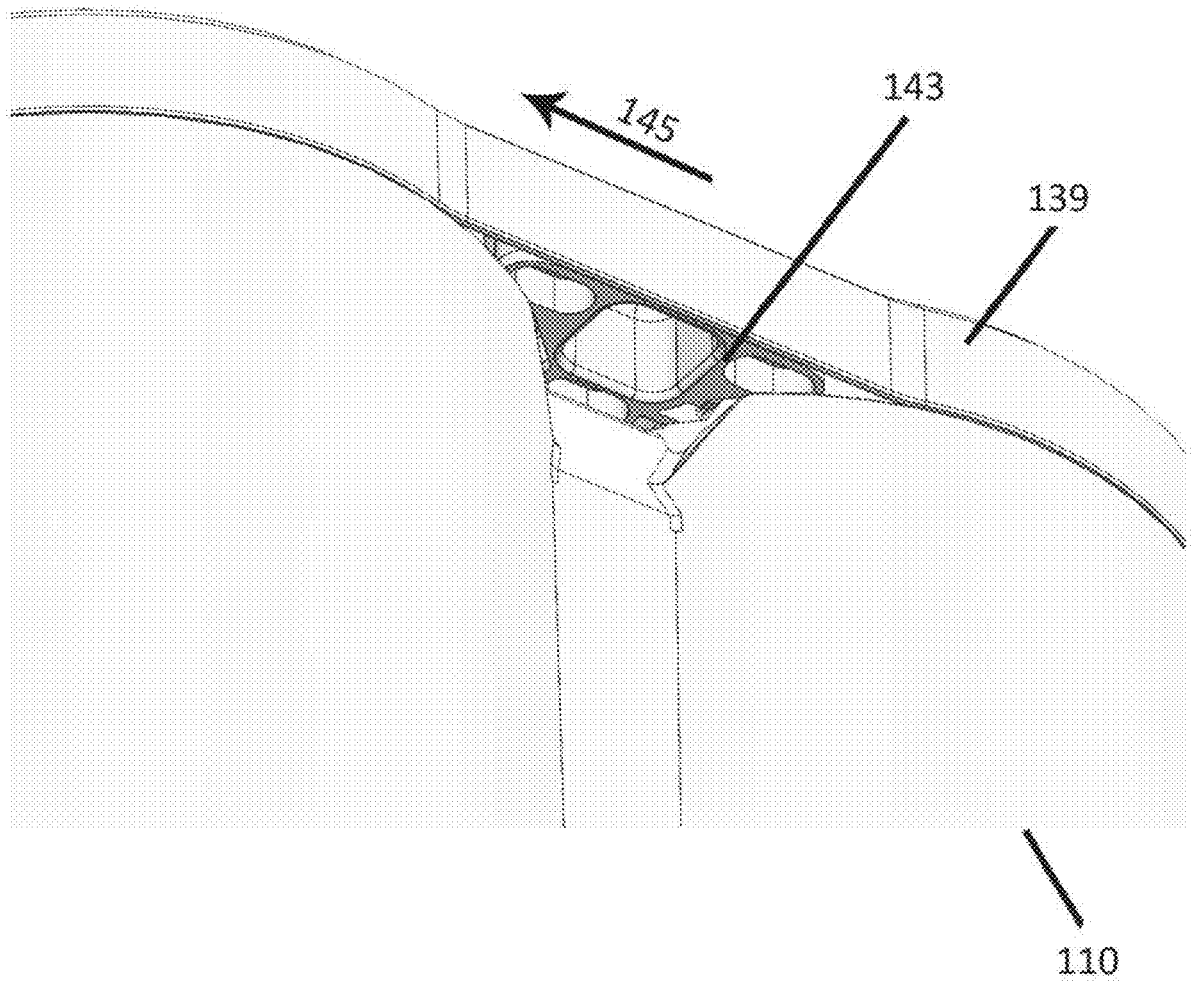
Figure 6C:
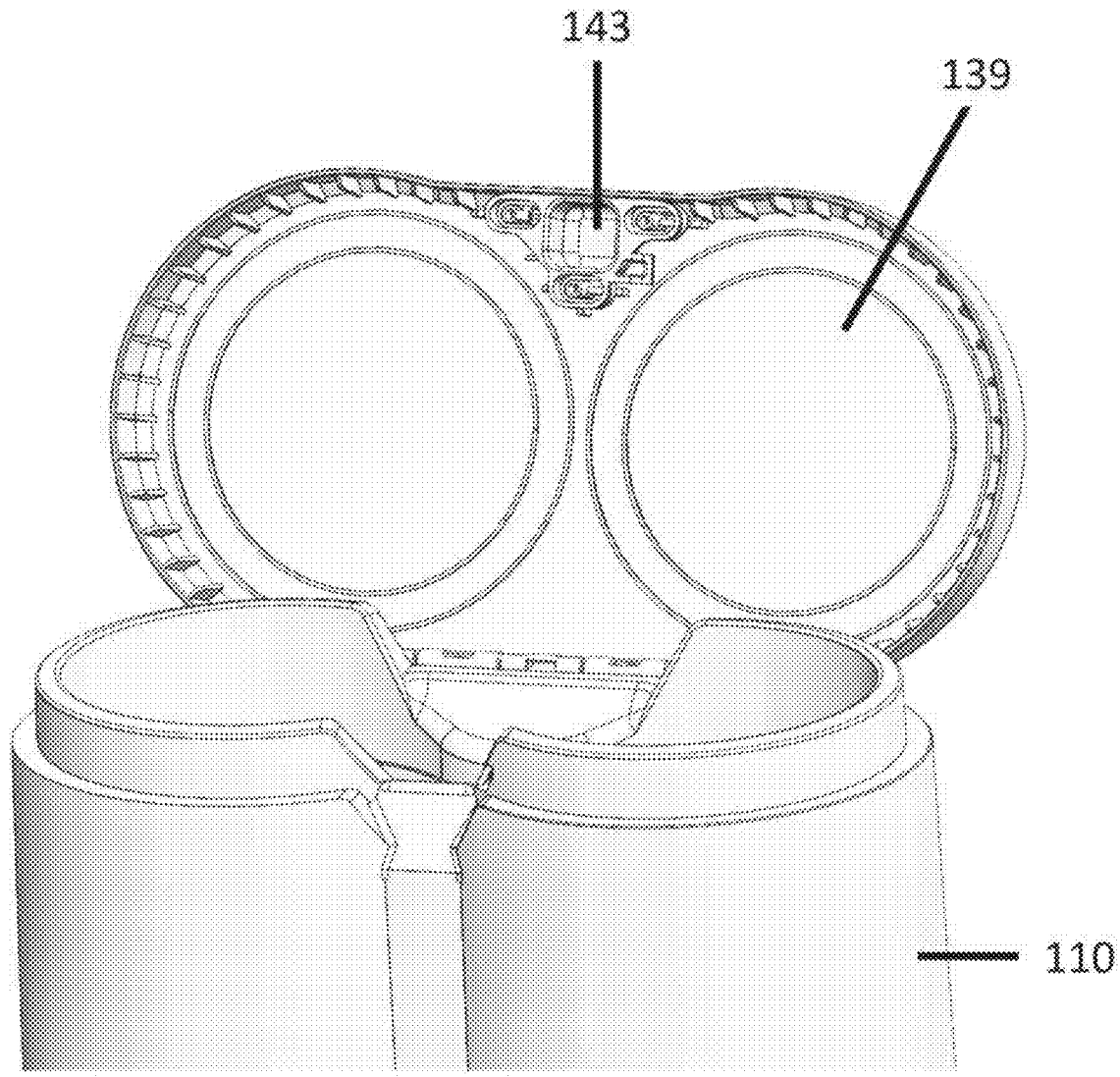

FIG. 6B is a view of the underside of the lid 139, in a closed configuration and in contact with housing 110. A lid latch 143 maintains the lid 139 in contact with the housing 110, by having a portion of the lid latch 143 in contact with a catch of the housing 110. A user can cause the lid latch 143 to slide in the direction of arrow 145, thereby disengaging the portion of the lid latch 143 in contact with the catch of the housing 110. The lid 139 can then be placed in an open configuration, shown in FIG. 6C. The lid being in the open configuration shown in FIG. 6C allows for access by the user to the can chute 130.

Figure 6E:
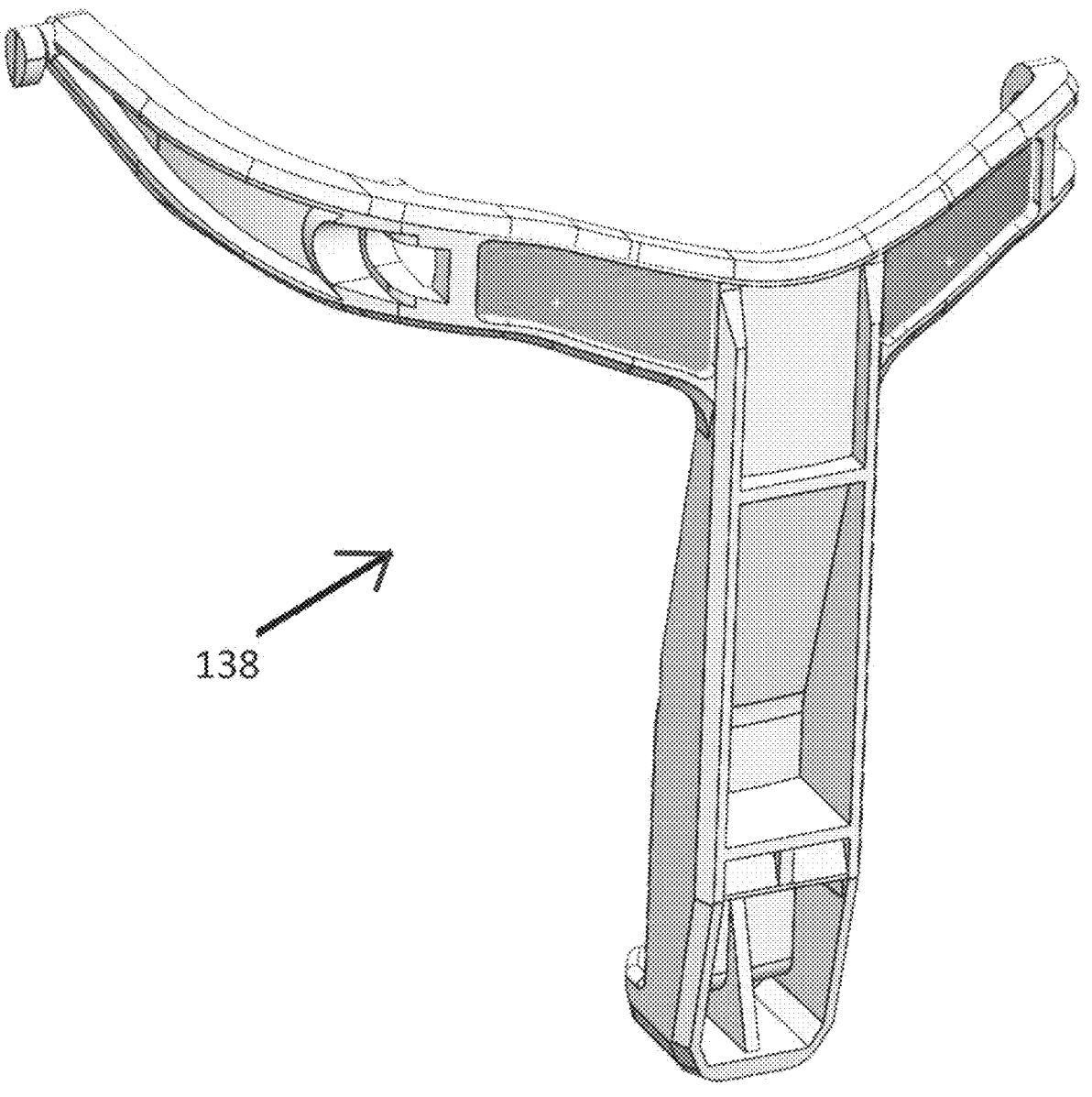
Figure 6G:
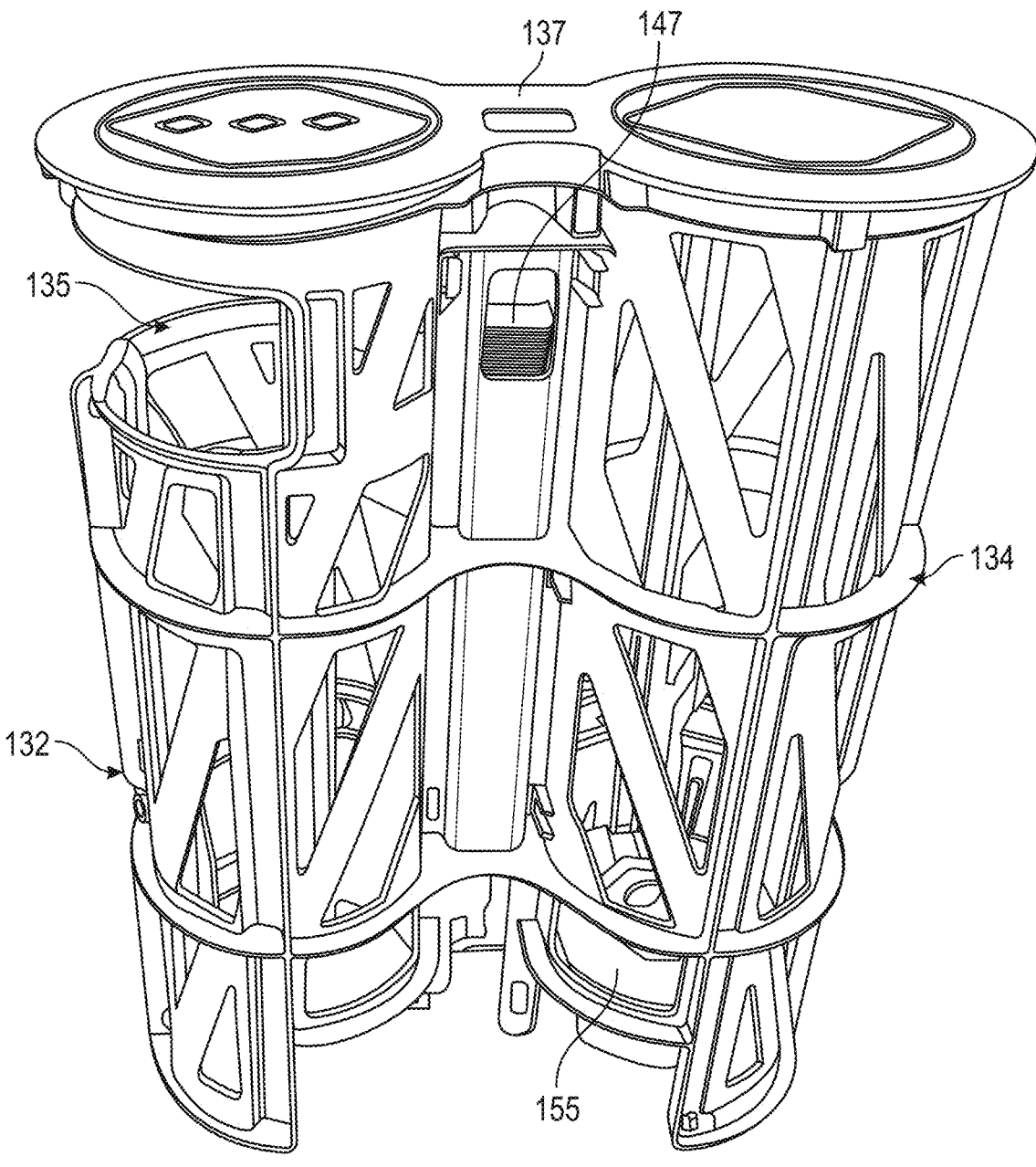

In some embodiments, the sealed can catch 138 can include a shock absorbing element, a curvature designed into the element, which can be configured to absorb at least some of the impact of adding cans in the direction of arrow 136. The sealed can catch 138 is shown separately in FIG. 6E.

Another example of the use of the can chute 130 is also provided. In this example the used can barrel 134 has received one or more cans in the direction of arrow 142 and are resting on used can catch 144 (this receipt of used cans will be described in more detail below). A more detailed view of the used can barrel 134, from vertically above is shown in FIG. 6F. Referring to FIG. 6F, along the length of the used can barrel 134 and lining the interior of the barrel are a plurality of hard rail structures 133 that are provided to ensure that the sharp edge of an opened can will not dig into a softer material like plastic and cause the can to jam as it is being pressed up into the tower. In an embodiment, there are four (4) hard rail structures 133 aligned and extending along the interior of the used can barrel 134. In an embodiment, each of the hard rails 133 can be made of steel. The inside diameter of used can barrel 134 is such to accommodate cans that are being stored and in one embodiment, and can range from about 3.30"-3.5" in diameter for accommodating standard 5.5 ounce cans. In an embodiment, the used can barrel height can be almost any height, but in an embodiment can be about 13.xx" so as to accommodate a stack of eight (8) typically-sized 5.5 ounce cans.

Referring back to FIG. 6A, as a first step, the can chute 130 is removed from the feeding system 100 by a user. The user will open the lid 139 and pull the can chute 130 out by its handle 137. The can chute 130 can then be held over a garbage receptacle, and a can release button 147 is pressed by the user. Pressing the can release button 147 causes release lever 149 to move vertically downward and contact used can catch 144. This contact causes used can catch 144 to move horizontally away from the interior of used can barrel 134, and the one or more used cans within the used can barrel 134 fall vertically down and out of the used can barrel 134, in the direction of arrow 146. Now that all used cans are removed, and used can barrel 134 no longer contains any used cans or lids. The user can load new sealed cans into the empty sealed can barrel 132 and the can chute 130 can be placed back into the feeding system 100. The can chute 130 will slide into the can chute housing 141. The can chute housing 141 may be straight or may be tapered at the bottom to guide the can chute 130 in with ease. In an alternate embodiment, as shown in FIG. 6G, the can release button 147 is located below handle 137 at a side surface of the chute assembly 130.

FIGS. 6H-6I depict, with more particularity, the operation of a used can latch assembly 170 at the bottom of the used can barrel 134. Used can latch assembly 170 is retractable and includes an L-shaped used can latch lever portion 171 pivotable about pivot pin 172 and having an extended bottom catch portion 144 (not shown) in a first retracted position to physically support and retain the stack of used can(s) (not shown) within the used can barrel 134. FIG. 6I shows the used can latch assembly 170 with L-shaped used can latch lever portion 171 including the extended foot portion 144 in a second extended position responsive to the pressing of release button 147 which causes release lever 149 to move vertically downward and contact used can latch lever portion 171 causing the used can latch assembly 170 to pivot which causes a horizontal retraction of the extended bottom foot portion 144 from the barrel 134 to drop or release used cans from the stack of sealed cans that had been previously supported within the used can barrel 134.

Similarly, FIGS. 6J-6K depict the operation of the sealed can catch 138 at the bottom of the sealed can barrel 132. In an embodiment, sealed can catch 138 includes a cam-follower assembly (not shown) that can pivot the sealed can catch 138 to extend to support a sealed can and retract to release a sealed can each by cam operation. As shown in FIG. 6J, sealed can catch 138 includes an L-shaped sealed can latch lever portion 151 pivotable about pivot pin 152 and having a top catch portion 154 and an extended bottom foot portion. The lever portion is configurable in an extended position to physically support and retain the stack of sealed can(s) (not shown) within the sealed can barrel 132 by cam operation. FIG. 6K shows the sealed can catch 138 with L-shaped sealed can latch lever portion 151 including the extended foot portion 153 in a position to release a sealed can currently being supported by the sealed can catch 138. Retraction of the sealed can catch 138 is in response to engagement of a cam-follower (not shown) attached to the sealed can catch 138 with a cam member mounted at the surface of the rotating carousel (not shown). That is, by cam-operation the sealed can catch 138 responsively pivots to cause a retraction of the extended bottom foot portion 153 from the sealed can barrel 132 to drop or release a bottom-most sealed can from the stack of sealed cans that had been previously supported within the sealed can barrel 132.

Referring again to FIG. 5, can chute 130 can be seen, with the exterior of each of the sealed can barrel 132 and the used can barrel 134, both visible below the can chute housing 141. A can enters the interior of the feeding system 100 by exiting the bottom of the sealed can barrel 132 (in the direction of arrow 148 of FIG. 6A) onto a support arm 180 (which is further described, and illustrated, below), while the support arm is in a first position.

Referring back to FIG. 6L, there is depicted provision of a slide cap 155 which is a cup-like component that is located within the used can barrel 134 and free to slide in an up and down direction 157 in the used can barrel 134. As used cans are added to the used can chute 134, the slide cap 155 moves up, sitting on top of the top can. Its weight presses down on the used cans to help keep the bottom can horizontal. As shown in FIG. 6M, a first used can 156 is depicted as partially fitting inside the slide cap 155. The slide cap is of a material that provides a slide cap weight sufficient to press down on the used cans and their lids to help keep the bottom can horizontal. In view of FIG. 6M, with the slide cap's weight pressing on the cans, the bottom can 156 is unlikely to droop thereby reducing the possibility of the can's contents spilling. The weight of the slide cap 155 also helps to move all of the cans and lids down and out of the chute when the latch has been retracted by pressing the "release" button 147. Depending on the can type, and the quality of the cut, there can be additional friction, especially between the lids and the metal rails in the chute, and the downward force that the slide cap delivers can overcome this friction and ensure that the cans and lids leave the chute assembly.

Figure 13A:
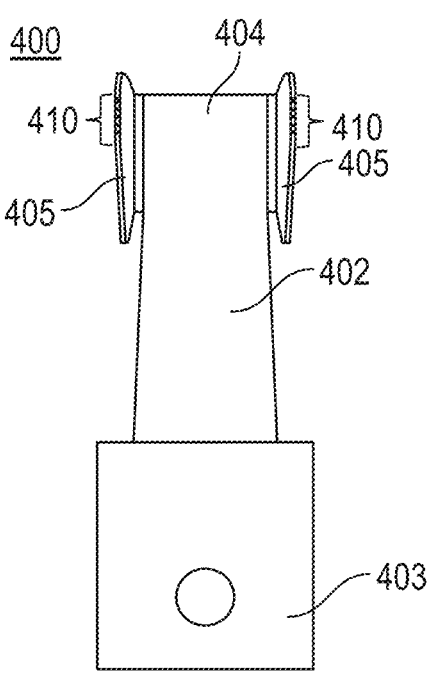
FIGS. 13A-13C depict various views of the sealed can retainer device.

FIG. 13A depicts a front elevation view of a cam operated retainer device 400 which is a component proximate the sealed can chute 132 that allows the sealed can chute to consistently dispense one can at a time, even when there are many cans stacked above it. The retainer device 400 is a structure including a planar portion 402 that includes, at a distal end 404, two small retaining structures 405 (alternatively referred to as arms or blades), each arm having a front facing edge with teeth 410, the arms being spaced apart and configured to dig into the sidewall of cans for can retention and can be released when needed. The planar portion 402 of retainer device 400 shown in FIG. 13A is primarily a flexible flat panel section of spring steel with a proximal end 403 engaged with a rotating base (not shown). In an embodiment, the distal end 404 is formed in a U-shape to provide two spaced-apart saw blade-like arms 405 that can resist the downward motion of a can but will release when the base is rotated in a way that moves the distal end 404 away from the can.

Figure 13B:
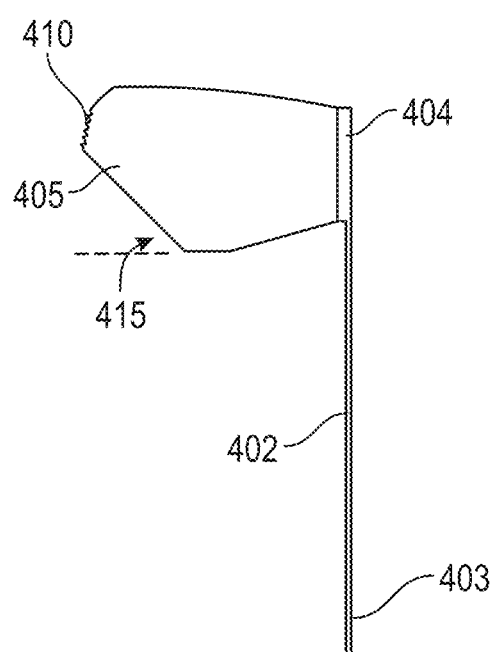

FIG. 13B depicts a side view of the retainer device 400 of FIG. 13A, the retainer's toothed arms 405 have multiple teeth 410 angled at the blade edge to maximize grip on the can. They also are shaped with a radius at the top to minimize the likelihood of getting stuck on a can, or interfering with cans that are sliding past it as it is being released. In particular, a saw-toothed blade edge 415 is an angled edge or radius below the teeth 410 to ensure that the retainer 400 does not catch on an edge when removing the chutes from the housing, or when lifting a can up into the sealed can barrel during weighing.

Figure 13C:
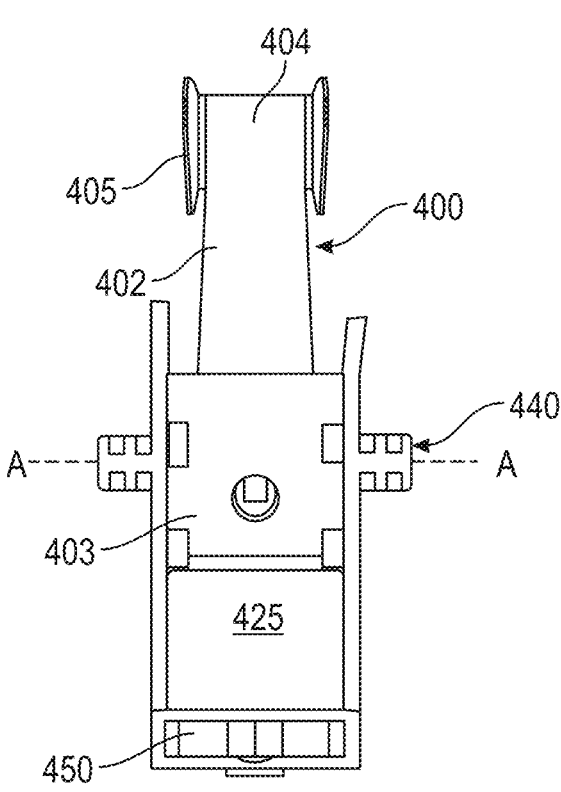

FIG. 13C depicts a front elevation view of the retainer 400 mounted on a pivotable base support structure 425 including a shaft or pivot pin 440 for pivotable motion about an axis A-A and including retaining structures 405 for engaging/retaining a can in a fixed position within the sealed can barrel when in an extended position and releasing the can when in a retracted position. The base support structure 425 includes a transverse-oriented (horizontal oriented) cam follower such as a roller 450 that is mounted to and protrudes from a lower end thereof. The roller 450 is a cam follower which rides along the cam structure having a profile that can drive the pivoting of the base structure 425 and consequently drive the extending and retracting of the retainer device 400 at specific times.

Figures 14A, 14B, 14C, 14D:
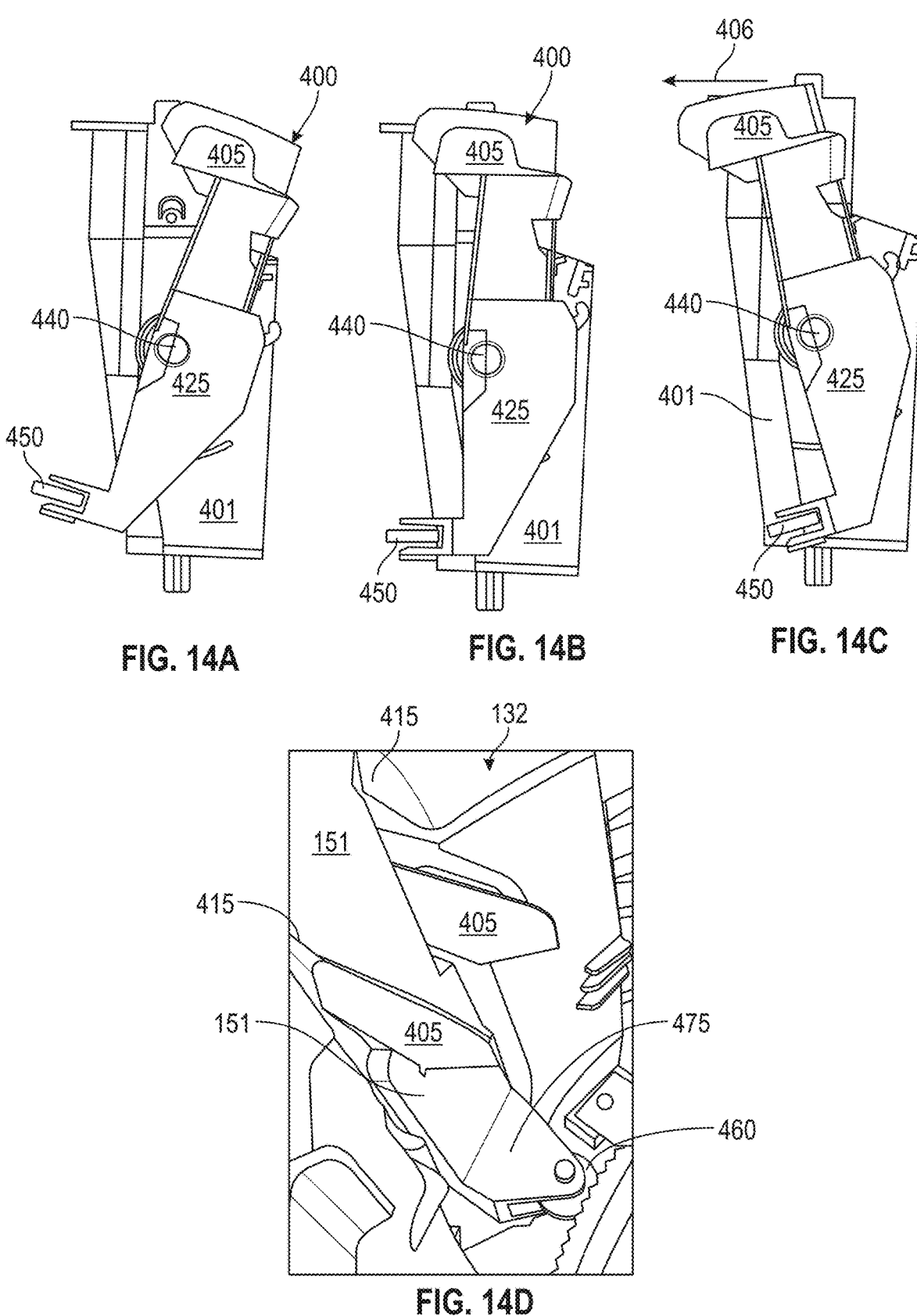
FIGS. 14A-14C depict various views of the sealed can retainer device from retracted to extended positions according to an embodiment.
FIG. 14D shows the retainer device blades in an extended position through respective openings or slots in the sealed can barrel chute according to an embodiment.

FIGS. 14A-14C depicts cam-induced operations of the retainer device 400 for retaining a sealed can when dispensing another underlying can. In FIGS. 14A-14c, the retainer device 400 is rotatably mounted on a support structure 401 located at the sealed can chute assembly in a manner such that the U-shaped tooth-edged blades 405 can be rotated to extend within the sealed can barrel of the chute assembly for can retention. In a first phase of operation, as shown in FIG. 14A, the cam follower or roller 450 fully extended and the U-shaped blades 405 of retainer 400 is fully retracted. In FIG. 14A, the cam follower 450 is not engaging a cam. FIG. 14B depicts the cam follower roller 450 engaging a portion of a cam (not shown) having a profile that causes a partial rotation of the base 425 about pivot pin 440 to thereby extend the U-shaped blades 405 of retainer 400 in preparation to retain a sealed can when dispensing an underlying sealed can. FIG. 14C depicts the cam follower roller 450 engaging a portion of the cam having a profile that causes the U-shaped blades 405 of retainer 400 to fully extend by rotating in a direction 406 into the side of a can to engage the can by pressing the toothed edges into the side of the can to prevent downward motion of the can and retain the sealed can in a fixed position when dispensing an underlying sealed can to the feeder base. Here, the bottom of the retainer's rotating base is pushed by the cam to the position shown to cause the retainer saw teeth to move into the side of the can. FIG. 14D shows the extension of the blades 405 having toothed edges within respective openings or slots 415 in the sealed can barrel chute 132 in the configuration for retaining a sealed can(s) (not shown) while an underlying bottommost can (not shown) is being held for release by the sealed can catch 138. Shortly after the U-shaped blades 405 of retainer 400 are extended to engage the side of a can, the underlying sealed can catch 138 is retracted so that the underlying bottommost sealed can currently held by the catch 138 can be released for can opening/further processing. This is achieved by a cam follower assembly attached to the sealed can catch 138 at a bottom portion thereof that engages a cam member surface (not shown) to pivot the sealed can catch 138 when releasing a sealed can. As shown in FIG. 14D, the cam follower assembly includes an extension member 475 connecting the lever portion 151 that holds a horizontally-oriented wheel or roller 460 adapted to engage the cam member surface for controlling the sealed can catch 138.

Figure 15:
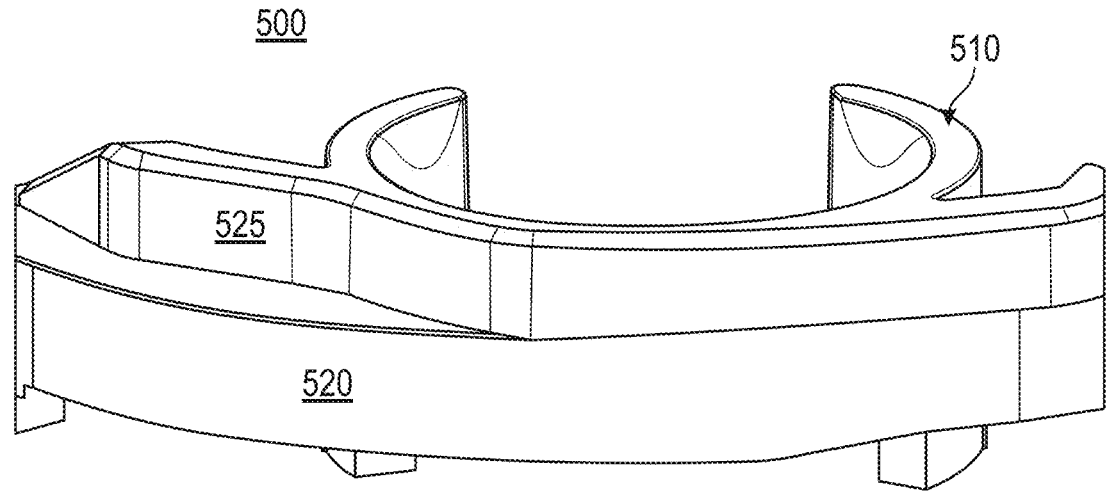

FIG. 15 depicts a cam 500 that is mounted on a top surface near the perimeter of the rotating carousel at the base of the feeder assembly and configured for operating both the sealed can catch 138 and sealed can retainer device 400 without use of extra motors or solenoids or electronics processing. As the base carousel of the feeder rotates clockwise, the carousel-mounted cam 500 rotates with it with cam surfaces exposed to engage cam-follower elements. As shown in FIG. 15, the cam 500 includes a receiving portion 510 in the shape of a can receptacle for receiving a can, e.g., when released from the sealed can chute onto a platform surface of a lifter arm (not shown). The cam 500 has an outer surface portion in the form of two cam layers 520, 525 each having a different cam surface profile for performing different actions in the assembly. A first layer or lower cam 520 has a cam surface profile configured to control the actions of the sealed can retainer device 400 while a second layer or upper cam 525 has a cam surface profile configured to control the sealed can catch 138 used for retaining/dispensing a sealed can from within the chute barrel. The cam follower associated with the retainer device 400 is configured to engage a surface of the lower cam 520 having a surface profile for operating the retainer device 400 as the carousel rotates. A further cam follower associated with the sealed can catch 138 is configured to engage the second cam surface 525 as the carousel rotates. The second cam surface 525 is of a surface profile causing latch to retract to dispense a sealed can(s) underneath the sealed can being retained by the retainer device at the sealed can barrel 132.

FIGS. 16A-16F provide top-down, cross-sectional view depicting a progression of cam-controlled operations for controlling timing of both the sealed can latch and retainer device timed when releasing a sealed can at the sealed can barrel.

Figure 16A:
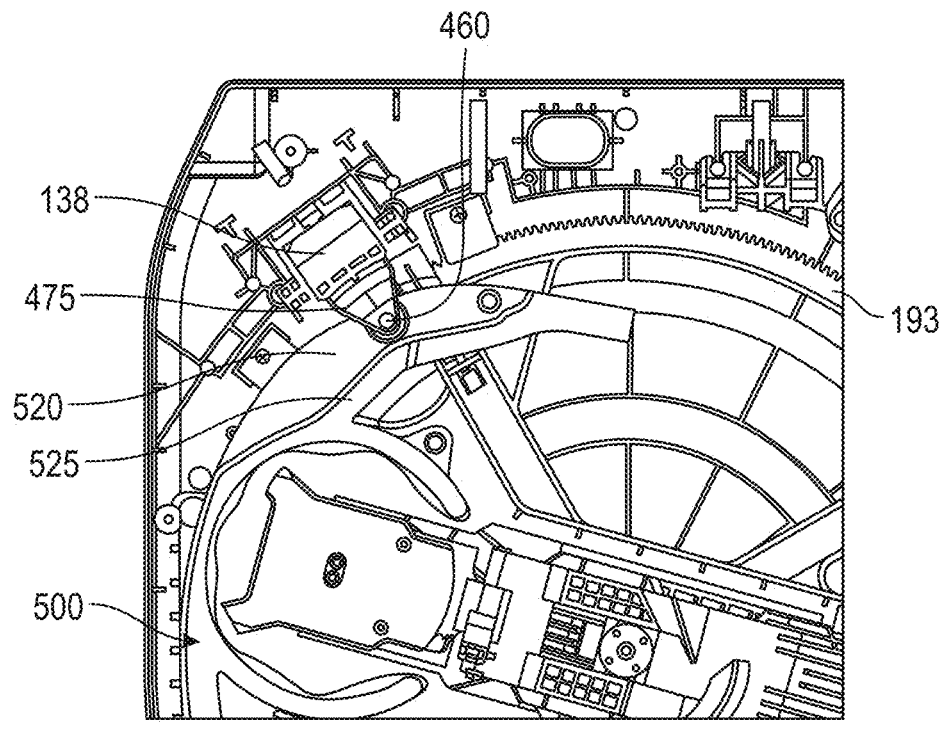
FIGS. 16A-16F provide top-down, cross-sectional view depicting a progression of of cam-controlled operations for controlling timing of both the sealed can latch and retainer device timed when releasing a sealed can at the sealed can barrel.

FIG. 16A particularly depicts a top down view showing an example positioning of the cam 500 mounted on surface of a rotating carousel 193. In the position shown in FIG. 16A, a cam follower 460 (e.g., latch roller) of the sealed can catch 138 engages the surface of upper cam 525 to extend the latch to support one or more sealed cans in sealed can barrel 132. In a carousel position shown in FIG. 16B, which is identical to the position shown in FIG. 16A, the cam follower 450 (e.g., retainer roller) of the sealed can retainer device 400 engages the surface of lower cam 520 to extend the U-shaped blades with toothed-edges to retain a sealed can(s) situated above the can to be dispensed from sealed can barrel 132 that is currently supported by the catch 138 as shown in FIG. 17A.

Figure 16B:
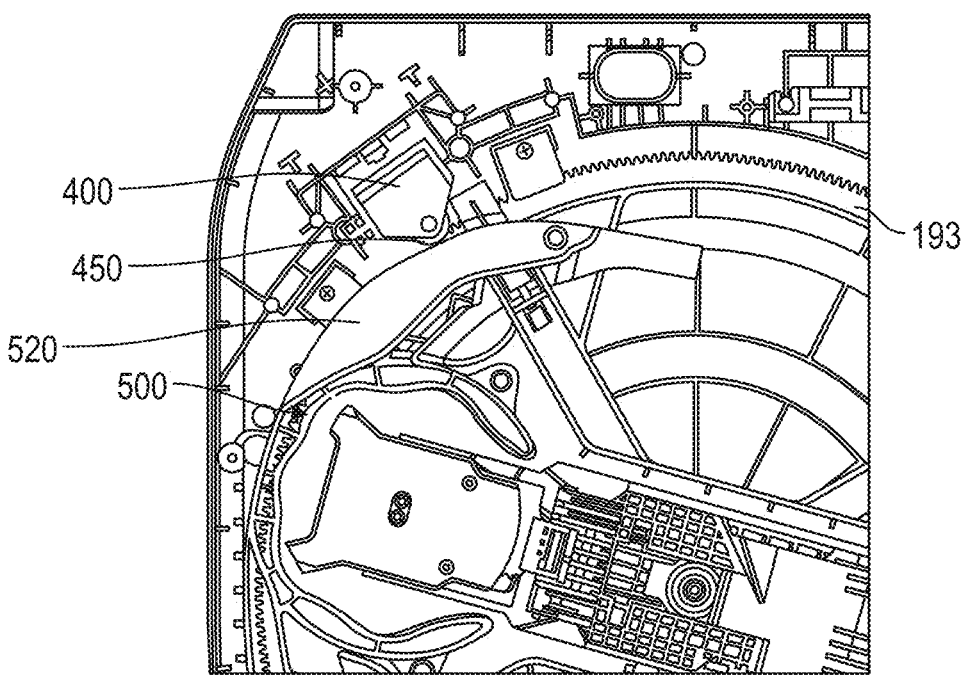
Figure 17A:
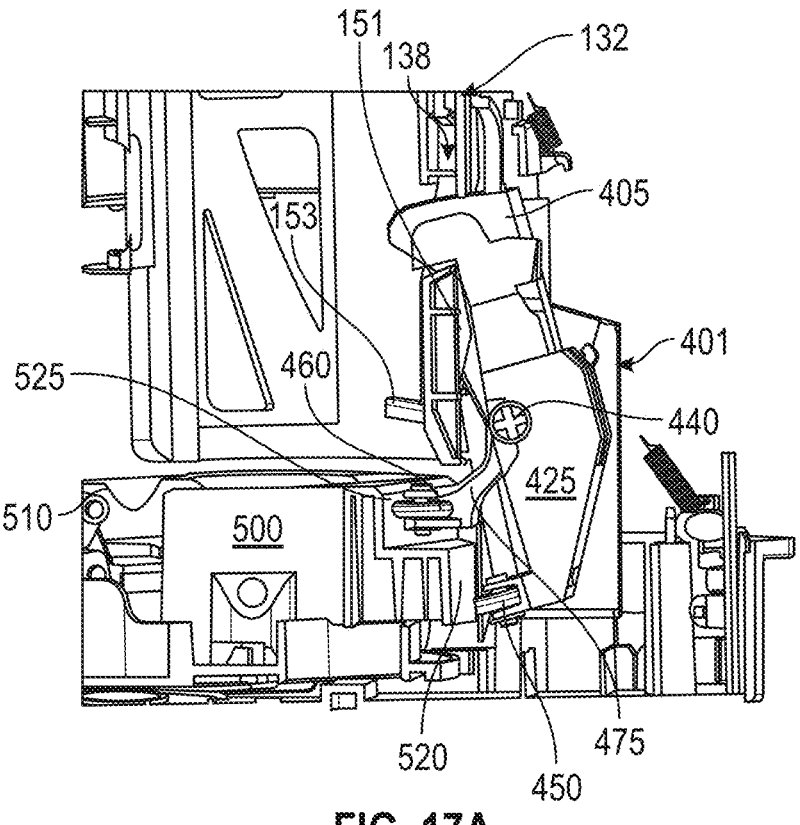
FIGS. 17A-17C depict side elevation views depicting operating states of both the cam operated sealed can retainer and sealed can latch operations at the sealed can barrel 132.

FIG. 17A is a side elevation view depicting both the state of the cam operated retainer device and latch in a process for dispensing a sealed can (not shown) corresponding to the position of the carousel 193 and cam 500 as depicted in FIGS. 16A-16B. In this state, the sealed can latch is engaged with the cans and constitute a position when the cam surfaces are not engaging with the rollers on the bottom of the can latch and retainer. No cans are being dispensed from the chute in this state. As shown in FIG. 17A, the sealed can latch 475 used for holding a single can or stack of sealed cans in chute barrel 132 is operatively connected to the cam follower (latch roller) 460 by a steel spring or similar linkage 475. In an embodiment, the cam follower includes a transverse-oriented roller device 460 for engaging a surface profile of the upper cam 525. In the position indicated, the cam surface 525 is such that the sealed can catch 138 is fully extended to support a sealed can (not shown) it is current supporting to be dispensed. As further shown in FIG. 17A, the U-shaped, saw-toothed edge blades 405 of retainer device 400 is operatively connected to the cam follower 450 by the spring steel panel portion 402 and base support structure 425. In an embodiment, the cam follower includes a roller device 450 engaging a surface profile of the lower cam 520 while the carousel is rotating. In this position, the cam surface 520 is such that the retainer blades 405 are fully extended to support a can or stack of can(s) above the sealed can that is to be dispensed from chute barrel 132.

Figure 16C:
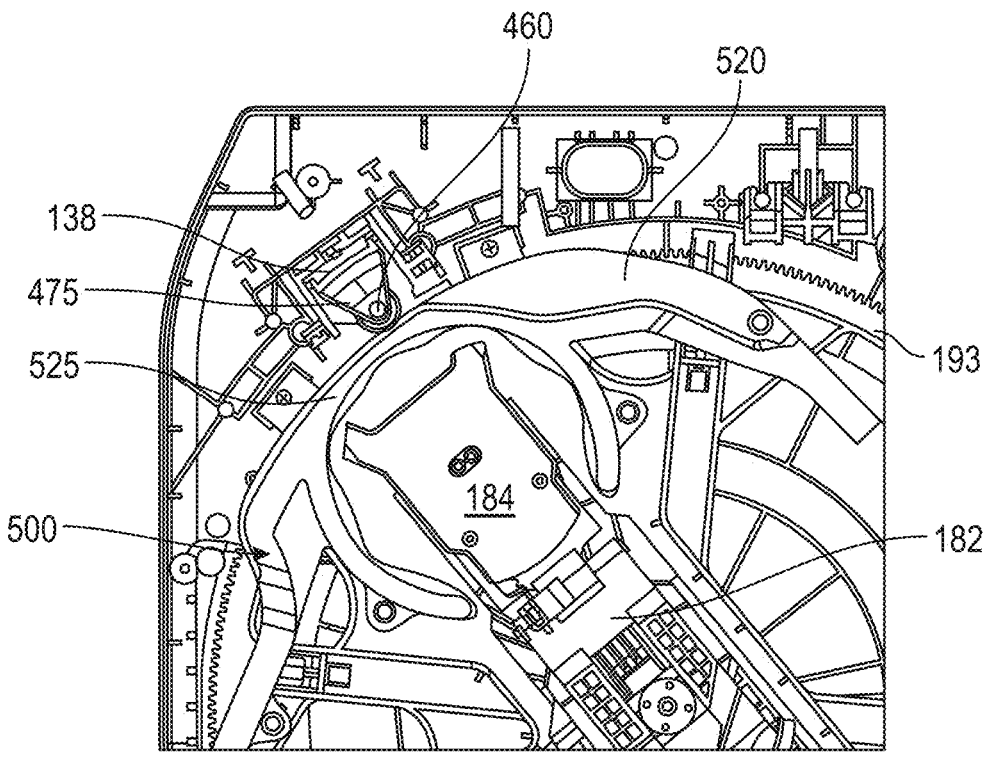

FIG. 16C is a top down view showing an example positioning of the cam 500 mounted on carousel surface after rotating carousel 193 to a dispensing position. In the dispensing position shown in FIG. 16C, the cam follower 460 of the sealed can catch 138 engages a portion of the surface of upper cam 525 that retracts the latch 138 in order to dispense the sealed can it is currently supporting within sealed can barrel 132. In a carousel position shown in FIG. 16D, which is identical to the position shown in FIG. 16C, the cam follower roller 450 of the sealed can retainer device 400 engages a portion of the surface of lower cam 520 that maintains the extension of the U-shaped blades with toothed-edges while the carousel is rotating. This allows the retaining of a sealed can(s) situated above the can being dispensed from sealed can barrel 132 while the catch 138 is being retracted at this position.

Figure 16D:
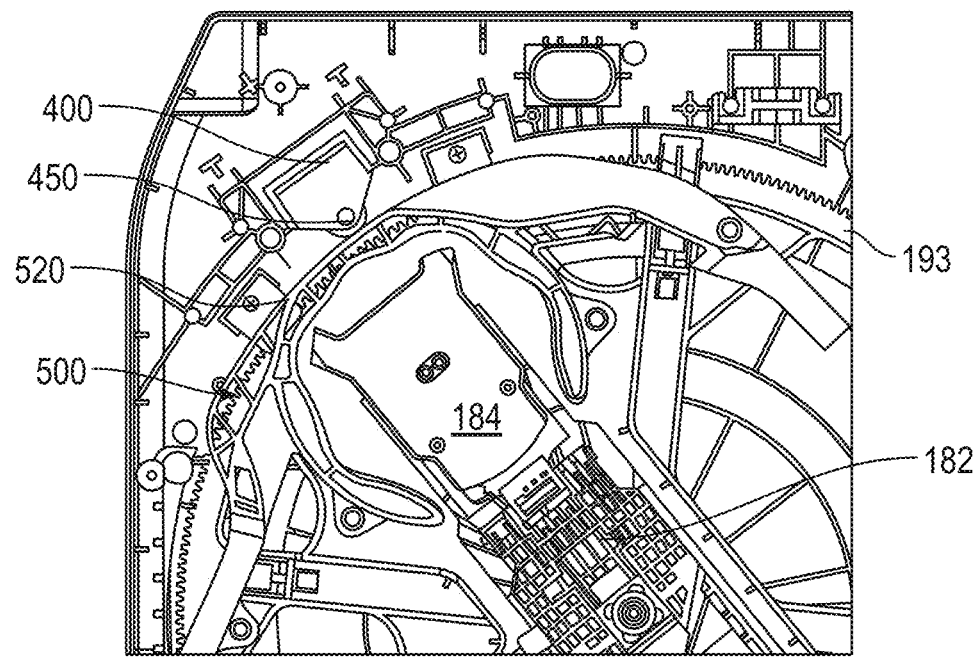
Figure 17B:
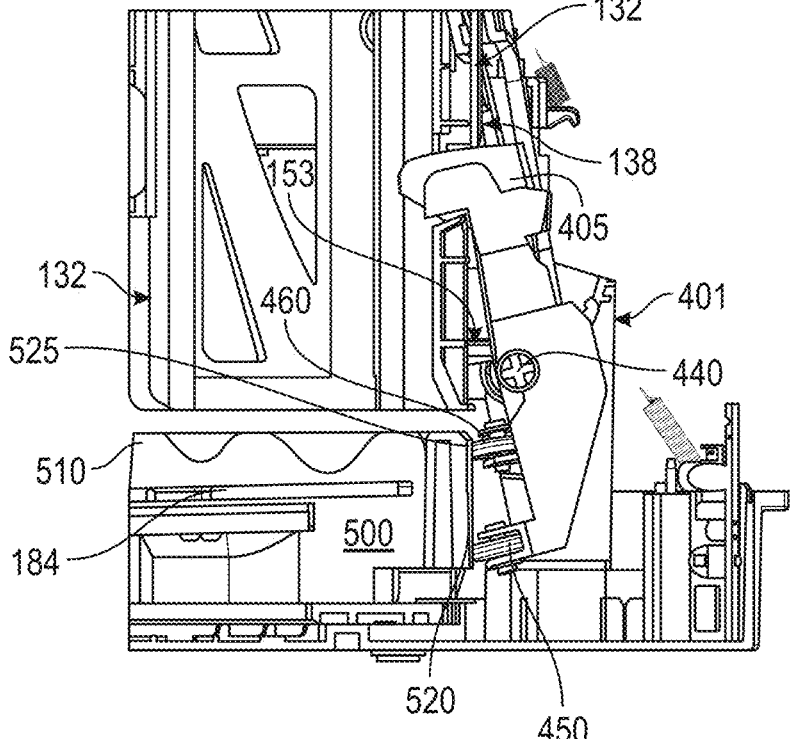

FIG. 17B is a side elevation view depicting both the state of the cam operated retainer device and sealed can catch in a process when dispensing a sealed can (not shown) corresponding to the position of the carousel 193 and cam 500 as depicted in FIGS. 16C-16D. In this state, the sealed can catch roller 460 is pushed with the cam surface to retract the sealed can catch foot portion 153, e.g., when the bottommost supported sealed can is released into the feeding nest on the lifter arm. The retainer 405 remains engaged with the sealed cans from positions 2-8 (above the dispensed can) so that the entire stack does not fall onto the lifter arm. As shown in FIG. 17B, the sealed can latch 475 used for holding a single can or stack of sealed cans in chute barrel 132 has been retracted to dispense the currently bottom can being supported in response to the engagement of latch roller 460 to the surface of upper cam 525. At this moment, in the carousel position indicated, the cam surface 525 is such that the sealed can catch 138 is fully retracted to dispense the sealed can (not shown) onto a support pad 184 of a support arm (not shown). As further shown in FIG. 17B, at this moment, the U-shaped, saw-toothed edge blades 405 of retainer device 400 remain extended to support the overlying can(s) in response to the additional engagement of the retainer roller 450 to the surface of lower cam 520. At this moment, in the carousel position indicated, the cam surface 520 is such that the retainer blades 405 remain fully extended to support a can or stack of can(s) above the sealed can that is dispensed from chute barrel 132.

Figure 16E:
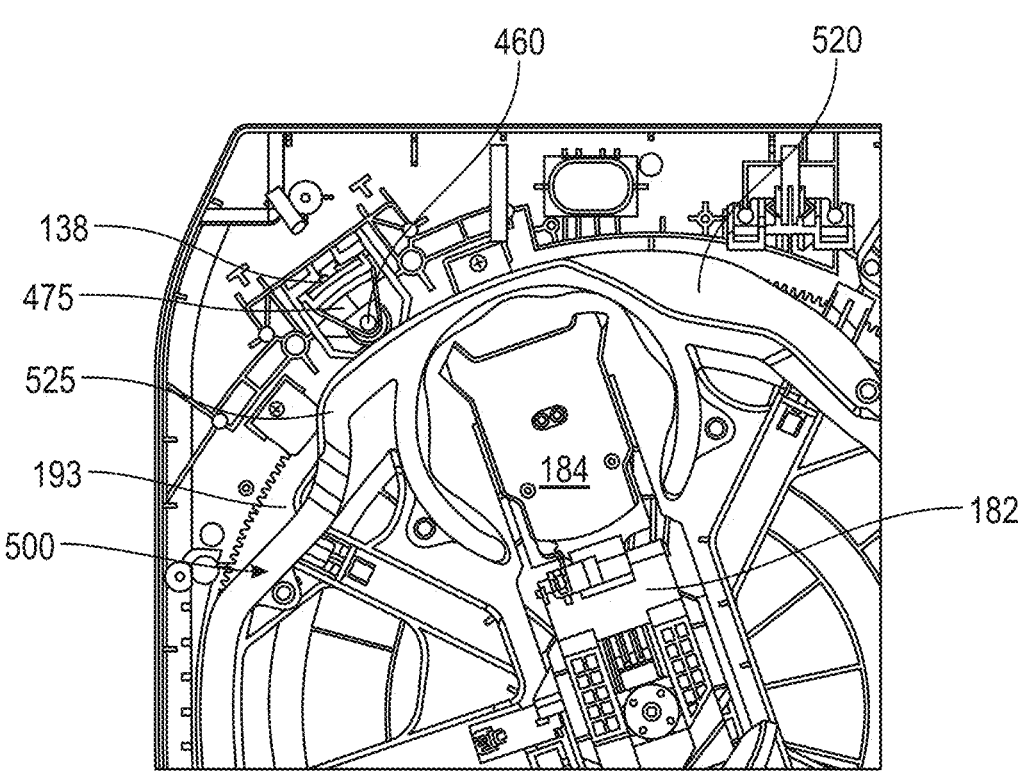

FIG. 16E is a top-down view showing an example positioning of the cam 500 mounted on the surface of carousel 193 upon further rotating carousel 193, e.g., after dispensing a sealed can. In the position shown in FIG. 16E, the sealed can catch cam follower roller 460 of the sealed can catch 138 engages a portion of the surface of upper cam 525 that maintains retraction of the catch 138. In a carousel position shown in FIG. 16F, which is identical to the position shown in FIG. 16E, the cam-follower roller 450 of the sealed can retainer device 400 engages a portion of the surface of lower cam 520 that also causes a retraction of the U-shaped blades with toothed edges of the retainer device 400 while the carousel is rotating. That is, this cam position shows the retracted state of both the catch 138 and the retainer device tooth-edged blades 405 at this position. At this position, the lifter arm 182 including support pad 184 is controlled to support the entire stack of full cans and at this position, is used for measuring, e.g., using a weighting procedure, how many sealed cans are in the machine.

Figure 16F:
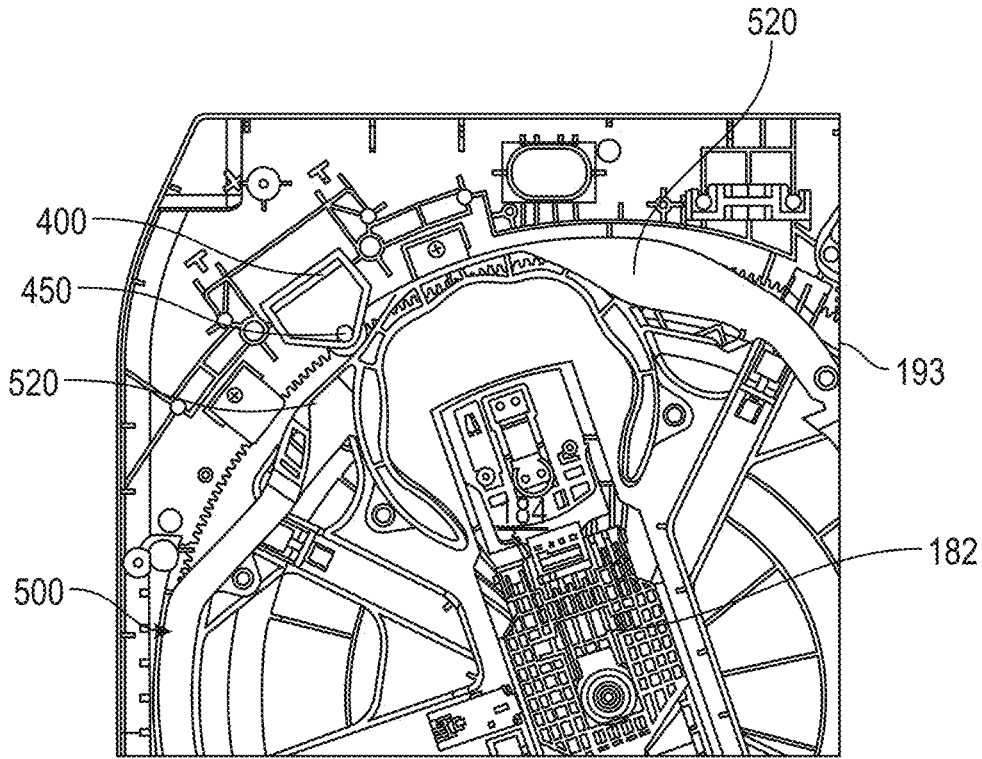
Figure 17C:
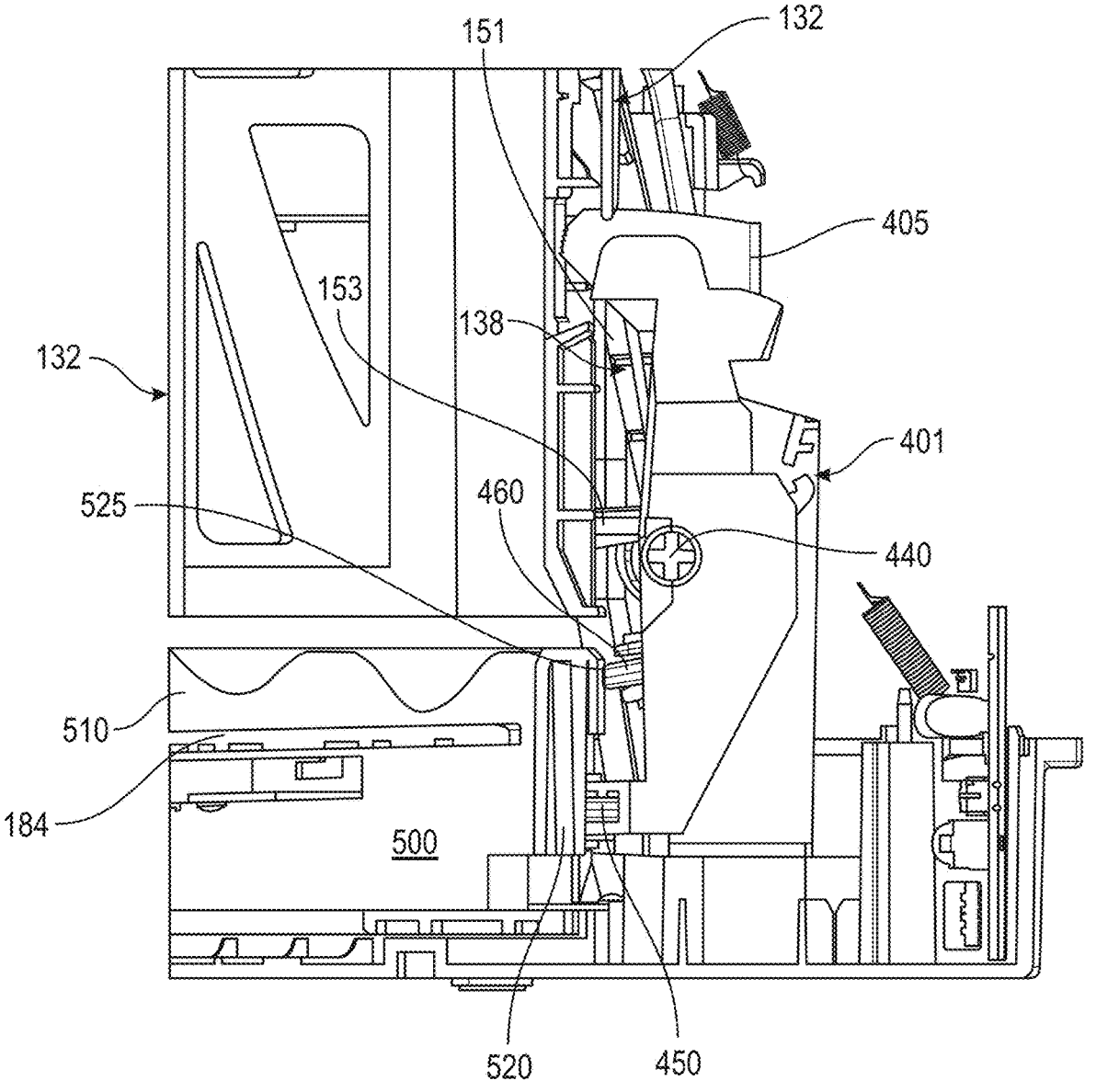

FIG. 17C is a side elevation view depicting both the state of the cam operated retainer device and sealed can catch occurring due to cam follower engagement with cam 500 at the corresponding positioning of the carousel 193 as depicted in FIGS. 16E-16F. In this state, any retained "fresh" cans can fall down one position in the chute onto the support arm/pad. That is, the second sealed can being retained and any/all the further cans above (in positions 2-8 not shown) fall to rest on the support pad 184, and a weighting procedure can be performed for measuring how many cans are currently stored in the machine. This measurement can be used to update a user's remote application, e.g., when providing a current status of the amount of sealed cans left in the feeder. As shown in FIG. 17C, the sealed can catch 138 is maintained in the retracted position such as after dispensing bottom can being supported in response to the engagement of latch roller 460 to the surface of upper cam 525 while the carousel is rotating. At this moment, in the carousel position indicated, the cam surface 525 is such that the catch 138 is maintained in its fully retracted state. As further shown in FIG. 17C, at this moment in the carousel position indicated, the U-shaped, saw-toothed edge blades 405 of retainer device 400 are fully retracted in response to the further engagement of the retainer roller 450 to the surface of lower cam surface 520 while the carousel is rotating.

In a further embodiment (not shown), there is a cam positioning corresponding to a moment when the sealed can catch 138 is engaged, but the retainer device blades 405 are not. At this time, the fresh cans are permitted to fall down one position for support by the sealed can catch 138 in the chute once the previous first can was dispensed. Once the second can, and all of the cans above, fall to rest on the can catch 138 and only after cam 520 is reengaged with the wheel 450 will the retainer device blades 405 be then reengaged with the second can in the stack to hold can the second can, e.g., can in position 2, and the cans above, in place for the next feeding cycle. Thus, a default position for retainer blades 405 when no cams are engaged is to be retracted and all sealed cans rest on sealed can catch foot portion 153.

In a further embodiment, the cam 500 FIG. 15 is further configured to allow the entire stack of cans to be weighed, using a combination of lifting, retaining, and rotating. In this can stack weighing methodology, the system eliminates the need for additional sensors to determine how many cans are still left in the sealed can chute, and to alert the user when the number of cans is getting low.

Figure 7:
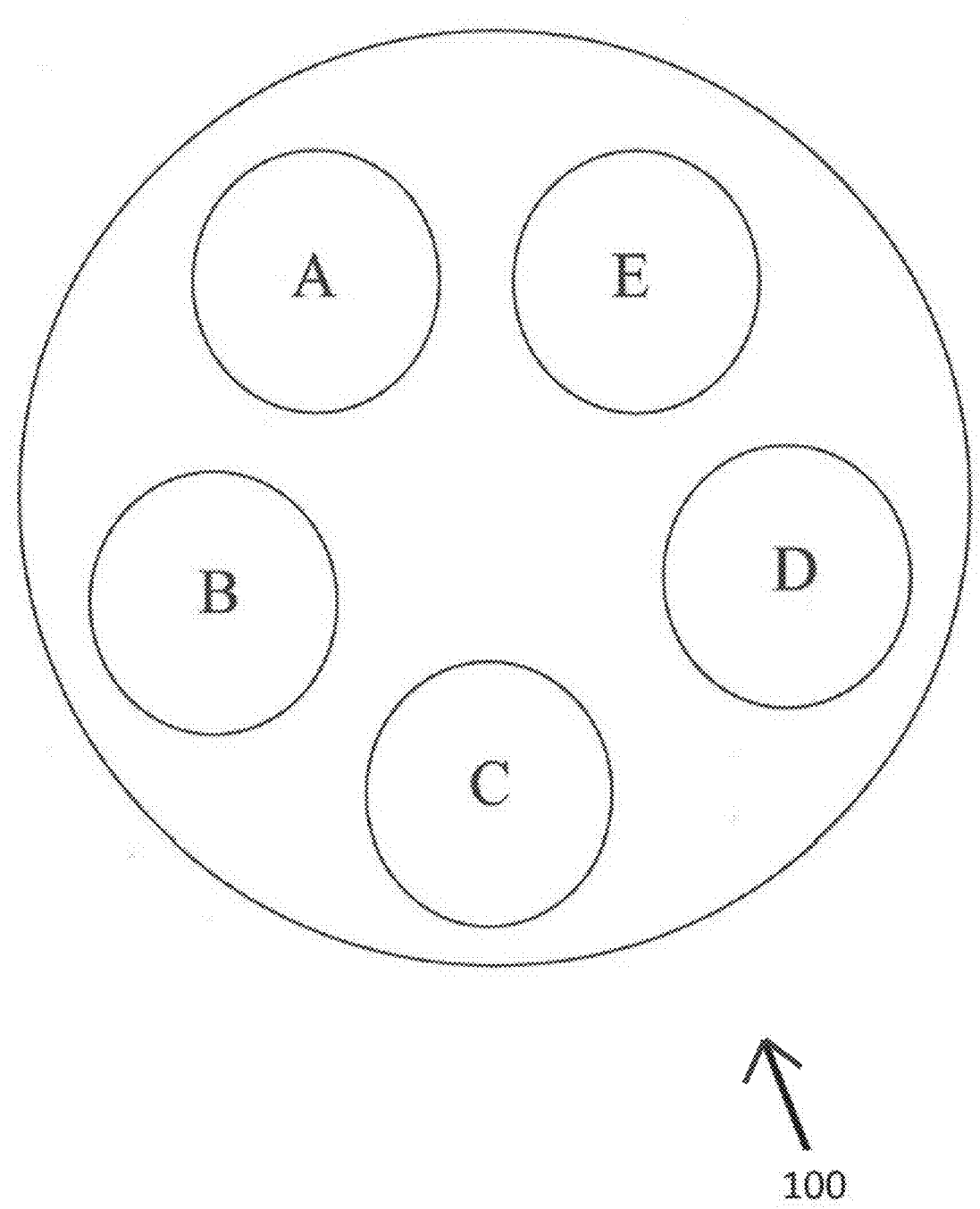

For exemplary purposes, and to aid in understanding, FIG. 7 is a graphical representation, although not to scale, to generally illustrate the five positions the support arm 180 can rotate to and be maintained at. For the purpose of clarify, all positions may be configured in any way to be before or after other positions and although only 5 positions are shown, there could be either more or less positions as needed. FIG. 7 is a top view of a representation of the feeding system 100, with positions noted, although not to scale or meant to limit the actual location of any position of the support arm 180. Typically, a can (not shown) travels from position "A", to position "B", to position "C", to position "D", to position "E", with these positions discussed below. For instance, at one or more of these positions, there is provided ability to provide for opening a sealed can at a can-opening position, to feed the animal at an animal feeding position, to store uneaten contents of a can at a storage position such that the can be later re-positioned to the animal feeding position for feeding the animal at a later time, and to remove a used can at a used-can removal position.

The first position "A" is vertically below a lower opening of the sealed can barrel 132.

The second position "B" is generally where the sealed can has at least a portion of a lid of the sealed can removed.

The third position "C" is generally where the contents of the can, which has had at least a portion of its lid removed, are exposed to an exterior of the feeding system 100. At this position "C", an animal can typically access these exposed contents.

The fourth position "D" is generally where the can, which has had at least a portion of its lid removed, and has been exposed to an exterior of the feeding system 100 for a period of time, is at least partially capped with a capping arm 250 (further described below).

The fifth position "E" is vertically below a lower opening of the used can barrel 134.

Referring again to FIG. 5, as stated above, support arm 180 effects the movement of a can through the positions shown in FIG. 7. Regarding the first position "A", which is vertically below a lower opening of the sealed can barrel 132, a sealed can is released and becomes supported by support arm 180. Before releasing the can, the support arm 180 can lift the entire number of cans within the sealed can barrel 132 to test for weight and thereby determine how many sealed cans are left within the sealed can barrel 132. The support arm 180 will contain a weight measurement device to obtain this data, such as a load cell, discussed below. Alternatively, sensors within or in proximity to the sealed can barrel 132 will provide this data. A more detailed view of support arm 180 is shown in FIG. 8A, with the support arm 180 being in the vertical position it would be to begin supporting the sealed can.

Figure 8A:
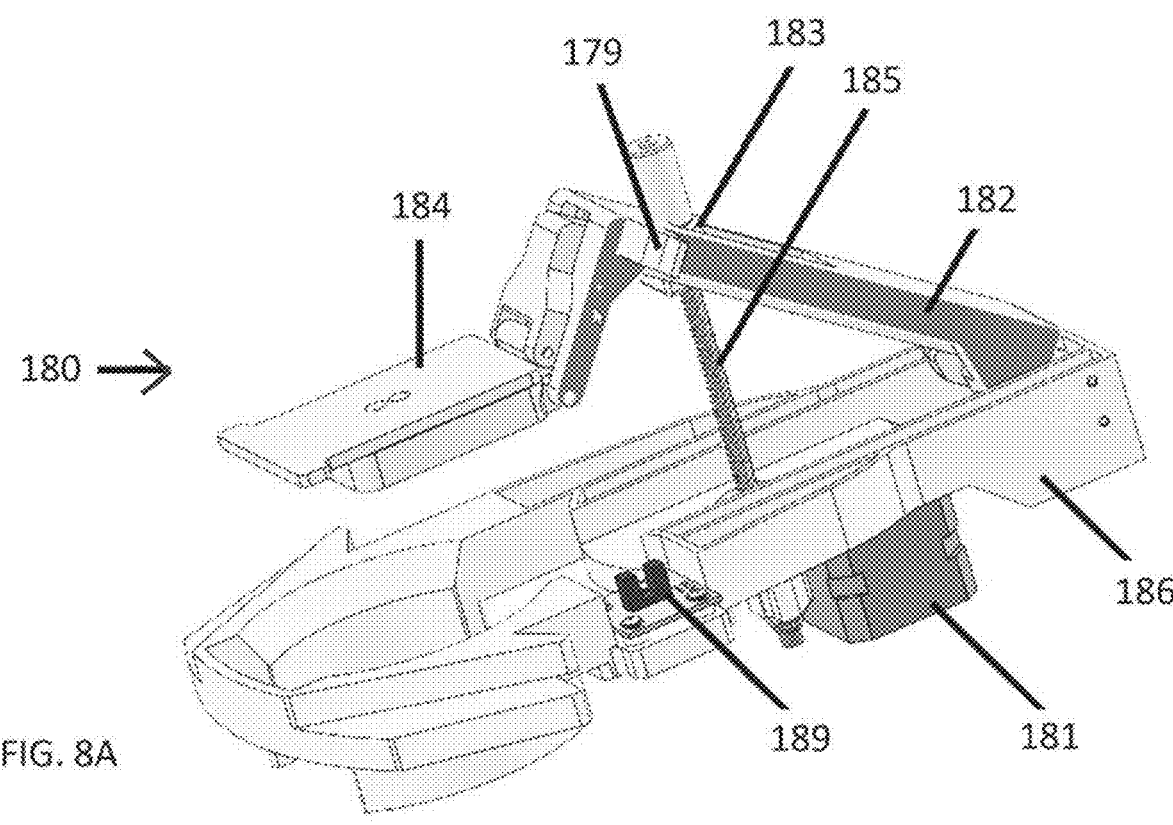
FIGS. 8A-8C are perspective views of the support arm.

With respect to the weighting procedure, with reference to FIG. 8A, a sealed can is released onto the lift-pad 184 of support arm 180, the lift-pad rotates farther clockwise (to a position between A and E. This rotation to an otherwise unused position allows the cam 500 on the surface of the carousel to provide surface profiles shaped to simultaneously release both the retainer and the sealed can latch as shown in FIGS. 16E, 16F and 17B. The lift-pad is no longer centered under the chute and the stack of cans inside it, but roughly half of the lift pad is still under the cans and that is sufficient. The weight of the entire stack can now be read by the load cell. In an embodiment, the lift-pad can also be lifted or lowered before or during the weight measurement to improve the measurements accuracy. One preferred embodiment is to raise the lifter pad 184 with the entire stack of cans resting on it, stop, and take a weight reading. The chutes, cams, and nest are all designed with the appropriate profiles so that these rotations can take place. After the weight reading is complete, the carousel is rotated in a particular direction, e.g., counter-clockwise (CCW), so that the lift-pad is centered under that stack of new cans (position A), which re-engages the retainer. Then the lift-pad is lowered. Only the bottom can moves since the second can and any cans above it are supported by the retainer. When the can is fully lowered to height where it will not run into other components, the carousel is again rotated in a direction to move to the next task, and to allow the latch to move back into service, and finally to release the retainer, allowing any and all of the cans to drop onto the sealed can catch.

As can be seen from FIG. 8A, the support arm 180 includes an elevation arm 182 and a support pad 184. The elevation arm 182 is operably connected to an elevation screw 185 and is configured to pivot about a pivot within a support arm frame 186. Elevation screw 185 is capable of being rotated by an elevation motor (elevation motor 187 of FIG. 5, which is supported by can chute support 140). The operation of the elevation screw is discussed below in regards to rotation being "clockwise" or "counter-clockwise" as an example. In other embodiments, the directions can be reversed using a differently threaded elevation screw 185 to achieve the same movements of the support arm 180.

Figure 8B:
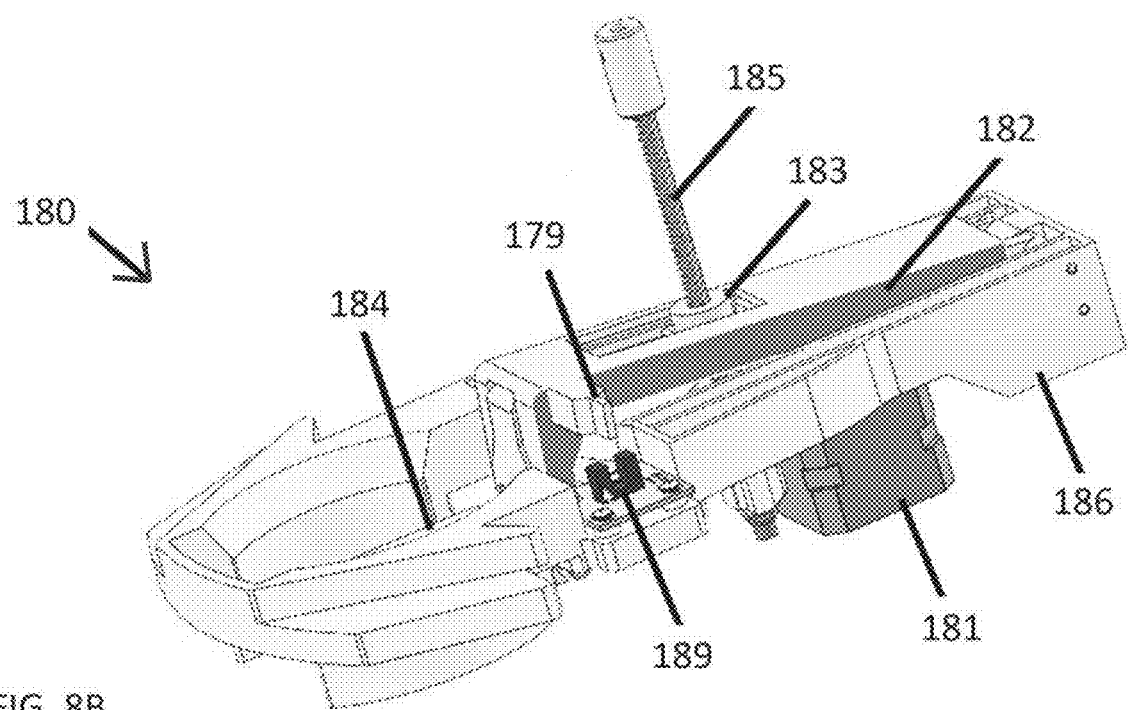

The clockwise rotation of elevation screw 185 by the elevation motor causes the elevation arm to move vertically downward towards the base 120 of the feeding system 100, to a position shown in FIG. 8B. The elevation motor can stop rotation, making the elevation arm 182 any suitable height until an arm protrusion 179 is detected as being present by height sensor 189.

The counter-clockwise rotation of elevation screw 185 by the elevation motor causes the elevation arm 182 to move vertically upwards, away from the base 120 of the feeding system 100, to a position shown in FIG. 8A. The elevation motor can stop rotation, making the elevation arm 182 any suitable height until the elevation arm 182 is stopped because the height stop 183 reaches and is stopped by the top of the elevation screw 185.

The support pad 184 is configured to support sealed and used cans, and includes an electronic weight sensing device, such as a load cell. The electronic weight sensing device is configured to send and/or receive signals from control device 160, which will be described in more detail below. From signals received from the support pad 184, the control device 160 can determine how much food is left in a can that has had at least a portion of a lid of that can removed.

From signals received from the support pad 184, the control device 160 can also determine a weight of all cans in either sealed can barrel 132 or used can barrel 134, by the support pad being placed under either barrel and caused to lift vertically upwards by the elevation screw 185 to support all weight of all cans in either barrel. As an example, from signals received from the support pad 184, the control device 160 can determine how many sealed cans are within the sealed can barrel 132 by measuring a total weight of all cans present, and then divide that total weight by a predetermined, average sealed can weight.

Alternatively, a sensor (not shown) can be included on the interior of or in proximity to one or both of the sealed can barrel 132 and the used can barrel 134 to optically or mechanically determine the height of cans in the barrel, thus determining how many cans are in each of the barrels. Optical sensors may be placed inside, at the top, at the bottom or around the sealed can barrel 132 and/or the used can barrel 134 to determine how many cans are in the barrels. The sealed can barrel 132 and the used can barrel 134 may or may not have cut outs that will allow sensors of this type to work even mounted outside of the barrels. Alternatively, one or more mechanical sensors may be placed inside the sealed can barrel 132 and/or the used can barrel 134 to detect how many cans are in the barrels. These sensors may be indented, lifted, pressed or otherwise manipulated by the cans or lack of cans to determine the fullness of each barrel.

Support arm frame 186 interacts through a suitable gear(s) with a rotation motor 181, which causes support arm frame 186 (including support arm 180) to rotate clockwise and counter-clockwise, between each position shown in FIG. 7.

Both rotation motor 181 and elevation motor 187 are any electrical motors, either AC or DC, that are suitably sized to cause rotation of support arm frame 186 (with one or more sealed or used cans supported on support pad 184) and also suitably sized to vertically lift 1, 2, 3, 4, 5, 6, 7, 8, 9, 10, 11, 12, 13, 14, 15 or more sealed cans stacked vertically within sealed can barrel 132 and used can barrel 134.

Regarding the first position "A" of FIG. 7, which is vertically below a lower opening of the sealed can barrel 132, a sealed can is released and becomes supported by support arm 180. To be in the first position, the rotation motor 181 has caused the support arm frame 186 and support arm 180 to rotate to be vertically below a lower opening of the sealed can barrel 132. To aid in control of the sealed can from the sealed can barrel 132, the elevation motor can cause the support arm 180 to extend vertically upward, to a position shown in FIG. 8A.

In this position a sealed can is released from the sealed can barrel 132 due to sealed can catch 138 moving, and allowing the sealed can to drop. The sealed can then lands on the support pad 184. The support arm 180 (or another suitable portion of the feeding system 100, such as within the sealed can barrel 132, or near position "B" of FIG. 7) can include a scanner (not shown). This scanner can be any suitable scanner, including optical scanners and laser scanners, that is capable of decoding data stored in a barcode, a QR code, or any equivalent scannable/detectable coding option used for tracking purposes on a can. This data can be received by the control device 160, and will be described in more detail below.

Optionally, the support arm 180 (or another suitable portion of the feeding system 100, such as within the sealed can barrel 132, or near position "B" of FIG. 7) can include a second scanner (not shown). This second scanner can be any suitable scanner or device (in conjunction with control device 160) that is capable of determining if a sealed can is in the correct orientation (right side up, or the rolled lip and lid of the can is vertically further away from the base 120 of the feeding system than the bottom of the can).

Figure 9:
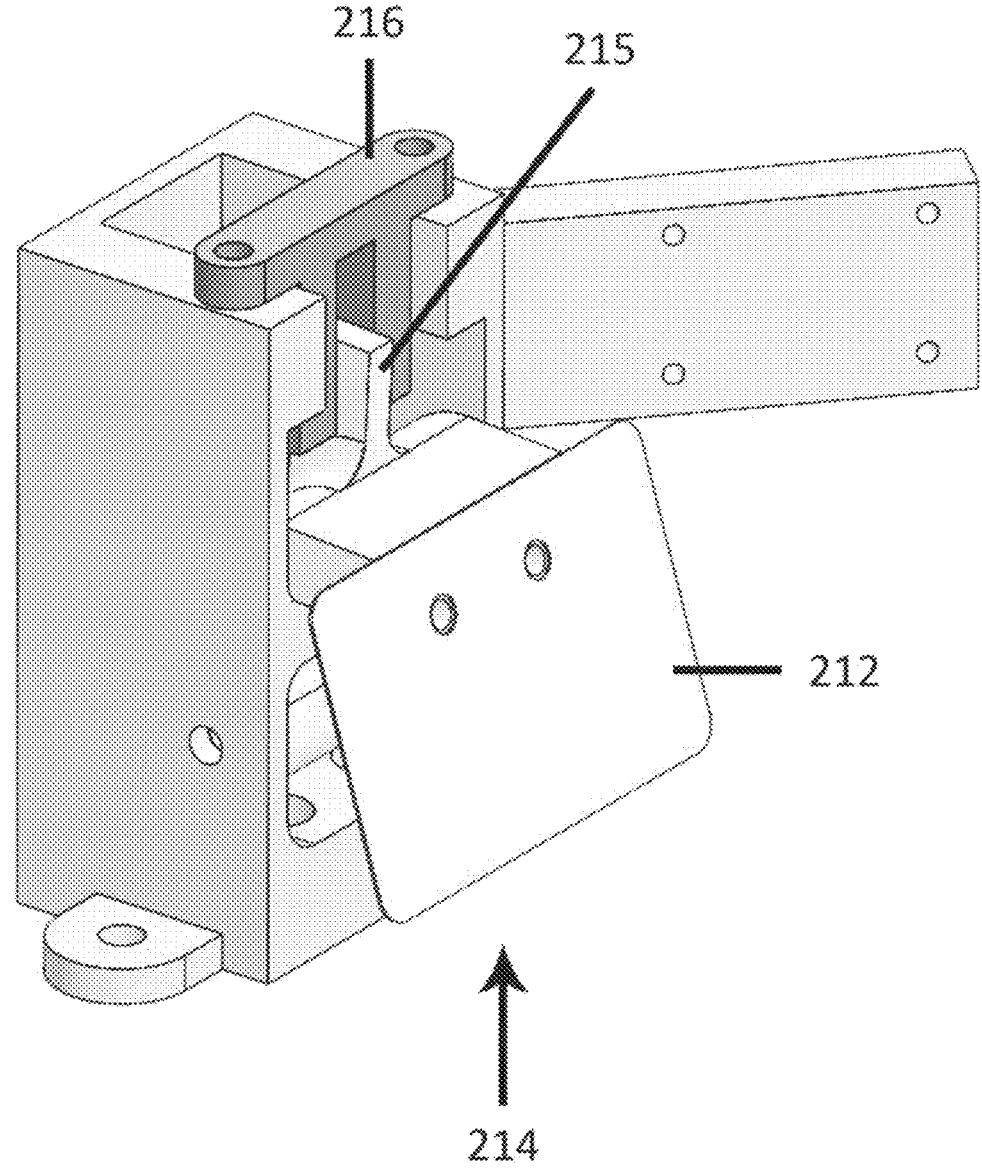
Figure 9:
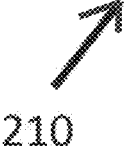

Alternatively, during dispensing, the support pad 184 can catch the sealed can from the opening at the bottom of the sealed can barrel 132. Before moving on to position "B" to open the can, the support pad 184 will be elevated slightly again and the can will rub against an edge detector 210, shown in FIG. 9. The edge detector 210 can be located in any position between position "A" (including position "A") and position "B".

The edge detector 210 includes a blade 212 configured to catch on the rim of a can, as the can moves in the direction of arrow 214. If the can was upside down, the lip of the lid of the can will catch on the blade 212 and the edge detector 210 will notify the control device 160. As the rim of the can catches the blade 212, the mechanism rotates so that blade protrusion 215 moves and is detected by blade protrusion sensor 216. The blade 212 will not catch if the can is right side up, with the rim at the top. If the can is right side up, the sealed can can proceed to position "B".

If the edge is caught, the control device 160 will be notified by the blade protrusion sensor 216, the sealed can can be caused to move to position "E", and placed into the used can barrel 134. The process can then start over with a new can. The user can be notified of such an event by the control device 160. In another embodiment, device can opener 190 can be configured to sense if the can is right side up. This may be determined from feedback received by the control device 160 of the grip of the blades of the can opener on the can or lack thereof. This may also be determined by the control device 160 from the amount of current drawn by the motor as the can opener 190 is operating on the can. The structure of the can opener 190 is further described below.

After receipt of the sealed can by the support arm 180 in position "A", and after clockwise rotation of elevation screw 185 to place the support arm 180 in the position shown in FIG. 8B, the rotation motor 181 rotates and causes the support arm 180 to rotate counter-clockwise from position "A" to position "B" of FIG. 7. At position "B" the elevation screw 185 rotates counter-clockwise and the support arm 180 (and sealed can thereon) is lifted vertically towards the can opener 190. Alternatively, at position "B", the elevation screw 185 does not rotate and the can opener 190 moves vertically downwards.

Figure 10A:
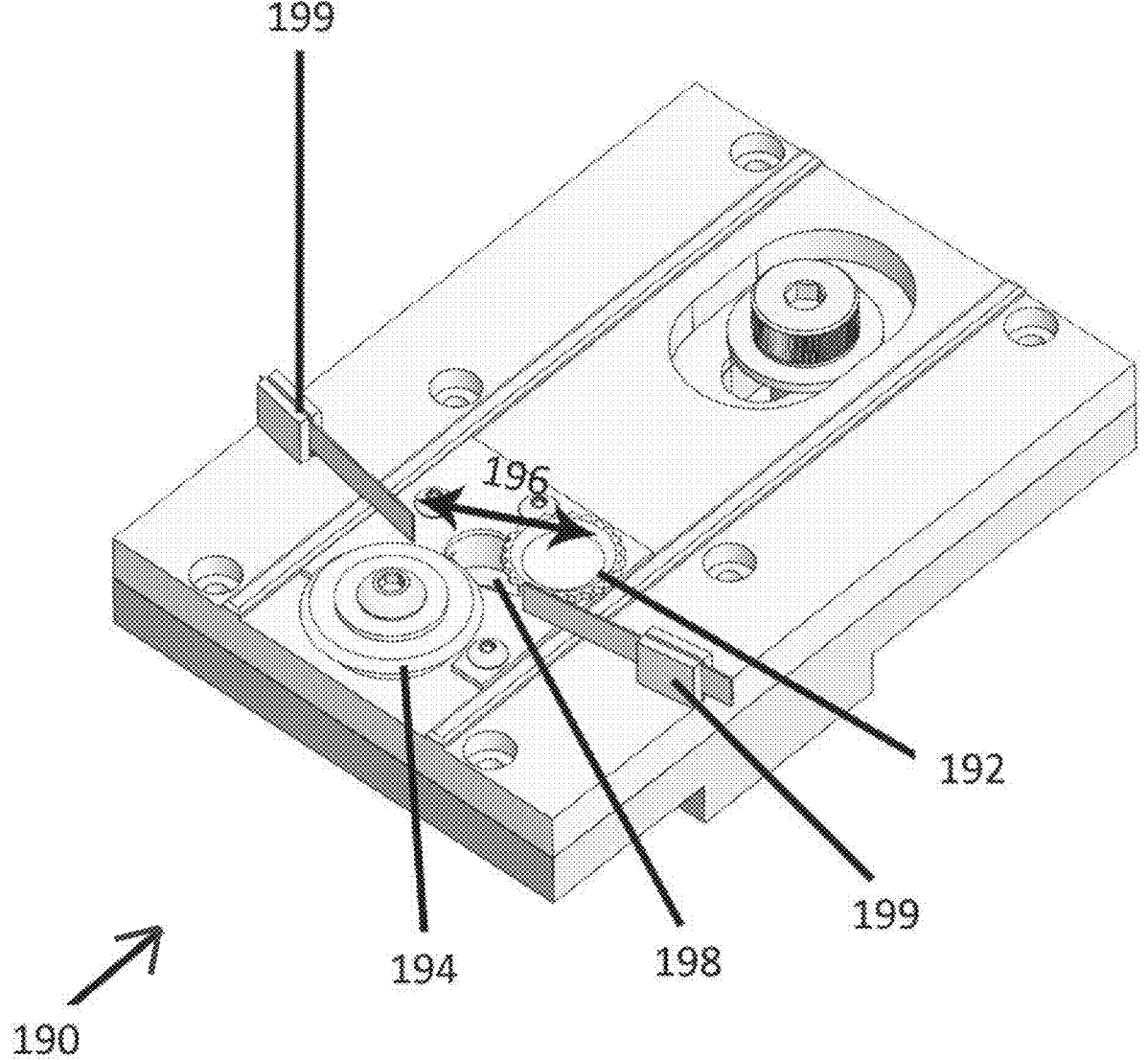
FIGS. 10A and 10B are perspective views of the can opener.
Figure 10B:
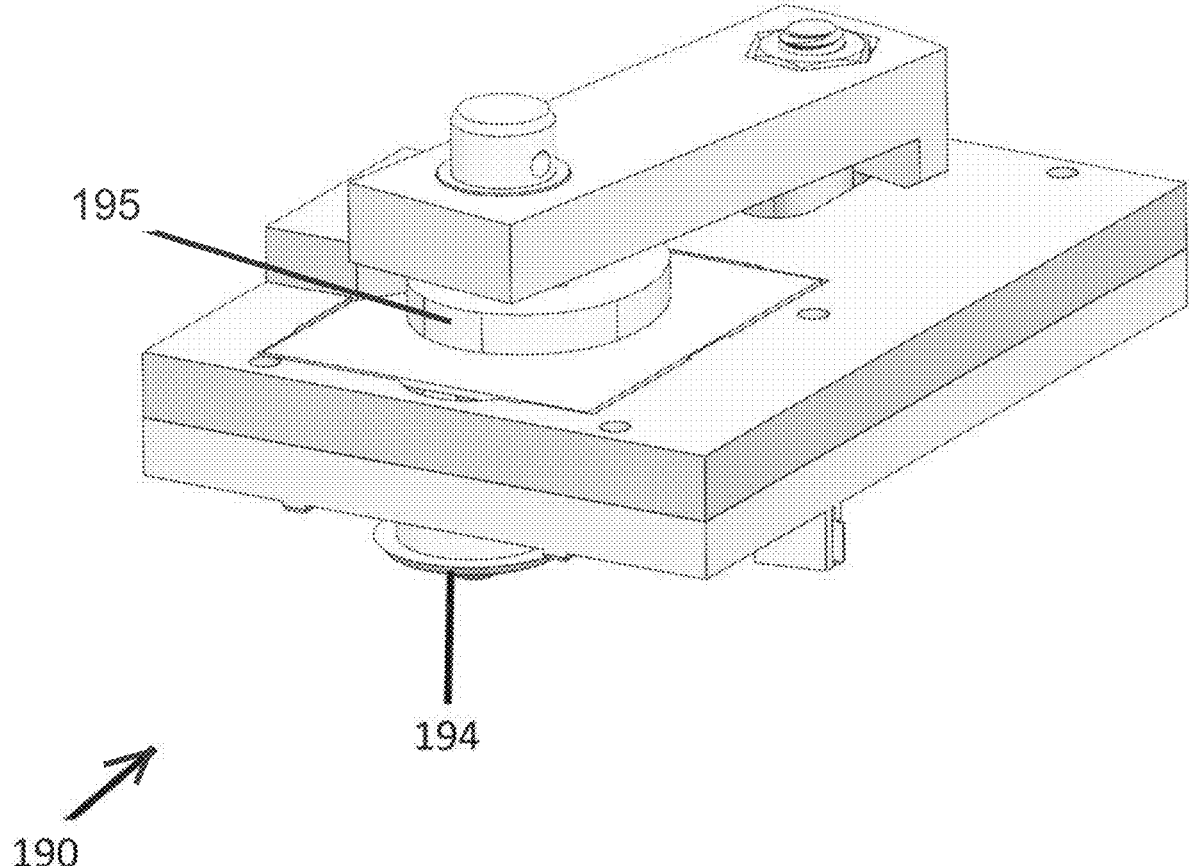

As seen in FIG. 10A, which is an underside view of the can opener 190, the can opener 190 includes a feed gear 192, a cutter 194, and lid extractors 199. The feed gear 192 is moved by a can opener motor (not shown) that is on top or located anywhere within the feeding system 100 and is configured to contact and cause the can to rotate against the cutter 194, such that the cutter 194 cuts through a side wall of the can. In alternative configurations, the feed gear 192 can contact and cause the can to rotate against the cutter 194, such that the cutter 194 cuts through an upper surface wall of the can. In yet another embodiment of can opener 190, a pinching mechanism (not shown) can contact and pinch a flap handle of a can, and peel the upper flap off of the can. The feed gear 192 is configured to move in the direction of arrow 196 through feed gear groove 198 by forwarding and reversing the direction the motor is turning. As shown in FIG. 10B, rotation of cam 195 (through the motor (not shown)) causes the cutter 194 to more in the direction of arrow 196 in FIG. 10A. Under any of the above embodiments, the can opener 190 results in a substantially dull upper metal edge of the can and a removed lid. As used herein, the removed lid refers to any material removed from the sealed can by the can opening process.

After the sealed can is opened, by any suitable method, the removed lid can be maintained by the can opener 190 until after the support arm 180, and now opened can, have moved from position "B" of FIG. 7. At that time, the can opener 190 can release the removed lid by utilizing the lid extractors 199 which will help push the lid out of the grip of the cutter 194 and/or feed gear 192, so that the removed lid falls vertically down into a receptacle (not shown) which can later be removed by a user. Alternatively, the can opener 190 can maintain the removed lid until after the opened can has completed position "C", or after the opened can has completed position "D", both described below in more detail. In this alternative embodiment, the rotation motor 181 rotates and causes the support arm 180 to rotate clockwise from either position "C" or position "D" back to position "B", and the removed lid is then released so that the removed lid falls vertically down onto the can, which has now been used.

After the sealed can has been opened at position "B", the rotation motor 181 rotates and causes the support arm 180 to rotate counter-clockwise from position "B" to position "C" of FIG. 7. At position "C" the elevation screw 185 rotates counter-clockwise and the support arm 180 (and opened can thereon) is lifted vertically towards a feeding opening 200. The opened can is lifted to be below the feeding opening, 200, partially exposed through feeding opening 200, or offset a distance below the feeding opening 200. At this time, an animal can access the contents of the opened can and eat at least a portion or all of the contents. Alternatively, the can can be extended outside of the housing 110 to present the food to the animal and then retracting back once finished or per scheduled settings.

During the time that access to the contents of the opened can is available, the support pad 184 can measure the weight of the opened can at various times, and transmit that information to the control device 160, such that the weight of the can at the time of opening can be compared to the weight of the opened can over time. These weight measurements can be used by the control device to determine an amount of material remaining in the opened can, and can be used to restrict access to the opened can if the contents are being removed too quickly. Further actions undertaken by the control device 160 are discussed below.

The feeding opening 200 can include a lip that extends vertically downwards, which substantially covers the exposed edge of the opened can. Also, the feeding opening 200 can include an inclined portion, which extends radially from the feeding opening 200 and is inclined vertically downward towards the feeding opening 200.

Optionally, the feeding opening 200, when the opened can is not in position "C", can be covered with an opening cover 202, which extends over the feeding opening 200. The opening cover 202 can be maintained, when an opened can is not in position "C", in a closed configuration by the force of an elastic element (shown in FIG. 11). To move the opening cover 202, thus exposing the feeding opening 200, instead of stopping at position "C", the rotation motor 181 rotates and causes the support arm 180 to rotate counter-clockwise from position "B", past position "C" a distance, which is prior to position "D". At that time, the support arm 180 (and opened can thereon) is lifted vertically a predetermined distance by rotation, counter-clockwise, of the elevation screw 185. Then, the rotation motor 181 rotates and causes the support arm 180 to rotate clockwise back towards position "C", so that a portion of support arm 180 contacts an opening cover portion (shown in FIG. 11) on a lower surface of the opening cover 202. The rotation motor 181 continues to rotate clockwise, causing the opening cover 202 to move clockwise, exposing the feeding opening 200.

Figure 11:
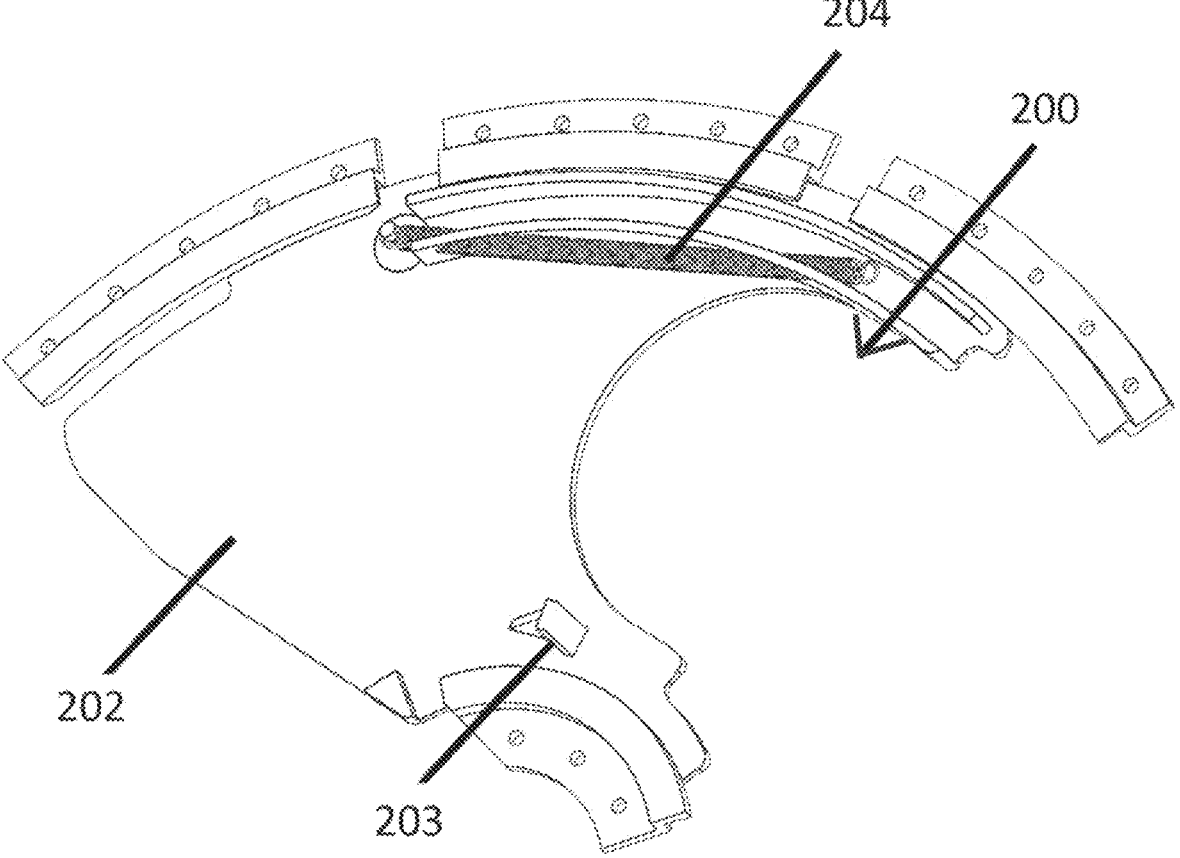

FIG. 11 is a portion of the opening cover 202, from an underside perspective. From this view, the opening cover portion 203 that contacts the support arm 180 can be seen as extending from a surface of the opening cover 202. In the configuration shown in FIG. 11 (and in FIG. 4A), the opening cover 202 is in a closed position, held by an elastic element 204 (such as a spring or an elastomeric element, or the like) between the opening cover 202 and a fixed portion of the feeding system 100. Once the support arm 180 contacts the opening cover portion 203, and forces the opening cover 202 to rotate in a counter-clockwise direction of FIG. 11, the feeding opening 200 moves to substantially align with the housing opening 300, thus exposing the can to outside of the housing 110. Once the support arm 180 moves to position "D", the elastic element 204 causes the opening cover to rotate in a counter-clockwise direction of FIG. 11 so that feeding opening 200 is no longer substantially aligned with the housing opening 300 and the opening cover 202 itself is exposed through the housing opening 300, as seen in FIG. 4A.

In another embodiment, the opening cover 202 can be moved through an additional motor (not shown) to expose the feeding opening 200, i.e., aligning feeding opening 200 as shown in FIG. 11 with housing opening 300 in FIG. 4A. In another embodiment, the opening cover 202 is moved as the support arm 180 rotates from position "B" to position "C" through contact between a portion of the support arm 180 and a portion of the opening cover 202. In view of FIG. 11, the opening cover portion 203 is a ramp-shaped member that contacts the support arm 180 and which allows the opening cover 202 to better cover the edges of the can; only exposing the entire circumference of the can when it is lifted by the elevation arm 182 up to the housing opening 300.

Under any of the above embodiments, once opening cover 202 is moved, at position "C" the elevation screw 185 rotates counter-clockwise and the support arm 180 (and opened can thereon) is lifted vertically towards a feeding opening 200. In other embodiments, once at position "C", the feeding opening 200 is near enough to the can to allow for access to the can's contents without the support arm 180 moving vertically up or down.

After a predetermined period of time or amount eaten, the elevation screw 185 rotates clockwise and the support arm 180 (and used can thereon) is moved vertically down and away from the feeding opening 200. Then, the rotation motor 181 rotates and causes the support arm 180 to rotate counter-clockwise from position "C" to one of position "D" or position "E" of FIG. 7.

If the rotation motor 181 rotates to position "D", the elevation screw 185 then rotates counter-clockwise and the support arm 180 (and used can thereon) is lifted vertically towards the capping arm 250. In other embodiments the support arm 180 remains stationary while the capping arm 250 is moved towards the support arm 180. The capping arm 250 includes a ring 252 made of a substantially compliant material, such as an elastomeric material, that extends around the circumference of the capping arm 250, which is configured to be elastically deformable upon contact with an exposed edge of the used can. Once contact is made between the ring 252 and the used can, a substantially air tight seal is formed between the contents of the used can and the environment around the feeding system 100. In another embodiment, the capping arm 250 may be larger in circumference than the can and can be placed over the can without touching any part of the can.

Optionally, the capping arm 250 can also include one or more lights (shown in FIG. 12) that are capable of at least partially limiting bacterial and/or mold growth on the contents of the used can. One example of these one or more lights is an ultra violet (UV) light and a light emitting diode (LED). The light may be used any time for any amount of time and may be programmable by the user.

Figure 12:
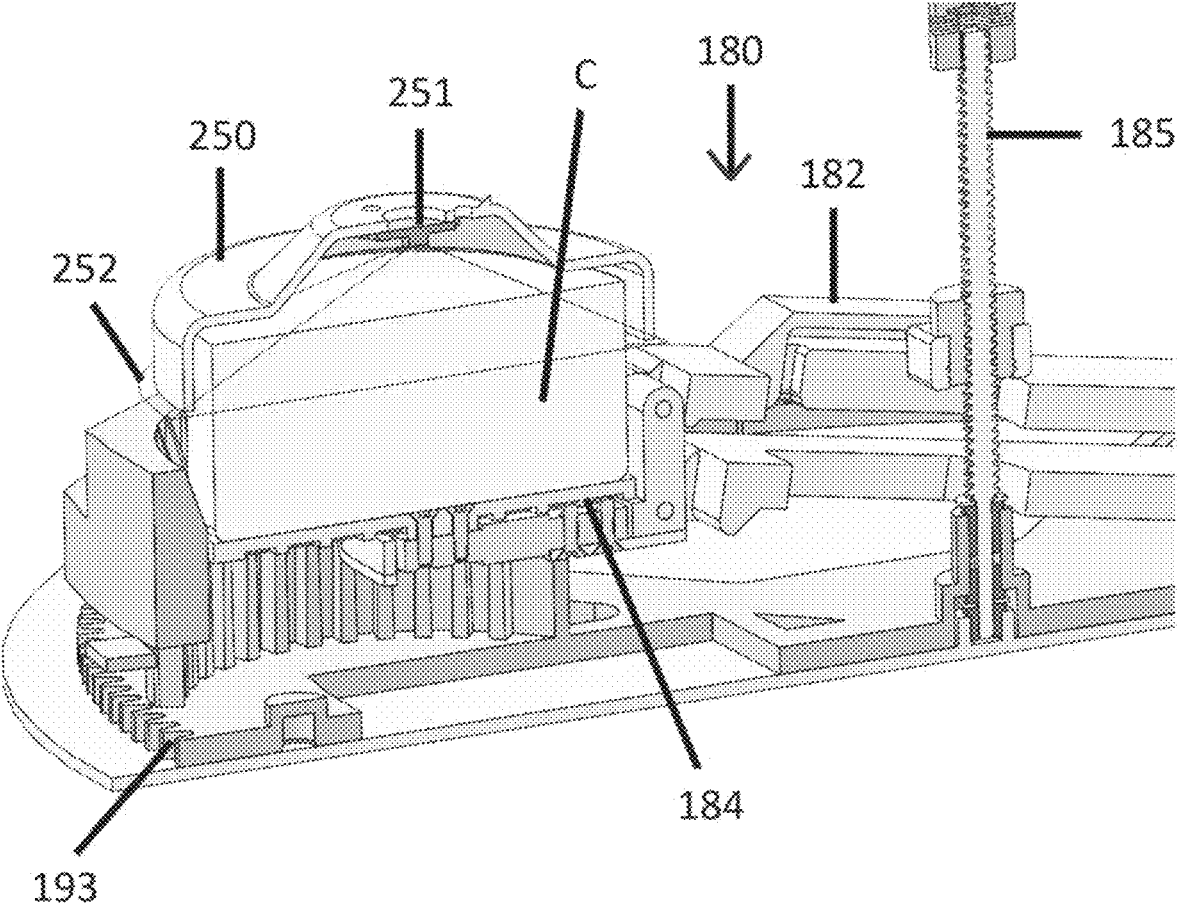

A side cross-sectional view of the capping arm 250 is shown in FIG. 12. In FIG. 12 a used can C is shown as being in contact with a portion of the ring 252. A light 251 is on an underside surface of the capping arm 250 and emits a light towards the used can C.

After a predetermined period of time, the elevation screw 185 then rotates clockwise and the support arm 180 (and used can thereon) is lifted vertically away from the capping arm 250. At this time, the rotation motor 181 can rotate counter-clockwise, back to position "C", or the rotation motor 181 can rotate clockwise, to position "E". If the rotation motor 181 rotates back to position "C", the used can can be exposed again through the feeding opening 200. This process can continue multiple times, with the rotation motor 181 causing the used can to move from position "C", to position "D", to position "C", to position "D", etc. for a predetermined period of time or amount eaten or as per scheduling settings made by the user. In an embodiment, a storage position corresponds to a "capping position" which is a position away from the feeding position and the used-can removal position where the opened can having partially eaten food content is temporarily stored at the storage position for a predetermined period of time. The function of the claimed feeding system at this position is not limited to "capping" of the opened can alone; rather the function includes temporary storage of the opened can at the storage position (and capping of the opened can if necessary). In an embodiment, at the storage position, the bottom of opening cover 202 is located to cover the opened can of food so that the animal does not have access to it and the air flow is reduced to keep it fresh.

After a period of time or amount eaten or as per scheduling settings made by the user, the used can is caused to move into position "B" to pick up the lid and then to position "E" by the rotation motor 181. Position "E" is vertically below a lower opening of the used can barrel 134. Upon reaching position "E", the elevation screw 185 then rotates counter-clockwise and the support arm 180 (and used can thereon) is lifted vertically towards the bottom face of the used can barrel 134. The elevation screw 185 will continue to rotate until the lower edge of the used can passes the used can catch 144. After the lower edge of the used can passes the used can catch 144, the used can is then supported by used can catch 144.

If there are already one or more used cans present in the used can barrel 134, the elevation screw 185 causes the used can just brought to position "E" to push vertically upwards the one or more other used cans already present in the barrel until the lower edge of the used can that was just brought to position "E" passes the used can catch 144. After the lower edge of the used can that was just brought to position "E" passes the used can catch 144, all used cans in the used can barrel 134 are then supported by used can catch 144.

Optionally, an interior surface of the used can barrel 134 can include, 1, 2, 3, 4, 5, or more vertical rails (not shown), which can be formed of any suitable material (such as plastics, metals, glass, ceramic, rubbers, carbon based materials, and combinations thereof). These vertical rails can extend a portion of the vertical length of the used can barrel 134, or a majority or all of the vertical length of the used can barrel 134. These vertical rails can aid in preventing an edge of a used can being caught, or cutting into a portion of the used can barrel 134 itself.

In another embodiment, a rotation motor 181' can be located in the position shown in FIG. 4B, which through rotation of motor gear 191 causes the entire carousel 193 to rotate through interaction with motor gear 191 and teeth on the exterior circumference of carousel 193. In this embodiment, the support arm 180 can be attached to the carousel 193 and the support arm 180 can rotate with the carousel 193 to the locations discussed above.

Figure 8C:
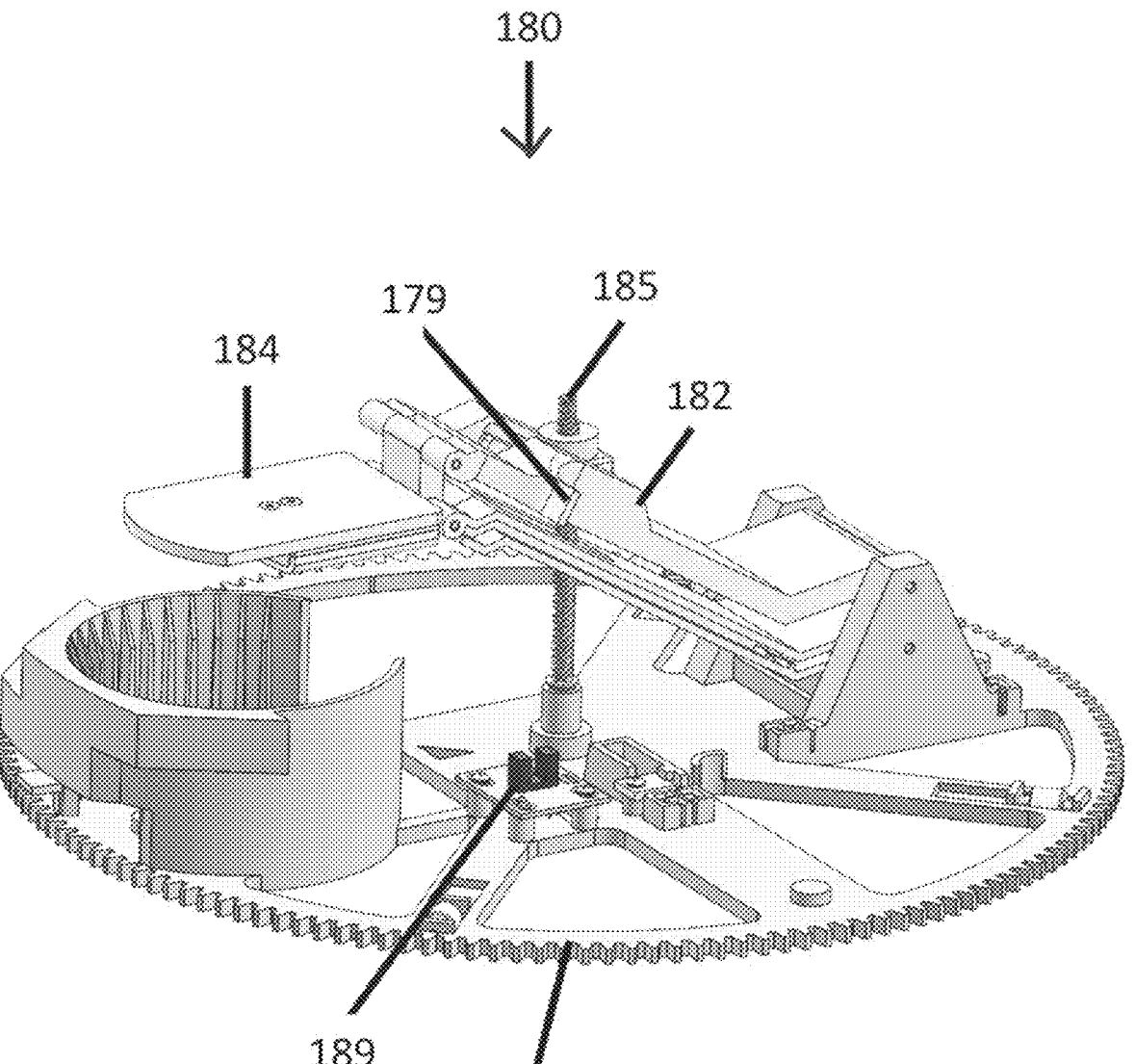

This alternative embodiment is shown in FIG. 8C, which includes the carousel 193 and support arm 180 separate from the other components of the feeding system 100. In this embodiment, the elevation arm 182 is moved vertically upwards and downwards as in the first embodiment.

Figure 8D:
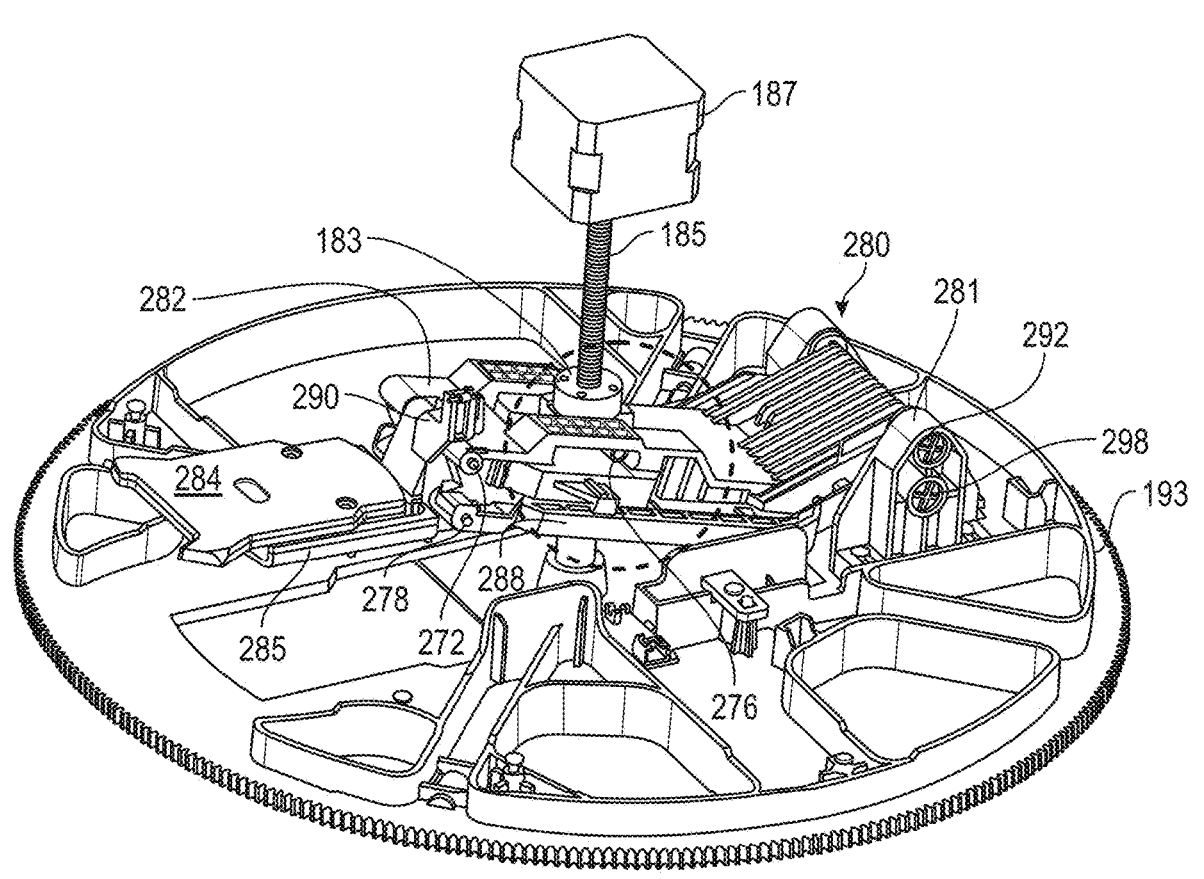
FIG. 8D shows an alternate embodiment of the support arm that functions to raise and lower a can as it is moved from station to station inside the feeder assembly.

In an alternate embodiment, FIG. 8D shows a further support arm 280 that functions identically as the support arm 180 shown in FIG. 8A to raise and lower a can as it is moved from station to station inside the feeder assembly. In this embodiment, the support arm 280 of FIG. 8D is a four (4) bar linkage with a support pad 284 on the distal end, and an elevation lead screw nut 183 in the center. The linkages are raised and lowered by driving the lead screw 185 with the elevation motor 187. The support arm includes a linked top elevation arm member 282 and a bottom elevation arm member 288, both upper and lower elevation arms 282, 288 being connected to a linking support member 290 at a distal end by respective connection pins 272, 278 of the linkage assembly for rotatable motion thereon. The linking support member 290 connects to the support pad 284. Further, both elevation arms 282, 288 are pivotably mounted on a support frame 281 by respective connecting pins 292, 298 provided in support frame 281 at a proximal end of the linkage assembly for rotatable motion thereon. As in the embodiment, the elevation screw 185 is configured to be rotated by an elevation motor 187, which is supported by a support structure (not shown). The elevation screw 185 is particularly operated to provide a "clockwise" or "counter-clockwise" rotation under processor control of the elevation motor. In other embodiments, the directions can be reversed using a differently threaded elevation screw 185 to achieve the same movements of the support arm 280.

Figure 8E:
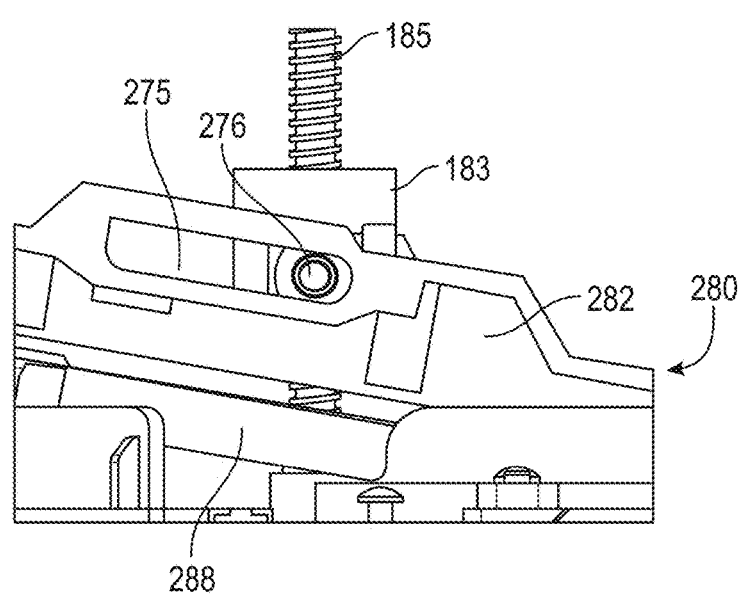
FIG. 8E depicts a detailed close-up view of the dashed circle portion shown in FIG. 8D illustrating the operable connection of elevation arm with the elevation screw.
Figure 8F:
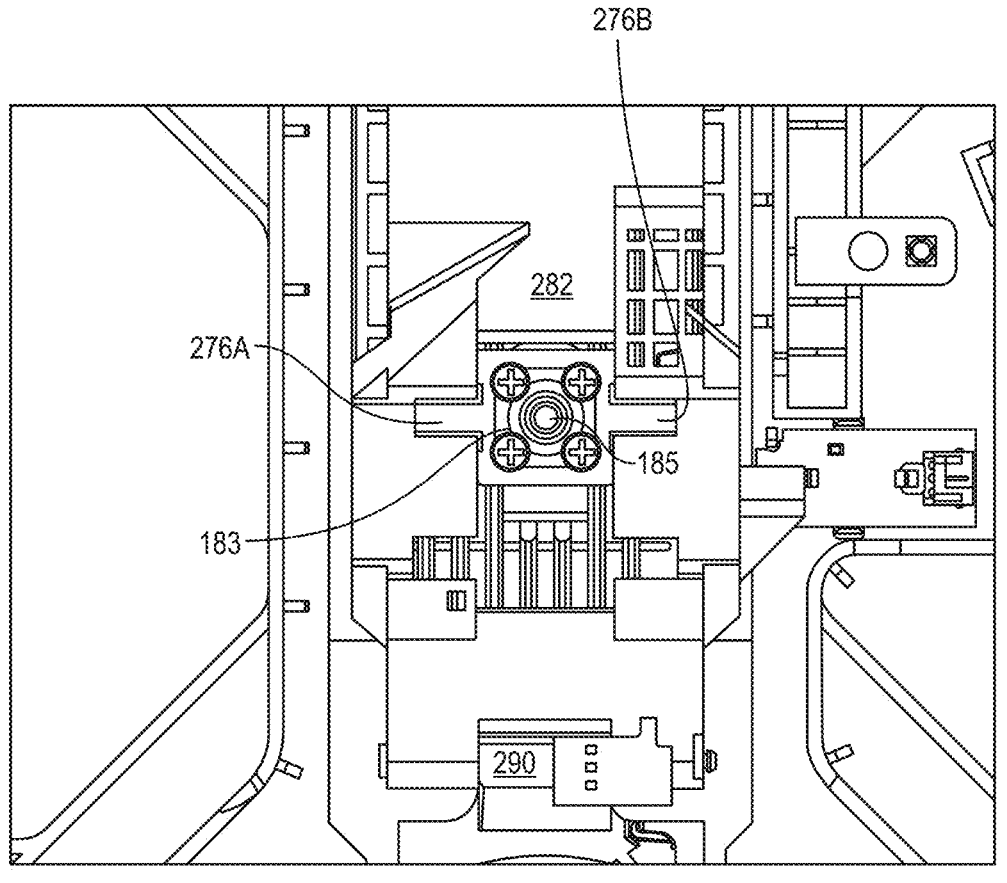
FIG. 8F depicts a top down, cross-sectional view of the height stop nut including two outward extending guide posts providing the mechanical linkage for moving elevation arm up and down according to an embodiment.
Figures 8G, 8H:
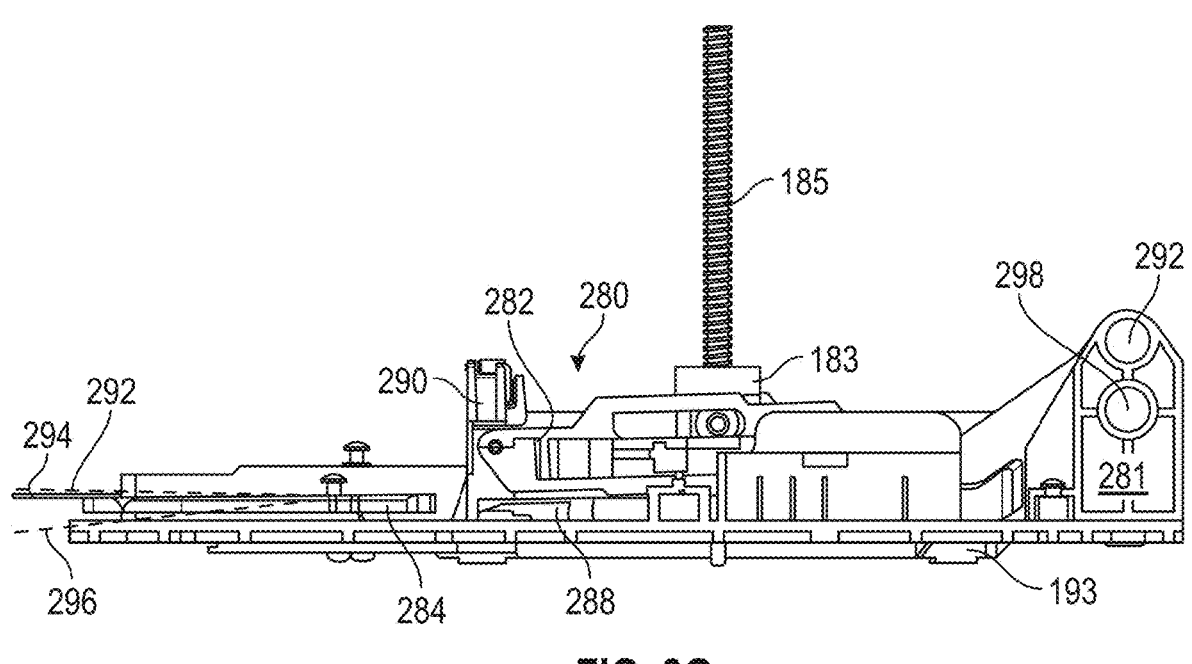
FIGS. 8G-8I depict elevated states of the elevation arm at various positions including the angled orientation of the support pad at each elevation according to an embodiment.
Figure 8I:
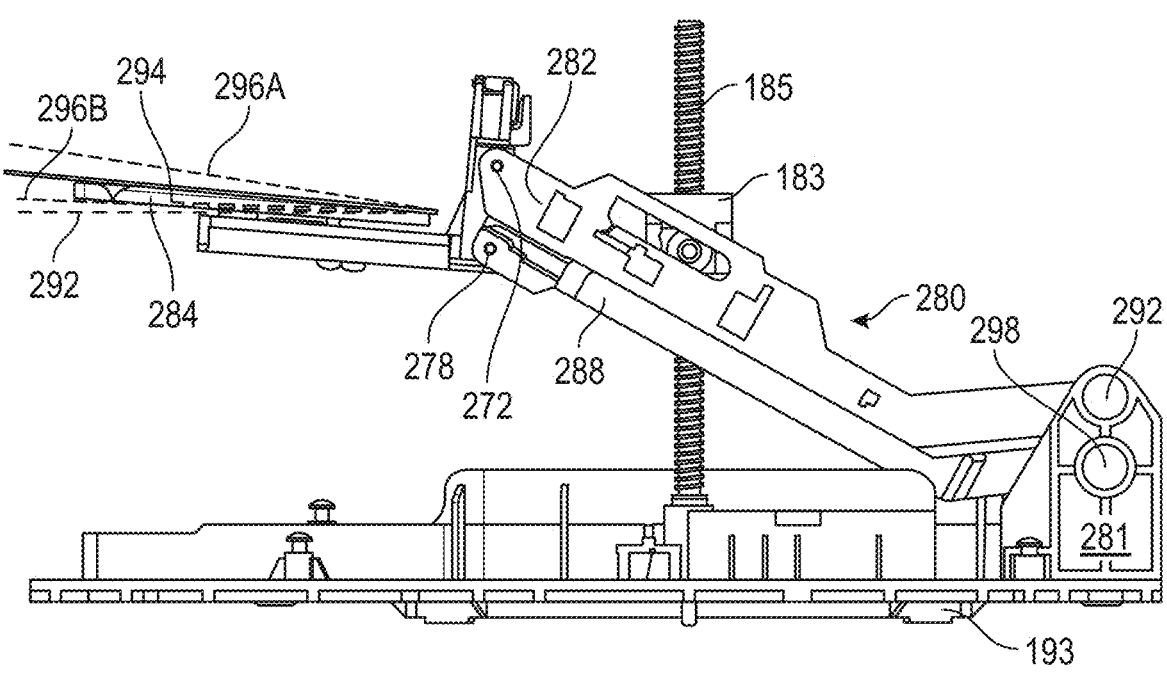
Figure 8J:
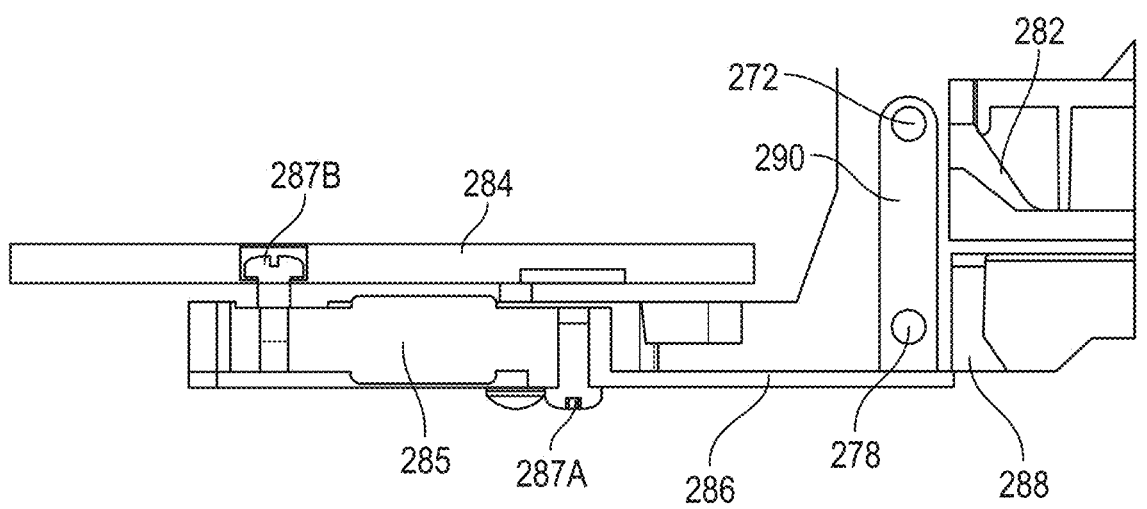
FIGS. 8J-8L depict respective side view, top view and bottom view of the support pad including an underlying load cell base structure for mounting a load cell according to an embodiment.
Figure 8K:
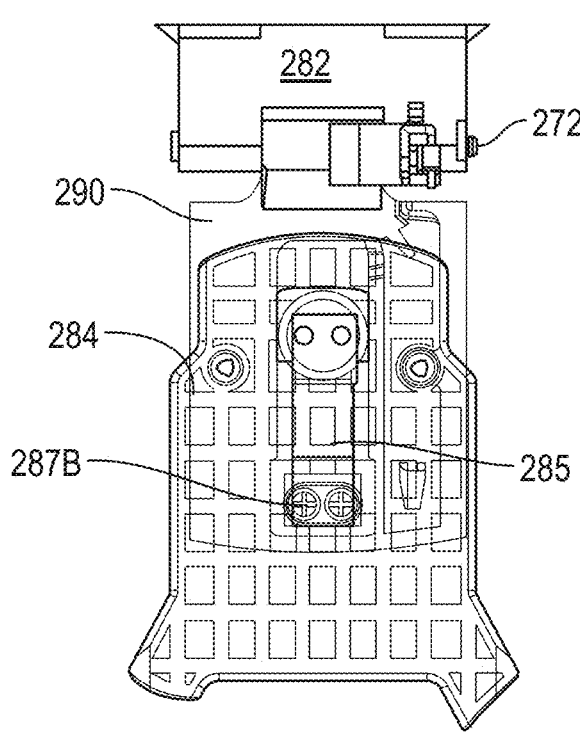
Figure 8L:
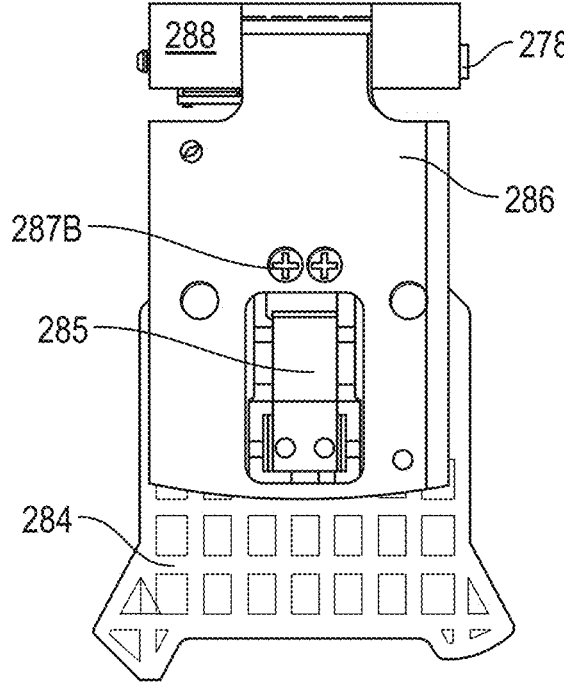

FIGS. 8J, 8K and 8L depict a respective side-view, top view and bottom view of the support lift pad assembly connected to the support arm 280 according to an embodiment. In FIGS. 8J-8L, the support pad 284 includes an underlying load cell base plate 286 which is a support structure for mounting load cell 285 or like weight measurement device using screw connections. For example, screw connections 287A attach the load cell 285 to the load cell base mount plate 286 on one side and screws 287B attach the lift pad 284 to the load cell base mount plate 286 on the other side. In embodiments, the load cell 285 is in wired or wireless communication with a controller or processor device (not shown) that can measure the forces acting vertically on the lift pad such as the weight of the can. Underlying load cell base 286 is operatively connected to the linking support member 290 including pin connection that pivotably connects to both upper arm 282 and lower arm 288. The load cell 285 permits the sensing of many items, including how much food is in the can at any time, thus informing users of how much food the cat or other animal has eaten, and to ensure that the animal is only given the desired portion size.

In an embodiment, to allow the lead screw 185 to stay fixed and vertical, the height stop nut 183 has two (2) side posts that engage with slots in the upper linkage which allow the nut to slide axially along the upper linkage. FIG. 8E depicts a detailed close-up view of the dashed circle portion shown in FIG. 8D illustrating the operable connection of elevation arm 280 with elevation screw 185. In FIGS. 8D and 8E, the height stop 183 includes at least one horizontal-oriented guide post 286 that extends outward from at least one side of the height stop 183. The top elevation arm 282 includes a horizontally disposed slot 275 that engages horizontal-oriented guide post 276 to provide the mechanical linkage for moving the elevation arm 282 up or down according to movement of the guide pin as the height stop 183 moves up or down the elevation screw 185 responsive to elevation motor rotation. The elevation motor 187 can stop rotation, making the elevation arm 280 extend to any suitable height as sensed by the height sensor (not shown). In a further cross-sectional top down view shown in FIG. 8F, the height stop 183 includes two outward extending guide posts 276A, 276B which are engaged by respective slots (not shown) provided at either side of top support arm 282 to provide the mechanical linkage for moving elevation arm 280 up and down responsive to elevation screw rotation.

The four-bar linkage providing the support arm connection points 272, 278, 292 and 298 of FIG. 8D is designed to maximize the vertical lift that can be achieved while minimizing the height of the housing that the linkages fit within and further designed to control the angle of the lifting support pad 284 as needed during operations. To achieve this, the linkage lengths and the hinge points at both ends are engineered to move support pad 284 through a progression of horizontal (i.e., 0 degrees) and/or other angled orientations. For example, the lift pad 284 is angled down slightly initially (e.g., ranging anywhere from 0 degrees horizontal to about –0.5 degrees) when fully lowered in nest. The pad can be oriented horizontally (e.g., 0.0 degrees) when it is at the height for presenting a can, and then can be angled up (e.g., up to +5.0 or +10 degrees relative to the horizontal) when it is raised to its maximum height to maximize how high it can lift a can into the used can barrel while minimizing the height of the housing. The different angles for the lifter pad are achieved due to the pivot points 272, 278, 292, 298 which is calibrated to make the pad angle, e.g., x degrees, where x can range anywhere from +/–3.0 degrees in the lowest position, or from between +/–5.0 degrees in the presentation position or from between 0 and 10.0 degrees as a maximum lift angle. For example, as the lifter arms come down from an elevated to a lower position, then the bottom lifter bar 288 will shorten in relation to the top lifter bar 282 resulting in the angle of the lifter pad becoming closer to zero degrees.

FIGS. 8G-8I depict elevated states of the elevation arm 280 at various positions and particularly shows the angled orientation of the support pad 284 at each elevation to facilitate various operations, e.g., opening the supported can, loading an empty can in the used can barrel, etc. . . . While the four bar linkage of elevation arm 280 is designed such that the lifting support pad 284 is oriented horizontally for all of the lifting heights, as shown in FIGS. 8G-8I, at respective predefined positions along the arc of travel, the angle of the lifting pad can be changed based on where the lifting pad is desired to be. For example, the sealed can held by support pad 284 is desired to be at a certain angle relative to the can opener to facilitate gripping of the can prior to its cutting by the can opener. Thus, as shown in FIG. 8G, depicting the elevation arm 280 at a first elevated position, the first dashed line 292 depicts a horizontal orientation of the support pad 284 and sealed can (not shown) being supported thereby, the solid line 294 shows a designed orientation of the support pad 284 at a designed angle below the horizontal, and the second dashed line 296 depicts a designed orientation of the support pad 284 at a predetermined angle, e.g., approximately 20°, below the designed angle. The horizontal line 292 is preferred for all of the lifting heights where the support pad 284 lifts a sealed can.

Similarly, as shown in FIG. 8H, depicting the elevation arm 280 at a second elevated position, the horizontal line 292 depicts a horizontal orientation of the support pad 284, the first dashed line 294 shows an angled orientation of the support pad 284 at a designed angle above the horizontal, and the second dashed line 296 depicts a further angled orientation of the support pad 284 at a designed angle below the horizontal.

Similarly, as shown in FIG. 8I, depicting the elevation arm 280 at a further elevated position, the dashed line 292 depicts a horizontal orientation of the support pad 284, the solid line 294 shows an angled orientation of the support pad 284 at a designed angle above the horizontal, and the second dashed lines 296A, 296B depict further angled orientation of the support pad 284 at respective designed angles above and below the designed angle above the horizontal.

As used herein, the term control device 160 refers to all components in, on, or attached to an electrical board. Some components of the control device 160 can be in the location shown in FIG. 5 and/or some components of the control device can be located on control device 160', also shown in FIG. 5. In an example embodiment, the control device 160 can include one or more of a processor, a memory, a network interface, and/or an image sensor (e.g., a camera). The network interface can send and receive various signals, such as WiFi signals, Bluetooth® signals, etc. The control device 160 can be configured to receive various inputs from components of the feeding system 100, or from other devices external to the feeding system 100. Also, each of the actions received by or produced from the control device 160 can be processed locally, on the control device 160, and/or, be transmitted to an external server, such as a cloud database, for processing.

In one example, the control device 160 can receive inputs from a mobile phone external to the feeding system 100, where these received inputs can be processed by the processor of control device 160 to control operations of the components of the feeding system 100.

The control device 160 is configured to receive signals from the electronic weight sensing device on the support pad 184. The control device 160 can send a signal to the electronic weight sensing device to make a measurement and, then, the control device 160 can receive the output signal from the electronic weight sensing device at any time, such as when the support arm 180 is at any of positions "A", "B", "C", "D", and "E", or between these positions. These received signals can be used by the control device 160 to determine the amount of contents of each can that has been removed (eaten by an animal), over time. These signals can also be used by the control device 160 to determine if there is an increase in weight, which could indicate a foreign object has been placed in the used can, or if an animal has regurgitated in the used can. If the control device 160 does make this determination, an alert can be transmitted through the interface that a fault has been detected. If a fault is detected, the control device 160 can stop all movement of all elements within the feeding system 100 (to allow for a user to manually remove the used can) or automatically move the used can into the used can barrel 134, and then retrieve a sealed can from the sealed can barrel 132.

In other embodiments, the control device 160 can determine that when a remaining weight of a used can is below a threshold, the control device 160 can automatically move the used can into the used can barrel 134.

Also, the control device 160 can send a signal to the electronic weight sensing device to make a measurement and, then, the control device 160 can receive the output signal from the electronic weight sensing device to determine a weight of all initial (or remaining) sealed cans in the sealed can barrel 132. These received signals can be used by the control device 160 to determine the number of sealed cans in the sealed can barrel 132, if any. The control device 160 can be configured to send an alert through the interface when the detected number of sealed cans is below a threshold, such as 0 sealed cans remaining, 1 sealed can remaining, 2 sealed cans remaining, etc. The control device 160 can check every time a can is dispensed from the sealed can barrel 132 so that the current number of sealed cans in the sealed can barrel 132 can be known to the user.

All such weight sensing signals can be stored by the control device and then later transmitted, through the network interface for storage in another location such as but not limited to the cloud or a local or external database.

The control device 160 can also receive rotational data from each of the elevation motor 187 and the rotation motor 181. To determine the vertical height and the rotational orientation of the support arm 180.

The control device 160 also transmits rotational data to each of the elevation motor 187 and the rotation motor 181, causing these motors to move the support arm according to stored rules.

In one example, the control device 160 can be configured to operate support arm 180, and optionally opening cover 202, as discussed above, to expose the contents of an opened can through the feeding opening 200 for a period of time once motion is detected by a proximity sensor or by the camera of the control device 160. The camera may be used as a proximity sensor or for recognition of different pets. The proximity sensor may also be a receiver of a signal from a device on an animal, such as an RFID chip on a collar of an animal or a microchip within the animal.

In another example embodiment, the control device 160 can be configured to run a machine learning model using images received from a camera (the camera of the control device 160). The machine learning model can be stored in the memory of the control device 160, and can be a classification model that can distinguish different animals accessing the feeding system 100. In another embodiment, the process of recognition can be transmitted from the control device 160 to a cloud network and/or external server for recognition processing and data obtained from this process can be stored on the cloud network and/or external server, and/or transmitted back to the control device 160.

The memory of the control device 160 can store a mapping of different animals to different course of actions to operate the feeding system 1. The control device 160 can run the machine learning model to identify an animal currently accessing the feeing system 1 (such as by physical size, shape, color and/or physical appearance, such as fur/eye color and/or fur pattern), and identify, in the memory, a course of actions mapped to the identified animal. For example, if an animal AA is mapped to an action of an allowed eating time of three minutes, in response to identifying animal AA, the control device 160 can operate support arm 180, and optionally opening cover 202, as discussed above, to expose the contents of an opened can through the feeding opening 200 for three minutes, The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

What is claimed is:

1. A feeding system comprising:
a housing that substantially forms an exterior surface of the feeding system, inside the housing comprising:
an arm configured to rotate clockwise and counter-clockwise to a plurality of positions, wherein the arm is configured to support a can comprising food contents, wherein the plurality of positions comprise a can-opening position, a feeding position, and a sealed-can placement position;
a can opener at the can-opening position to provide an opened can;
an opening of the housing at the feeding position, wherein the food contents of the opened can are accessible at the feeding position for feeding from the opened can, wherein the arm moves the can to the can-opening position and the feeding position;
a sealed can barrel structure for housing a vertically disposed stack of sealed cans at the sealed-can placement position;
a latch dispensing device associated with said sealed can barrel structure, the latch dispensing device extendable to support the stack of sealed cans within the sealed can barrel structure;
a base support platform adapted to rotate, said arm disposed on said base support platform and rotatable therewith to locate the arm at each of the plurality of positions; and
a retainer device disposed at a sidewall of said sealed can barrel, said retainer device extendable to retain one or more sealed cans disposed above a bottom-most can of the stack of sealed cans at the sealed-can placement position;
a cam structure mounted on the rotating base support platform for rotation therewith, wherein the latch dispensing device and retainer device are cam-operated, said retainer device having a cam-follower element disposed for engaging said cam structure while the base rotates to one or more of said plurality of positions; and
said latch dispensing device having a cam-follower element disposed for engaging said cam structure while the base rotates to one or more of said plurality of positions, and the latch dispensing device cam-follower element engaging said cam structure to retract and release only the bottommost can of the stack from within the sealed can barrel onto the arm while the retainer device cam-follower element engages said cam structure to extend the retainer device to retain the sealed cans disposed above the bottommost sealed can being released onto the arm.

2. The feeding system of claim 1, wherein the retainer device comprises:
a substantially flat spring steel body pivotable about an axis and one or more retaining arms at a distal end, each one or more retaining arms extending outward from the flat spring steel body for gripping a sealed can within the sealed can barrel structure while the bottommost can of the stack is being released.

3. The feeding system of claim 2, wherein each said extended one or more retaining arms comprises toothed-edges for gripping and holding a sealed can disposed above the sealed bottommost can being released from the sealed can barrel onto the arm.

4. The feeding system of claim 3, wherein said retainer device is disposed proximate a surface of said sealed can barrel, said one or more retaining arms at said distal end being extended and retracted through corresponding openings of said sealed can barrel.

5. The feeding system of claim 1, wherein the cam structure comprises:

a first cam surface, wherein said cam-follower element of said latch dispensing device engages said first cam surface; and a second cam surface, wherein said cam-follower element of said retainer device engages said second cam surface, said first cam surface having a first cam surface profile and second cam surface having a second cam surface profile, said first and second cam surface profiles configured for timing the latch device to release said bottommost sealed can onto said arm as the base member rotates while the retainer device simultaneously retains one or more sealed cans above the bottommost sealed can being released.

6. The feeding system of claim 5, wherein said cam-follower element of said latch dispensing device is a horizontally oriented wheel adapted for engaging the first cam surface of the cam structure as the base support platform rotates.

7. The feeding system of claim 1, further comprising an elevation screw that is configured to rotate and move the arm vertically upwards and downwards.

8. The feeding system of claim 7, wherein the arm comprises:

a plural member linkage assembly having a support pad at a distal end thereof for supporting a can, said linkage assembly operatively connected to the elevation screw for vertically raising and lowering said arm and support pad to a desired height.

9. The feeding system of claim 8, wherein the support pad is disposed horizontally while said arm is vertically raised or lowered to a desired height in response to rotation of said elevation screw.

10. The feeding system of claim 9, further comprising: a height adjustment nut disposed on said elevation screw and locatable at pre-defined heights in the vertical direction in response to rotation of said elevation screw, said height adjustment nut controlling an extent to which the arm and said support pad can be raised in the vertical direction.

11. The feeding system of claim 10, wherein the height adjustment nut comprises one or more guide posts extending outward therefrom, said plural member linkage assembly comprising one arm member having slots at opposing sides for slidable engagement with a respective extended guide post, said arm member and support pad vertically raised to the desired height in the vertical direction based on a height of the height adjustment nut.

12. The feeding system of claim 8, wherein the support pad is disposed at one or more angles relative to a horizontal while said arm is vertically raised in response to rotation of said elevation screw at respective one or more pre-defined positions.

\* \* \* \* \*